(12) United States Patent  
Sugita et al.

(10) Patent No.: US 8,325,295 B2  
(45) Date of Patent: Dec. 4, 2012

(54) LIQUID CRYSTAL DISPLAY DEVICE

(75) Inventors: Tatsuya Sugita, Takahagi (JP); Masaya Adachi, Hitachi (JP); Shinichiro Oka, Hitachi (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 359 days.

(21) Appl. No.: 12/709,315

(22) Filed: Feb. 19, 2010

(65) Prior Publication Data  
US 2010/0220260 A1 Sep. 2, 2010

(30) Foreign Application Priority Data  
Mar. 2, 2009 (JP) ................................. 2009-047855

(51) Int. Cl.  
*G02F 1/1335* (2006.01)

(52) U.S. Cl. .......................................... 349/65; 349/62

(58) Field of Classification Search ............... 349/61–69  
See application file for complete search history.

(56) References Cited

U.S. PATENT DOCUMENTS

| | | | |
|---|---|---|---|
| 6,559,827 B1* | 5/2003 | Mangerson | 345/102 |
| 7,872,705 B2* | 1/2011 | Medendorp et al. | 349/64 |
| 8,172,447 B2* | 5/2012 | Meir et al. | 362/616 |
| 2001/0038532 A1 | 11/2001 | Harbers et al. | |
| 2009/0027588 A1 | 1/2009 | Medendrop, Jr. | |
| 2010/0026929 A1* | 2/2010 | Nagata et al. | 349/61 |

FOREIGN PATENT DOCUMENTS

| | | |
|---|---|---|
| JP | 2000-036207 | 2/2000 |
| JP | 2003-532273 | 10/2003 |
| JP | 2004-286803 | 10/2004 |
| JP | 2010-021073 | 1/2010 |

* cited by examiner

*Primary Examiner* — Dung T. Nguyen  
(74) *Attorney, Agent, or Firm* — Antonelli, Terry, Stout & Kraus, LLP.

(57) ABSTRACT

A liquid crystal display device includes a liquid crystal display panel, a plurality of groups of light source units, a plurality of light guide plates, and a light source control circuit configured to control light amounts of the light source units. The plurality of light guide plates are configured to transmit light from the plurality of groups of the light source units. In each of the plurality of light guide plates, areas from which the transmitted light exiting toward the liquid crystal display panel differ from one another. One of the plurality of groups of the light source units paired with one of the plurality of light guide plates includes at least two light source units that are controlled in light amount independently. A number of the areas of the one of the plurality of light guide plates is at least a number of the light source units thereof.

8 Claims, 36 Drawing Sheets

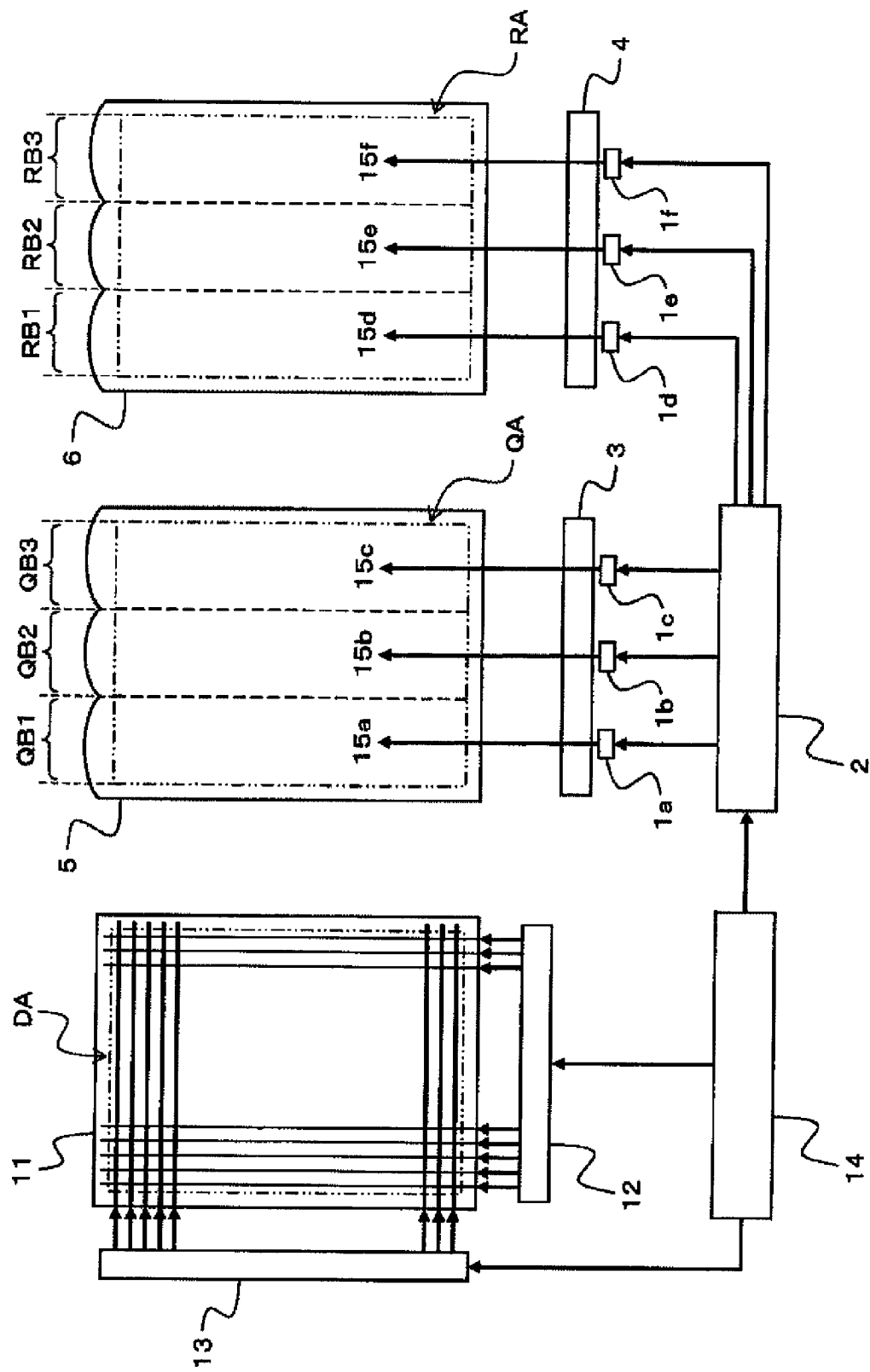

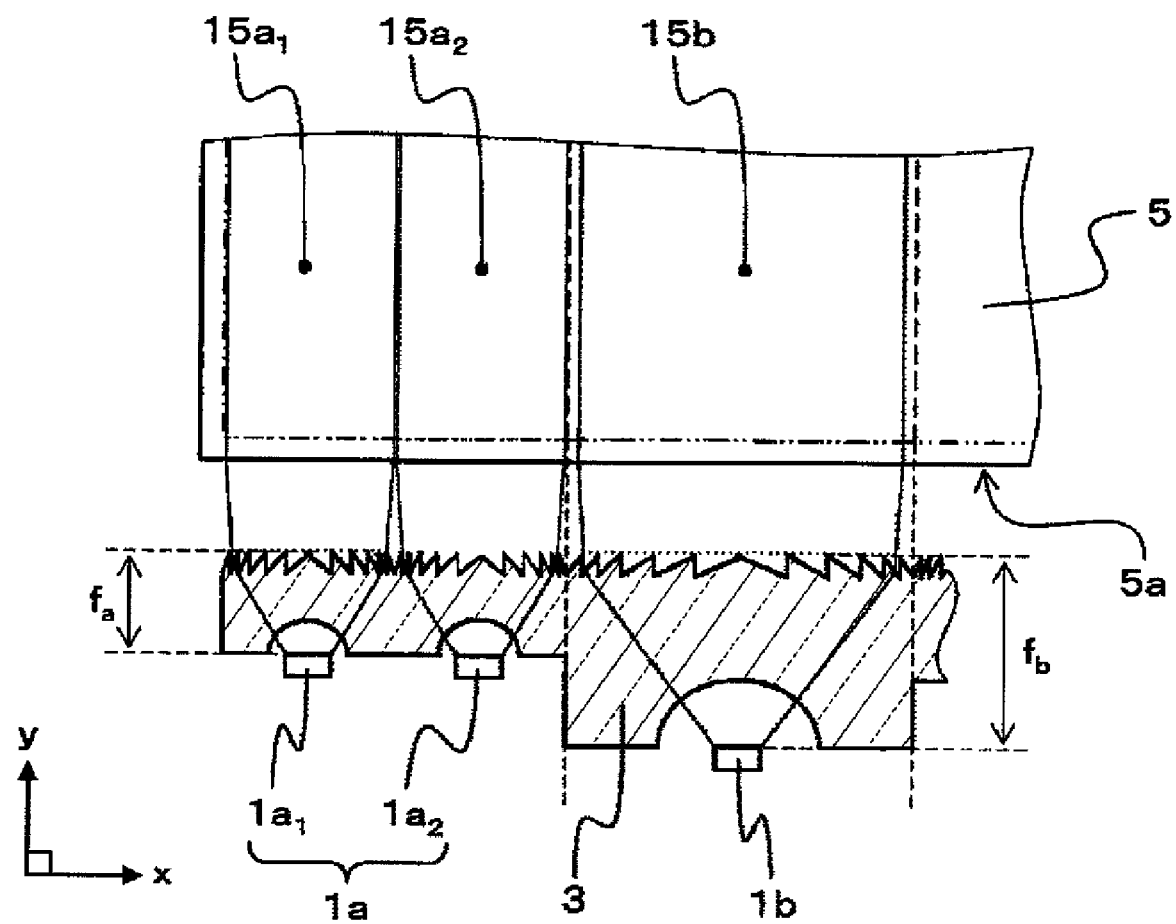

LIQUID CRYSTAL DISPLAY DEVICE

CROSS-REFERENCE TO RELATED APPLICATION

The present application claims priority from Japanese Application JP2009-047855 filed on Mar. 2, 2009, the content to which is hereby incorporated by reference into this application.

BACKGROUND OF THE INVENTION

1. Field of the Invention

The present invention relates to a liquid crystal display device, and more particularly to a technique effective when applied to a liquid crystal display device that includes a light guide plate type backlight unit.

2. Description of the Related Art

Conventional liquid crystal display devices include ones that use a light guide plate type backlight unit. In the light guide plate type backlight units, a light guide plate is disposed in, for example, a place that overlaps with the display area of a liquid crystal display panel, and a light source such as a light emitting diode or a fluorescent light is placed at an end of the light guide plate. Compared to direct lit backlight units having a light source in a place that overlaps with the display area of a liquid crystal display panel, the light guide plate type backlight units require fewer light sources and reduce the power consumption of a liquid crystal display device. Also, the light guide plate type backlight units can be made thin more easily than direct lit backlight units, and are employed by liquid crystal display modules for use in portable electronic devices such as cellular phones. An increasing number of large-sized liquid crystal display devices including liquid crystal television sets have recently used the light guide plate type backlight units as well for the purpose of obtaining a thinner shape and a lighter weight, and reducing power consumption.

In the light guide plate type backlight units, however, the intensity of light (light amount) emitted from a light source attenuates while, for example, traveling through the light guide plate. This often causes the light amount to differ between light that exits the light guide plate of the light guide plate type backlight unit from a place close to an incidence end surface and light that exits the light guide plate from a place far from the incidence end surface, for example. As a result, the surface luminance evenness is lowered in a planar beam of light for irradiating a liquid crystal display panel.

The light guide plate type backlight units therefore enhance the surface luminance evenness of an exiting planar beam of light by using, for example, a light guide plate that grows larger in number of reflection patterns for extracting light or in dimensions as the distance from the incidence end surface increases.

The conventional light guide plate type backlight unit usually includes one light guide plate. Consequently, when a light guide plate type backlight unit is used in a liquid crystal display device that has "hold type" light emission characteristics, a motion blur often occurs due to the luminance response characteristics of respective pixels.

One of methods that have been proposed to remedy the motion blur as described above is a method for providing two light guide plates that have different light reflection patterns and for emitting light intermittently at different timing using a light source for one light guide plate and a light source for another light guide plate emit light (see, for example, JP 2004-286803 A).

In a liquid crystal display devices including a conventional backlight unit, the surface luminance of a planar beam of light for irradiating the display area is generally desired to be even or to be distributed such that the luminance decreases gradually and concentrically from the center toward the perimeter.

However, as mentioned above, a planar beam of light emitted from the conventional light guide plate type backlight unit tends to become lower in luminance as the distance increases from the light incidence side surface of the light guide plate. Realizing an even surface luminance of a planar beam of light is relatively easy in the conventional light guide plate type backlight units, but it is difficult to decrease the luminance gradually and concentrically from the center toward the perimeter.

Some of recent liquid crystal display devices including a backlight unit are desired to two-dimensionally control the surface luminance of a planar beam of light for irradiating the display area by, for example, area-based control called local dimming or such.

The area-based control is a method for, for example, dividing the display area into a plurality of small areas and controlling the luminance of irradiation light for each of the small areas separately. A liquid crystal display device that employs area-based control can improve the contrast of a displayed image by, for example, setting a low luminance to light that irradiates a small area where the display gray level is low in many pixels and by setting a high luminance to light that irradiates a small area where the display gray level is high in many pixels.

In the direct lit backlight units, a plurality of light sources can be arranged into a matrix pattern in a place that overlaps with the display area. It is therefore relatively easy to control the surface luminance of a planar beam of light two-dimensionally as in the area-based control by liquid crystal display devices including the direct lit backlight unit.

In the light guide plate type backlight units, on the other hand, the surface luminance of a planar beam of light may be two-dimensionally controlled by devising a light extracting structure, for example, a placement of a light reflection pattern to be provided in the light guide plate.

However, the surface luminance distribution of a planar beam of light in the conventional light guide plate type backlight units is determined mainly by a light extracting structure such as a light reflection pattern which is provided in the light guide plate. This makes it difficult for liquid crystal display devices that include the conventional light guide plate type backlight unit to switch between setting the surface luminance of the planar beam of light even for one circumstance and varying the surface luminance of the planar beam of light two-dimensionally for another circumstance. Another problem is that dynamically performing two-dimensional control of the surface luminance as in, for example, the area-based control is difficult in liquid crystal display devices that include the conventional light guide plate type backlight unit.

SUMMARY OF THE INVENTION

One object of the present invention is to provide a technique that enables a liquid crystal display device including a light guide plate type backlight unit to control a surface luminance of a planar beam of light for irradiating its liquid crystal display panel so as to decrease the luminance concentrically from the center toward the perimeter.

One object of the present invention is to provide a technique that facilitates two-dimensional control of a surface luminance of a planar beam of light for irradiating a liquid crystal display panel in a liquid crystal display device including a light guide plate type backlight unit.

The above-mentioned and other objects of the present invention as well as novel features of the present invention become clear through descriptions given herein and accompanying drawings.

Representative aspects of the present invention disclosed herein are outlined as follows.

(1) A liquid crystal display device includes a liquid crystal display panel, a plurality of groups of light source units, a plurality of light guide plates, and a light source control circuit configured to control light amounts of the light source units. The plurality of groups of the light source units and the plurality of light guide plates forming a plurality of pairs are stacked behind the liquid crystal display panel. The plurality of light guide plates are configured to transmit light from the plurality of groups of the light source units. In each of the plurality of light guide plates, areas from which the transmitted light exiting toward the liquid crystal display panel differs from one another. One of the plurality of groups of the light source units paired with one of the plurality of light guide plates includes at least two light source units that are controlled in light amount independently of each other. A number of the areas of the one of the plurality of light guide plates paired with the one of the plurality of groups of the light source units is at least a number of the light source units thereof. The light exiting from each of the areas is mainly emitted from one of the at least two light source units. The light source control circuit controls the at least two light source units in light amount independently of each other.

(2) The liquid crystal display device according to item (1), in which, in the one of the plurality of light guide plates paired with the one of the plurality of groups of the light source units that includes the at least two light source units, the areas all have the same areal dimensions.

(3) The liquid crystal display device according to item (1), in which, in the one of the plurality of light guide plates paired with the one of the plurality of groups of the light source units that includes the at least two light source units, the areas have at least two different areal dimensions.

(4) The liquid crystal display device according to item (3), in which the at least two light source units each include one white light source or at least two white light sources, and a number of the white light sources of each of the at least two light source units varies depending on the at least two different areal dimensions of the areas from which the light from each of the at least two light source units exits.

(5) The liquid crystal display device according to item (1), in which the plurality of light guide plates are equal to one another in areal dimensions of the areas from which the transmitted light exits toward the liquid crystal display panel.

(6) The liquid crystal display device according to item (1), in which the plurality of pairs of the plurality of groups of the light source units and the plurality of light guide plates each comprise light condensing means for reducing a divergence angle of the light emitted from the one of the plurality of groups of the light source units between the one of the plurality of groups of the light source units and the one of the plurality of light guide plates.

(7) The liquid crystal display device according to item (6), in which the light condensing means includes a lens for converting the light emitted from the one of the plurality of groups of the light source units into parallel beams.

(8) The liquid crystal display device according to item (1), in which the plurality of light guide plates each have one of a convex reflection pattern and a concave reflection pattern in the areas from which the light exits. The one of the convex reflection pattern and the concave reflection pattern changes in a shape according to a distance from a point which the light from the plurality of groups of the light source units enter.

(9) The liquid crystal display device according to item (1), in which a perimeter of the areas of the one of the plurality of light guide plates from which the light exits overlaps with a perimeter of the areas of another one of the plurality of light guide plates from which the light exits over a predetermined width.

(10) A liquid crystal display device includes a liquid crystal display panel, a plurality of groups of light source units, a plurality of light guide plates, a light source control circuit configured to control light amounts of the light source units. The plurality of groups of the light source units and the plurality of light guide plates forming a plurality of pairs are stacked behind the liquid crystal display panel. The plurality of light guide plates are configured to transmit light from the plurality of groups of the light source units. The transmitted light exits toward the liquid crystal display panel from an area of each of the plurality of light guide plates. The area of each of the plurality of light guide plates differs from one another. In one of the plurality of light guide plates, the area from which the light exits includes a rectangular area that overlaps with a central part of a display area of the liquid crystal display panel. In each of the plurality of light guide plates except for the one of the plurality of light guide plates, the area from which the light exits is an annular area that surrounds the rectangular area.

(11) The liquid crystal display device according to item (10), in which, each of the area of the plurality of light guide plates has the same areal dimension.

The liquid crystal display device according to the present invention is capable of controlling the surface luminance of the planar beam of light radiated from the light guide plate type backlight unit onto the liquid crystal display panel so as to decrease the luminance concentrically from the center toward the perimeter.

The liquid crystal display device according to the present invention can also perform two-dimensional control more easily than in the prior art on the surface luminance of the planar beam of light radiated from the light guide plate type backlight unit onto the liquid crystal display panel.

BRIEF DESCRIPTION OF THE DRAWINGS

In the accompanying drawings:

FIG. 1A is a schematic block diagram illustrating an example of a schematic structure of a liquid crystal display device according to a first embodiment of the present invention;

FIG. 2B is an enlarged schematic plan view supplementing illustration of the planar structure of FIG. 2A;

DETAILED DESCRIPTION OF THE INVENTION

A detailed description of the present invention is given below through modes of carrying out the invention (embodiments) with reference to the drawings.

Throughout the drawings illustrating the embodiments, components having the same functions are denoted by the same reference symbols in order to avoid repetitive descriptions.

First Embodiment

Figure 1B:
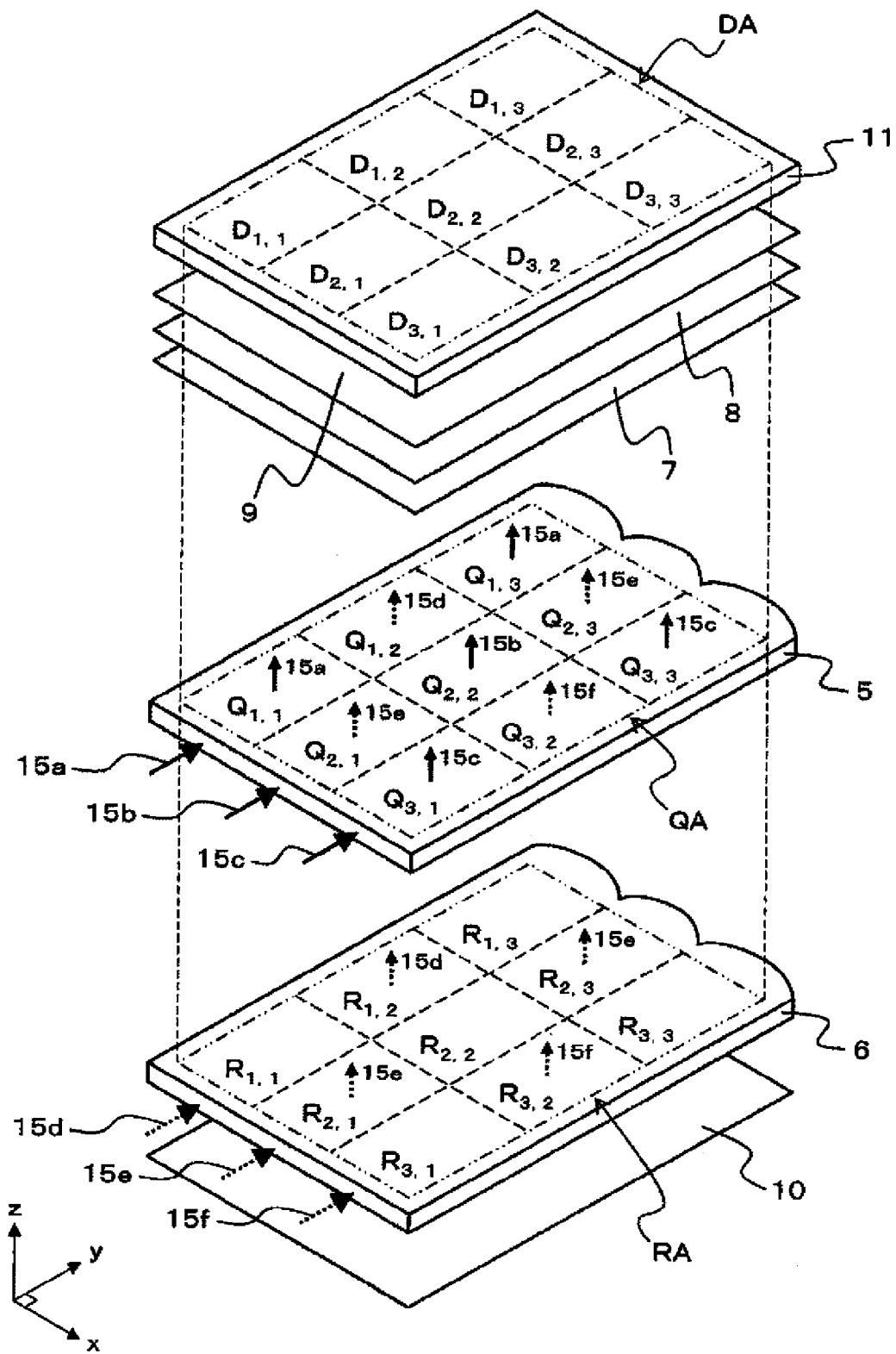
FIG. 1B is a schematic perspective view supplementing illustration of the schematic structure in FIG. 1A.

FIGS. 1A and 1B are schematic diagrams illustrating a schematic structure and operation principle of a liquid crystal display device according to a first embodiment of the present invention.

FIG. 1A is a schematic block diagram illustrating an example of the schematic structure of the liquid crystal display device according to the first embodiment. FIG. 1B is a schematic perspective view supplementing the illustration of the schematic structure of FIG. 1A.

The liquid crystal display device of the first embodiment is a liquid crystal display device that has a light guide plate type (also called edge light type) backlight unit, and includes, for example, as illustrated in FIGS. 1A and 1B, light source units 1a, 1b, 1c, 1d, 1e, and 1f, a light source control circuit 2, a first lens waveguide 3, a second lens waveguide 4, a first light guide plate 5, a second light guide plate 6, a light diffusing sheet 7, a prism sheet 8, a prism sheet with light diffusing function 9, a reflective sheet 10, a liquid crystal display panel 11, a first driver circuit 12, a second driver circuit 13, and a main control circuit 14.

The light source units 1a, 1b, 1c, 1d, 1e, and 1f are each a white light source such as a white light emitting diode (hereinafter referred to as white LED). A structural example of the light source units 1a, 1b, 1c, 1d, 1e, and 1f in the liquid crystal display device of the first embodiment is described later.

The light source control circuit 2 is a circuit for controlling, on a light source unit basis, the light amount of white beams 15a, 15b, 15c, 15d, 15e, and 15f, which are emitted from the light source units 1a, 1b, 1c, 1d, 1e, and 1f, respectively. A structural example of the light source control circuit 2 in the liquid crystal display device of the first embodiment is described later.

The first lens waveguide 3 is an optical component for converting the white beams 15a, 15b, and 15c emitted from the light source units 1a, 1b, and 1c, respectively, into parallel beams and causing the parallel beams to enter the first light guide plate 5. The first lens waveguide 3 includes, for example, a lens for converting the white beam 15a into parallel beams that travel through a block area QB1 of the first light guide plate 5, a lens for converting the white beam 15b into parallel beams that travel through a block area QB2 of the first light guide plate 5, and a lens for converting the white beam 15c into parallel beams that travel through a block area QB3 of the first light guide plate 5. The block areas QB1, QB2, and QB3 of the first light guide plate 5 divide up an area QA, which overlaps with a display area DA of the liquid crystal display panel 11, into three equal parts in a direction in which the light source units 1a, 1b, and 1c are aligned (x direction). A structural example of the first lens waveguide 3 and the relation of the first lens waveguide 3 with the light source units 1a, 1b, and 1c in the liquid crystal display device of the first embodiment is described later.

The second lens waveguide 4 is an optical component for converting the white beams 15d, 15e, and 15f emitted from the light source units 1d, 1e, and 1f, respectively, into parallel beams and causing the parallel beams to enter the second light guide plate 6. The second lens waveguide 4 includes, for example, a lens for converting the white beam 15d into parallel beams that travel through a block area RB1 of the second light guide plate 6, a lens for converting the white beam 15e into parallel beams that travel through a block area RB2 of the second light guide plate 6, and a lens for converting the white beam 15f into parallel beams that travel through a block area RB3 of the second light guide plate 6. The block areas RB1, RB2, and RB3 of the second light guide plate 6 divide up an area RA, which overlaps with the display area DA of the liquid crystal display panel 11, into three equal parts in a direction in which the light source units 1d, 1e, and 1f are aligned (x direction). A structural example of the second lens waveguide 4 and the relation of the second lens waveguide 4 with the light source units 1d, 1e, and 1f in the liquid crystal display device of the first embodiment is described later.

The second light guide plate 6 is an optical component for causing part of or the entirety of the incident white beams 15d, 15e, and 15f to exit toward the liquid crystal display panel 11 in the process of propagating the white beams 15d, 15e, and 15f. The second light guide plate 6 causes the white beam 15d, which travels through the block area RB1, to exit toward the liquid crystal display panel 11 mainly from a small area $R_{1,2}$. The small area $R_{1,2}$, together with small areas $R_{1,1}$ and $R_{1,3}$, divides up the block area RB1 into three equal parts in a y direction. The second light guide plate 6 causes the white beam 15e, which travels through the block area RB2, to exit toward the liquid crystal display panel 11 mainly from small areas $R_{2,j}$, and $R_{2,3}$. The small areas $R_{2,1}$ and $R_{2,3}$ together with a small area $R_{2,2}$, divide up the block area RB2 into three equal parts in the y direction. The second light guide plate 6 causes the white beam 15f, which travels through the block area RB3, to exit toward the liquid crystal display panel 11 mainly from a small area $R_{3,2}$. The small area $R_{3,2}$, together with small areas $R_{3,1}$ and $R_{3,3}$, divides up the block area RB3 into three equal parts in the y direction. A structural example of the second light guide plate 6 in the liquid crystal display device of the first embodiment is described later.

The first light guide plate 5 is an optical component for causing part of or the entirety of the incident white beams 15a, 15b, and 15c to exit toward the liquid crystal display panel 11 in the process of propagating the white beams 15a, 15b, and 15c, and transmitting at a high transmittance the white beams 15d, 15e, and 15f that have exited from the second light guide plate 6 toward the liquid crystal display panel 11. The first light guide plate 5 causes the white beam 15a, which travels through the block area QB1, to exit toward the liquid crystal display panel 11 mainly from small areas $Q_{1,1}$ and $Q_{1,3}$. The small areas $Q_{1,1}$ and $Q_{1,3}$, together with a small area $Q_{1,2}$, divide up the block area QB1 into three equal parts in the y direction. The first light guide plate 5 causes the white beam 15b, which travels through the block area QB2, to exit toward the liquid crystal display panel 11 mainly from a small area $Q_{2,2}$. The small area $Q_{2,2}$, together with small areas $Q_{2,1}$ and $Q_{2,3}$, divides up the block area QB2 into three equal parts in the y direction. The first light guide plate 5 causes the white beam 15c, which travels through the block area QB3, to exit toward the liquid crystal display panel 11 mainly from small areas $Q_{3,1}$ and $Q_{3,3}$. The small areas $Q_{3,1}$ and $Q_{3,3}$, together with a small area $Q_{3,2}$, divide up the block area QB3 into three equal parts in the y direction. The first light guide plate 5 also transmits at a high transmittance the white beams 15d, 15e, and 15f that have exited from the small areas $R_{1,2}$, $R_{2,1}$, $R_{2,3}$, and $R_{3,2}$ of the second light guide plate 6 and entered the small areas $Q_{1,2}$, $Q_{2,1}$, $Q_{2,3}$, and $Q_{3,2}$. A structural example of the first light guide plate 5 in the liquid crystal display device of the first embodiment is described later.

The light diffusing sheet 7, the prism sheet 8, and the prism sheet with light diffusing function 9 are optical components for adjusting the surface luminance of the white beams 15a, 15b, 15c, 15d, 15e, and 15f that have exited toward the liquid crystal display panel 11 from the small areas $Q_{i,j}$ (i and j are each an integer selected from 1, 2, and 3) of the first light guide plate 5, for example. The white beams 15a, 15b, 15c, 15d, 15e, and 15f exiting from the small areas $Q_{i,j}$ of the first light guide plate 5 separately pass through the light diffusing sheet 7, the prism sheet 8, and the prism sheet with light diffusing function 9, and then enter small areas $D_{i,j}$ of the display area DA of the liquid crystal panel 11. A structural example of the light diffusing sheet 7, the prism sheet 8, and the prism sheet with light diffusing function 9 in the liquid crystal display device of the first embodiment is described later.

The reflective sheet 10 is an optical component for reflecting the white beams 15d, 15e, and 15f that have exited from the second light guide plate 6 to the side opposite from the liquid crystal display panel 11, the white beams 15a, 15b, and 15c that have exited from the first light guide plate 5 to the side opposite from the liquid crystal display panel 11 and have passed through the second light guide plate 6, and other beams. The reflective sheet 10 in the liquid crystal display device of the first embodiment can be any reflective sheet used in a liquid crystal display device that has a conventional light guide plate type backlight unit. A description on the structure of the reflective sheet 10 is therefore omitted in the first embodiment.

The liquid crystal display panel 11 is a display panel with a liquid crystal material sealed between a pair of substrates, and has a plurality of video signal lines and a plurality of scanning signal lines among others. In the display area DA of the liquid crystal display panel 11, pixels including, for example, TFT devices, pixel electrodes, a common electrode, and a liquid crystal layer are arranged in matrix. The liquid crystal display panel 11 of the liquid crystal display device of the first embodiment can be any liquid crystal display panel used in a conventional transmissive, or transflective, TFT liquid crystal display device. A detailed description on the structure and operation of the liquid crystal display panel 11 is therefore omitted in the first embodiment.

The first driver circuit 12 is a circuit called a data driver or such, and generates gray level voltages to be applied to the pixel electrodes of the respective pixels and outputs the generated voltages to the relevant video signal lines. The second driver circuit 13 is a circuit called a scanning driver, or a gate driver, or such, and generates a scanning signal for selecting in which pixel (pixel electrode) a gray level voltage applied to a video signal line is to be written. The second driver circuit 13 outputs the generated scanning signal to a relevant scanning signal line. The first driver circuit 12 and the second driver circuit 13 in the liquid crystal display device of the first embodiment can be any combination of driver circuits that is employed in a conventional transmissive, or transflective, TFT liquid crystal display device. A detailed description on the structures and operation of the first driver circuit 12 and the second driver circuit 13 is therefore omitted in the first embodiment.

The main control circuit 14 is a circuit called a TFT controller, or a timing controller, or such, and controls the operation of the first driver circuit 12, the second driver circuit 13, and the light source control circuit 2 based on signals and power that are input from the outside of the liquid crystal display device. A structural example of the main control circuit 14 of the liquid crystal display device of the first embodiment is described later.

In the liquid crystal display device of the first embodiment, planar beams of light for irradiating the display area DA of the liquid crystal display panel 11 from the backlight unit and the white beams 15a, 15b, 15c, 15d, 15e, and 15f have the following relation.

First, a planar beam of light that irradiates the small areas $D_{1,1}$ and $D_{1,3}$ of the display area DA is mainly the white beam 15a emitted from the light source unit 1a. A planar beam of light that irradiates the small area $D_{1,2}$ of the display area DA is mainly the white beam 15d emitted from the light source unit 1d. A planar beam of light that irradiates the small areas $D_{2,1}$ and $D_{2,3}$ of the display area DA is mainly the white beam 15e emitted from the light source unit 1e. A planar beam of light that irradiates the small area $D_{2,2}$ of the display area DA is mainly the white beam 15b emitted from the light source unit 1b. A planar beam of light that irradiates the small areas $D_{3,1}$ and $D_{3,3}$ of the display area DA is mainly the white beam 15c emitted from the light source unit 1c. A planar beam of light that irradiates the small area $D_{3,2}$ of the display area DA is mainly the white beam 15f emitted from the light source unit 1f.

The liquid crystal display device of the first embodiment can control the light amounts (luminances) of the white beams 15a, 15b, 15c, 15d, 15e, and 15f which are emitted independently of one another from the six light source units 1a, 1b, 1c, 1d, 1e, and 1f, respectively.

In other words, the liquid crystal display device of the first embodiment can control the display luminance of the small areas $D_{1,1}$ and $D_{1,3}$, the display luminance of the small area $D_{1,2}$, the display luminance of the small areas $D_{2,1}$ and $D_{2,3}$, the display luminance of the small area $D_{2,2}$, the display luminance of the small areas $D_{3,1}$ and $D_{3,3}$, and the display luminance of the small area $D_{3,2}$ independently of one another.

The liquid crystal display device of the first embodiment is accordingly capable of controlling and adjusting the display luminance of the display area DA two-dimensionally.

FIGS. 2A to 2G are schematic diagrams illustrating a specific example of the schematic structures of the light source units, the lens waveguides, and the light guide plates in the liquid crystal display device of the first embodiment.

Figure 2A:
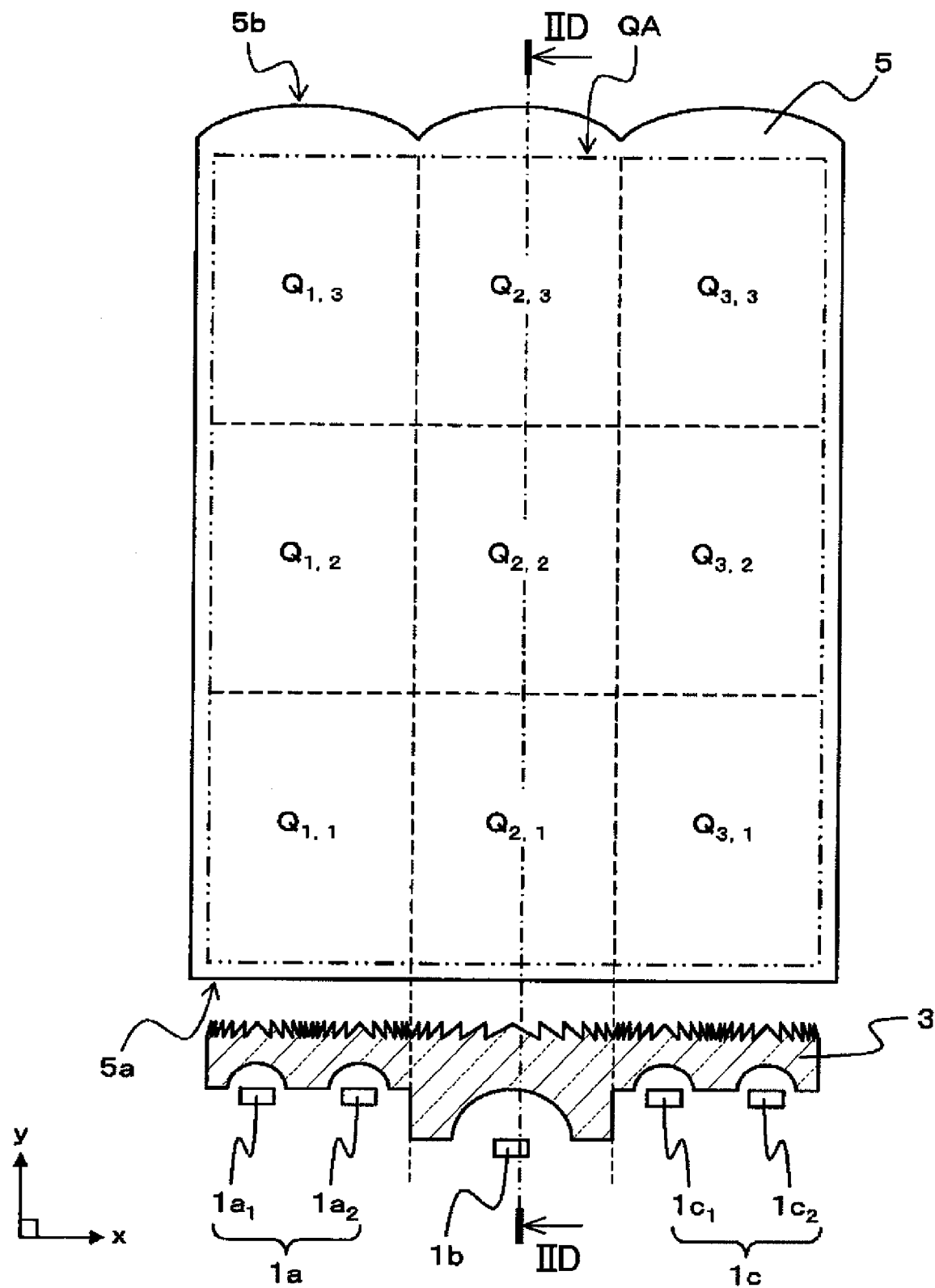
FIG. 2A is a schematic plan view illustrating an example of planar structures of a first light source unit group, a first lens waveguide, and a first light guide plate.
Figure 2C:
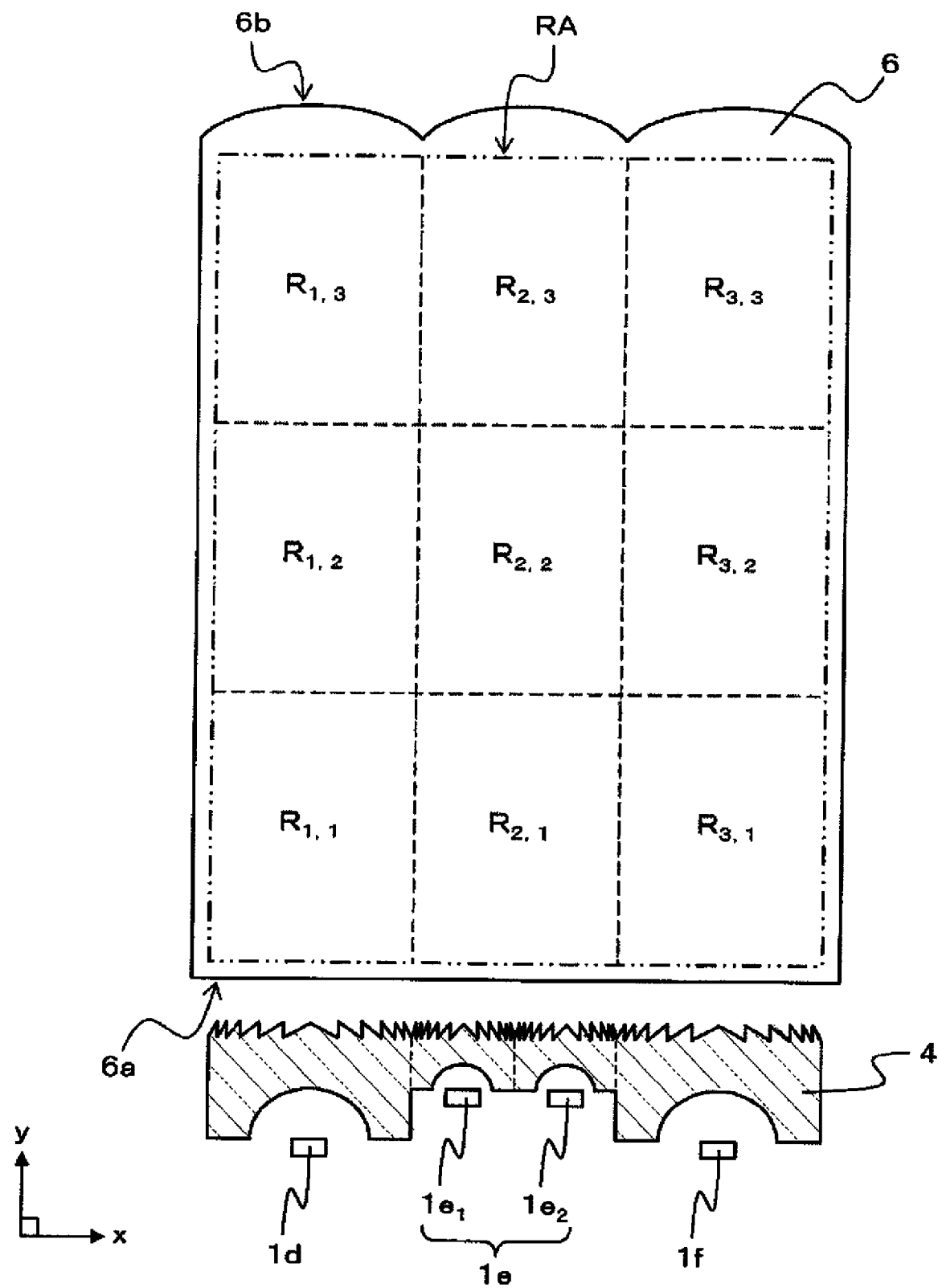
FIG. 2C is a schematic plan view illustrating an example of the planar structures of a second light source unit group, a second lens waveguide, and a second light guide plate.
Figure 2D:
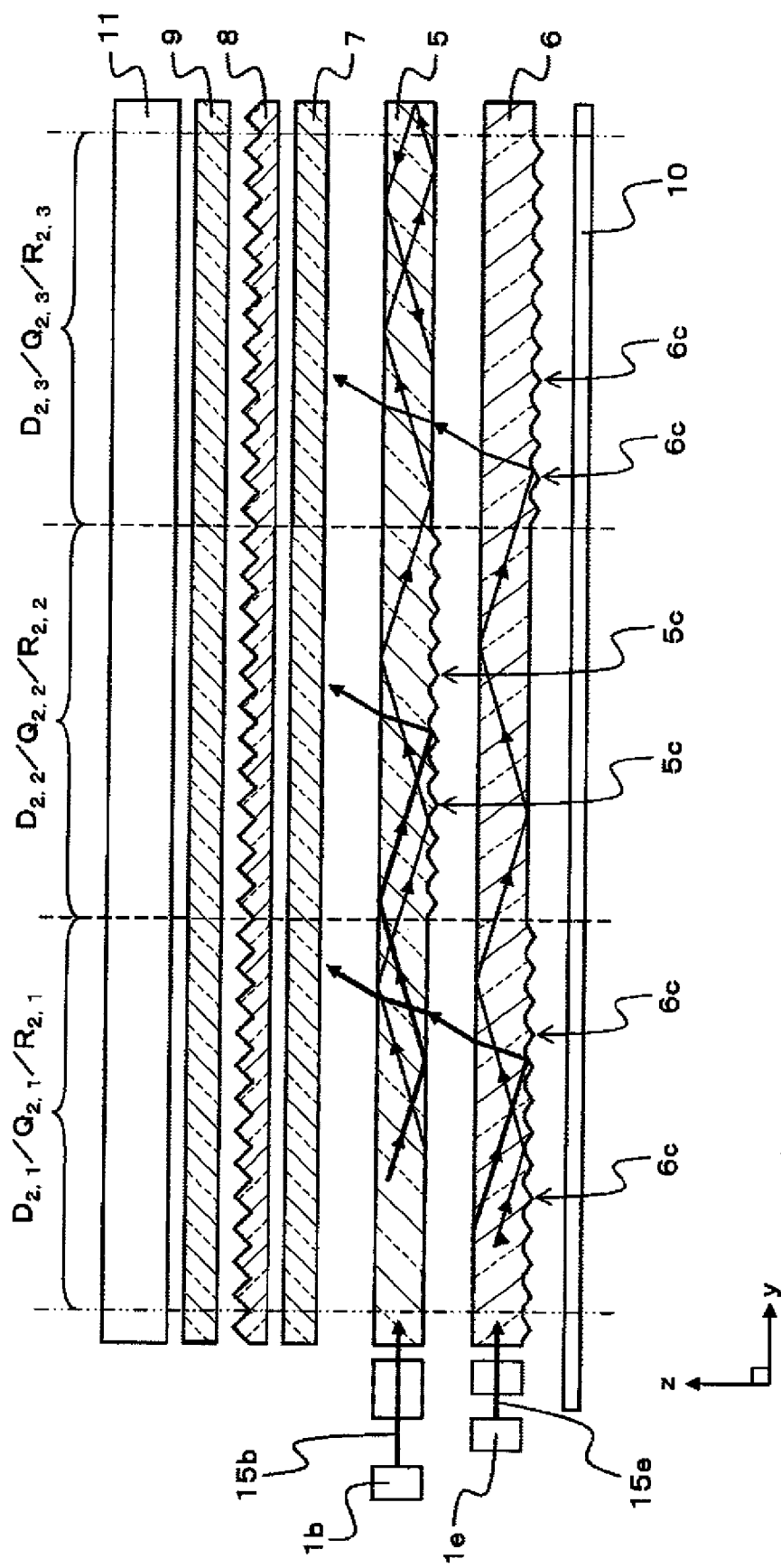
FIG. 2D is a schematic sectional view illustrating an example of a sectional structure of the liquid crystal display device which is taken along a line IID-IID of FIG. 2A.
Figure 2E:
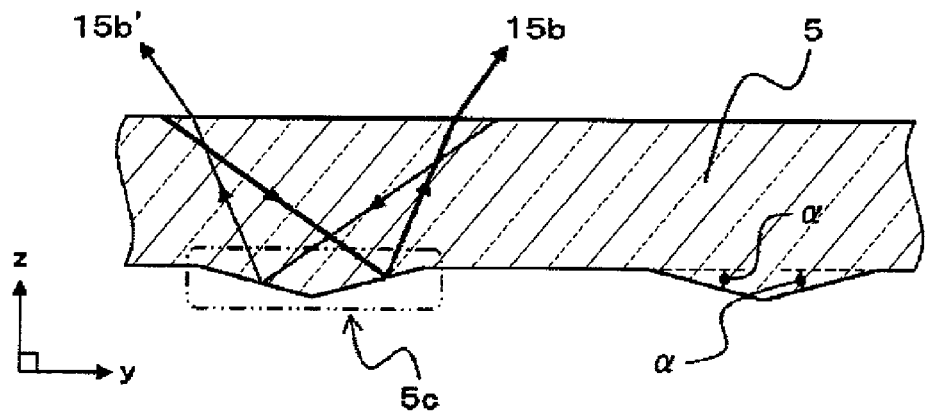
FIG. 2E is an enlarged sectional view illustrating an example of a sectional structure of a light extracting structure provided in the light guide plates.
Figure 2F:
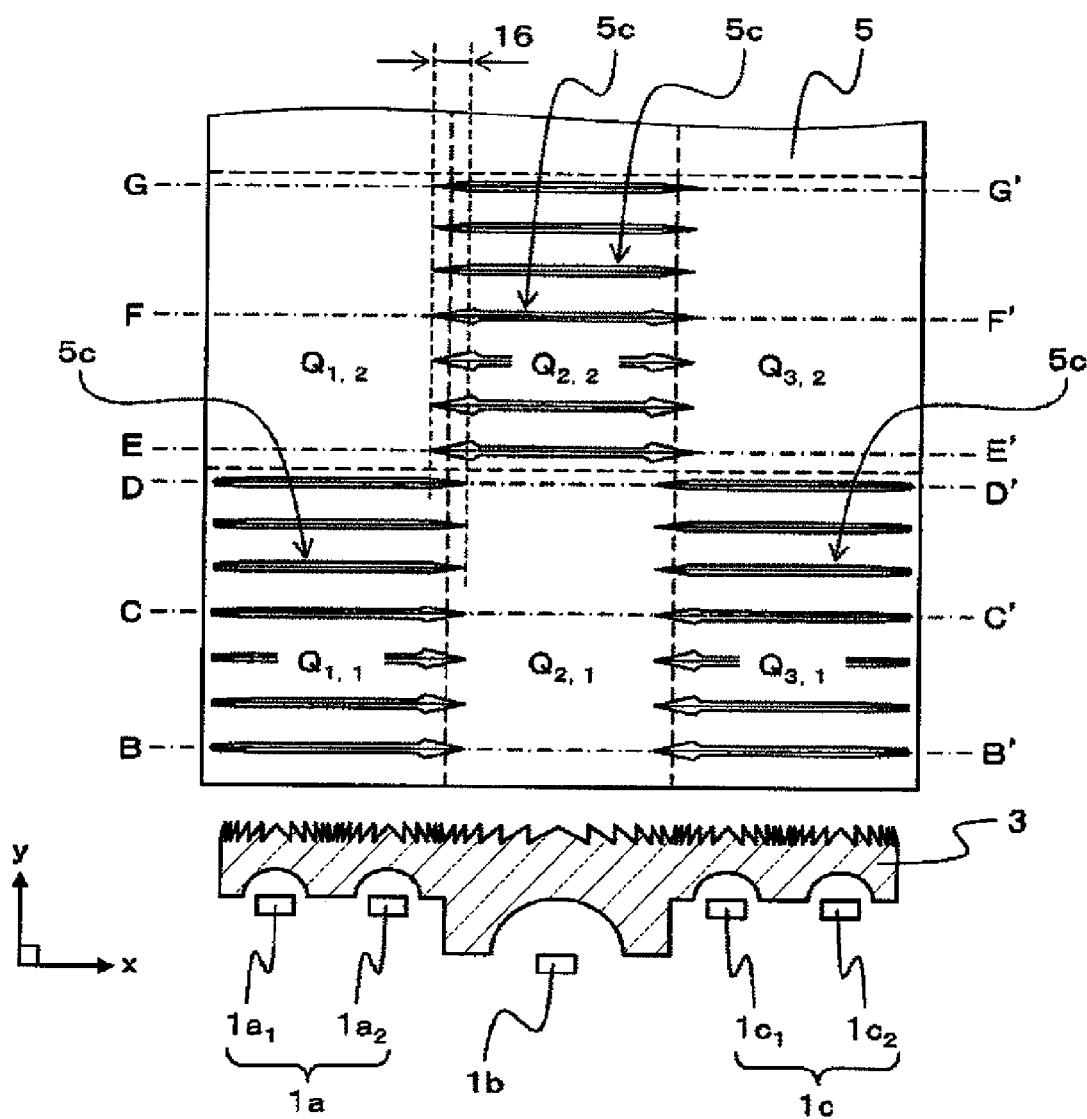
FIG. 2F is an enlarged sectional view illustrating an example of a planar structure of the light extracting structure provided in the light guide plates.
Figure 2G:
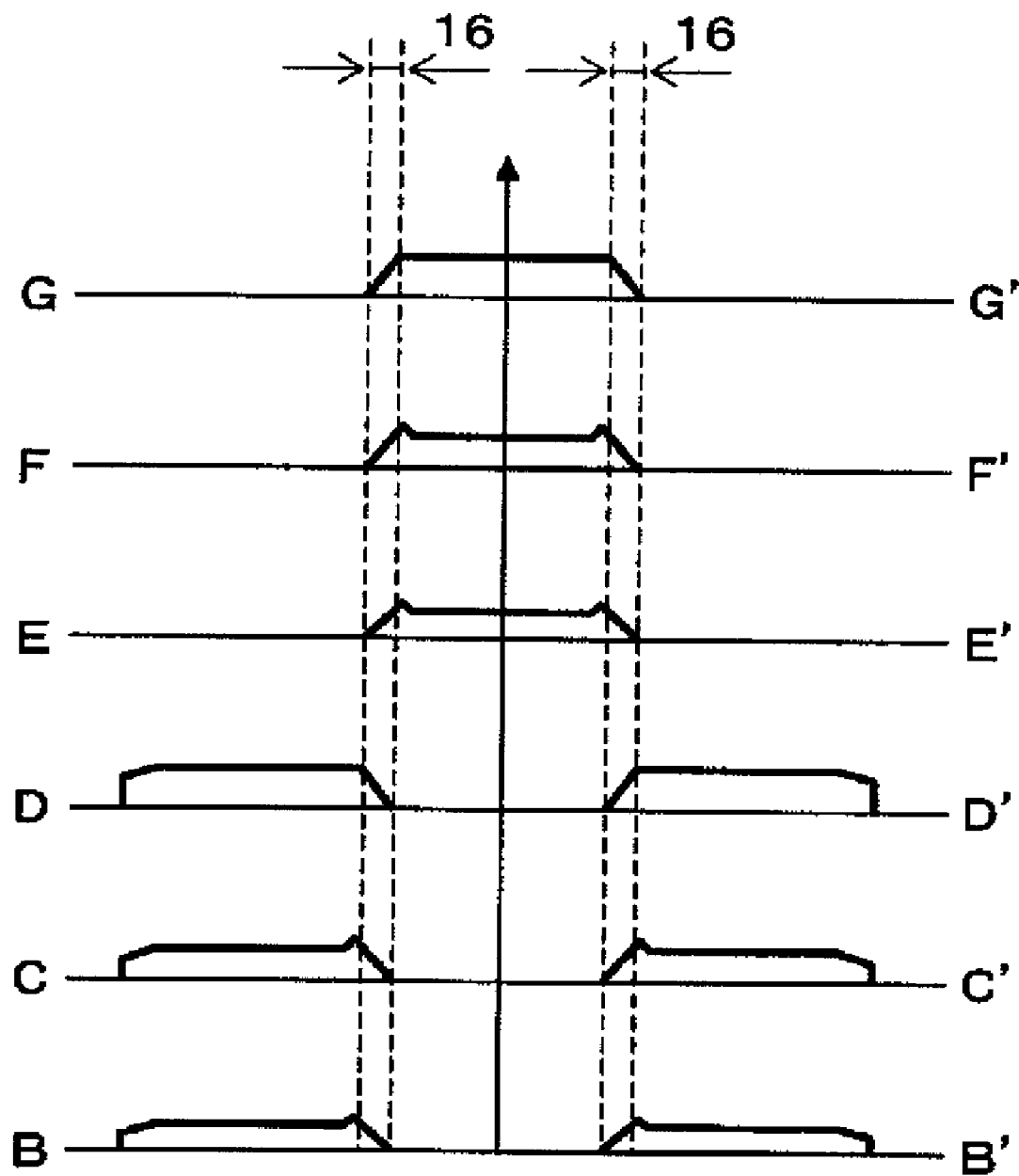
FIG. 2G is a schematic graph illustrating an example of distribution of height of reflective protrusions along the lines B-B' C-C', D-D', E-E', F-F', and G-G' of FIG. 2F.

FIG. 2A is a schematic plan view illustrating an example of the planar structure of a first light source unit group, the first lens waveguide, and the first light guide plate. FIG. 2B is an enlarged schematic plan view supplementing the illustration of the planar structure of FIG. 2A. FIG. 2C is a schematic plan view illustrating an example of the planar structure of a second light source unit group, the second lens waveguide, and the second light guide plate. FIG. 2D is a schematic sectional view illustrating an example of the sectional structure of the liquid crystal display device which is taken along a line IID-IID of FIG. 2A. FIG. 2E is an enlarged schematic sectional view illustrating an example of the sectional structure of a light extracting structure provided in the light guide plates. FIG. 2F is a schematic plan view illustrating an example of the planar structure of the light extracting structure provided in the light guide plates. FIG. 2G is a schematic graph illustrating an example of distribution of height of reflective protrusions along lines B-B' C-C' D-D', E-E', F-F', and G-G' of FIG. 2F.

In the liquid crystal display device of the first embodiment, as described above, the white beam 15a emitted from the light source unit 1a exits toward the liquid crystal display panel 11 from the small areas $Q_{1,1}$ and $Q_{1,3}$ of the first light guide plate 5, the white beam 15b emitted from the light source unit 1b exits toward the liquid crystal display panel 11 from the small area $Q_{2,2}$ of the first light guide plate 5, and the white beam 15c emitted from the light source unit 1c exits toward the liquid crystal display panel 11 from the small areas $Q_{3,1}$ and $Q_{3,3}$ of the first light guide plate 5. The three light source units 1a, 1b, and 1c constitute the first light source unit group. The first light source unit group, the first lens waveguide 3, and the first light guide plate 5 are structured, for example, as illustrated in FIG. 2A.

The light source unit 1a is designed to include, for example, two white light sources $1a_1$ and $1a_2$ connected in series or in parallel. The light source unit 1b is designed to include, for example, one white light source. The light source unit 1c is designed to include, for example, two white light sources $1c_1$ and $1c_2$ connected in series or in parallel. For these five white light sources, white light sources that have the same light emission characteristics (e.g., in terms of color temperature of emitted white light and light emission efficiency) are used.

The white light source $1a_1$ emits a white beam $15a_1$. As illustrated in FIG. 2B, for example, the white beam $15a_1$ is reduced in divergence angle by light condensing means which is provided in the first lens waveguide 3 and includes a concave surface and a Fresnel lens, and thus converted into beams substantially parallel to one another (hereinafter referred to as parallel beams). The white beam $15a_1$ in the form of parallel beams then enters the block area QB1 of the first light guide plate 5. The white light source $1a_2$ emits a white beam $15a_2$. The white beam $15a_2$ is converted into parallel beams by light condensing means which is provided in the first lens waveguide 3 and includes a concave surface and a Fresnel lens, and then enters the block area QB1 of the first light guide plate 5. The white beams $15a_1$ and $15a_2$ enter the block area QB1 so as to complement each other while traveling through the block area QB1.

The white light source 1b emits the white beam 15b. The white beam 15b is converted into parallel beams by light condensing means which is provided in the first lens waveguide 3 and includes a concave surface and a Fresnel lens, and then enters the block area QB2 of the first light guide plate 5.

Similarly to the conversion of the white beams $15a_1$ and $15a_2$, the white beams $15c_1$ and $15c_2$ emitted from the white light sources $1c_1$ and $1c_2$ are each converted into parallel beams by light condensing means which is provided in the first lens waveguide 3 and includes a concave surface and a Fresnel lens, and then enter the block area QB3 of the first light guide plate 5.

The white beam 15a traveling through the block area QB1 is made up of the white beam $15a_1$, which is emitted from the white light source $1a_1$, and the white beam $15a_2$, which is emitted from the white light source $1a_2$. Therefore, when the white beams $15a_1$ and $15a_2$ are propagated through the block area QB1 so that the white beams $15a_1$ and $15a_2$ complement each other, a focal length $f_a$ of the Fresnel lenses of the light condensing means for converting the white beams $15a_1$ and $15a_2$ into parallel beams is half of a focal length $f_b$ of the Fresnel lens of the light condensing means for converting the white beam 15b into parallel beams as illustrated in FIG. 2B.

The area QA of the first light guide plate 5 which overlaps with the display area DA of the liquid crystal display panel 11 is divided into, for example, nine small areas $Q_{i,j}$ as illustrated in FIG. 2A. Five of the nine small areas, specifically, the small areas $Q_{1,1}$, $Q_{1,3}$, $Q_{2,2}$, $Q_{3,1}$ and $Q_{3,3}$, are provided with light extracting structures. The light extracting structures are structures for causing white light traveling through the first light guide plate 5 to exit toward the liquid crystal display panel 11. For example, reflective protrusions or reflective grooves provided on a surface opposite from a surface that faces the liquid crystal display panel 11 constitute the light extracting structures.

On the other hand, in the liquid crystal display device of the first embodiment, as described above, the white beam 15d emitted from the light source unit 1d exits toward the liquid crystal display panel 11 from the small area $R_{1,2}$ of the second light guide plate 6, the white beam 15e emitted from the light source unit 1e exits toward the liquid crystal display panel 11 from the small areas $R_{2,1}$ and $R_{2,3}$ of the second light guide plate 6, and the white beam 15f emitted from the light source unit 1f exits toward the liquid crystal display panel 11 from the small area $R_{3,2}$ of the second light guide plate 6. The three light source units 1d, 1e, and 1f constitute the second light source unit group. The second light source unit group, the second lens waveguide 4, and the second light guide plate 6 are structured, for example, as illustrated in FIG. 2C.

The light source unit 1d and the light source unit 1f are each designed to include, for example, one white light source. The light source unit 1e is designed to include, for example, two white light sources $1e_1$ and $1e_2$ connected in series or in parallel. For these four white light sources, white light sources that have the same light emission characteristics (e.g., in terms of color temperature of emitted white light and light emission efficiency) are used. The white light sources used for these four white light sources also have the same light emission characteristics as those of the white light sources used in the first light source unit group.

The white beam 15d emitted from the white light source 1d is converted into parallel beams by light condensing means which is provided in the second lens waveguide 4 and includes a concave surface and a Fresnel lens, and then enters the block area RB1 of the second light guide plate 6.

The white beam $15e_1$ emitted from the white light source $1e_1$ is converted into parallel beams by light condensing means which is provided in the second lens waveguide 4 and includes a concave surface and a Fresnel lens, and then enters the block area RB2 of the second light guide plate 6. The white beam $15e_2$ emitted from the white light source $1e_2$ is converted into parallel beams by light condensing means which is provided in the second lens waveguide 4 and includes a concave surface and a Fresnel lens, and then enters the block area RB2 of the second light guide plate 6. The white beams $15e_1$ and $15e_2$ enter the block area RB2 so as to complement each other while traveling through the block area RB2.

Similarly to the conversion of the white beam 15d, the white beam 15f emitted from the white light source 1f is converted into parallel beams by light condensing means which is provided in the second lens waveguide 4 and includes a concave surface and a Fresnel lens, and then enters the block area RB3 of the second light guide plate 6.

The white beam 15e traveling through the block area RB2 is made up of the white beam $15e_1$, which is emitted from the white light source $1e_1$, and the white beam $15e_2$, which is emitted from the white light source $1e_2$. Therefore, when the white beams $15e_1$ and $15e_2$ are propagated through the block area RB2 so that the white beams $15e_1$ and $15e_2$ complement each other, a focal length of the Fresnel lenses of the light condensing means for converting the white beams $15e_1$ and $15e_2$ into parallel beams is half a focal length of the Fresnel lens of the light condensing means for converting the white beam 15d into parallel beams.

The area RA of the second light guide plate 6 which overlaps with the display area DA of the liquid crystal display panel 11 is divided into, for example, nine small areas $R_{i,j}$ as illustrated in FIG. 2C. Four of the nine small areas, specifically, the small areas $R_{1,2}$, $R_{2,1}$, $R_{2,3}$, and $R_{3,2}$, are provided with light extracting structures. The light extracting structures are structures for causing white light traveling through the second light guide plate 6 to exit toward the liquid crystal display panel 11. For example, reflective protrusions or reflective grooves provided on a surface opposite from a surface that faces the liquid crystal display panel 11 constitute the light extracting structures.

When the first light source unit group, the first lens waveguide 3, the first light guide plate 5, the second light source unit group, the second lens waveguide 4, and the second light guide plate 6 are structured as above, the white beam 15b entering the block area QB2 of the first light guide plate 5 and the white beam 15e entering the block area RB2 of the second light guide plate 6 exit toward the liquid crystal display panel 11 in ways illustrated in FIG. 2D, respectively.

The white beam 15b entering the block area QB2 of the first light guide plate 5 is propagated while being totally reflected by a surface that faces the liquid crystal display panel 11 and by its opposite surface. During the propagation, the white beam 15b hardly exits from the small areas $Q_{2,1}$ and $Q_{2,3}$, which are provided with no light extracting structures.

The small area $Q_{2,2}$, on the other hand, has reflective protrusions 5c, which are a type of light extracting structure, placed at given intervals. The white beam 15b reflected by the reflective protrusions 5c is reduced in angle of incidence with respect to the surface that faces the liquid crystal display panel 11, and exits toward the liquid crystal display panel 11.

Part of the white beam 15b entering the block area QB2 does not exit from the small area $Q_{2,2}$ but travels through the small area $Q_{2,3}$ and reaches a side surface 5b, which is opposite from an incidence side surface 5a. For that reason, the opposite side surface 5b of the first light guide plate 5 is provided with a reflective film, so that the white beam 15b that has reached the opposite side surface 5b is propagated in the reverse direction. This way, part of the white beam 15b reflected by the reflective film exits from the small area $Q_{2,2}$ and the utilization efficiency of the white beam 15b is accordingly enhanced. The opposite side surface 5b is desirably, for example, an arced side surface as illustrated in FIG. 2A. This prevents the white beam from spreading to other block areas and consequently lowering the utilization efficiency of the light.

Further, when the employed light extracting structures are the reflective protrusions 5c, both sloped surfaces of each reflective protrusion 5c desirably have, for example, an angle α as illustrated in FIG. 2E in order to improve the efficiency in extracting the white beam 15b that travels in the +y direction and the efficiency in extracting the white beam 15b that travels in the −y direction. The sloped surface angle α is desirably from 10° to 20°, for example.

The white beam 15e entering the block area RB2 of the second light guide plate 6 is propagated while being totally reflected by a surface that faces the liquid crystal display panel 11 and by its opposite surface. The small area $R_{2,1}$ has reflective protrusions which are a type of light extracting structure and placed at given intervals. The white beam 15e that is reflected by the reflective protrusions exits toward the liquid crystal display panel 11. The white beam 15e that has exited from the small area $R_{2,1}$ is transmitted through the small area $Q_{2,1}$ of the first light guide plate 5 at a high transmittance as described above.

The white light 15e that has not been reflected by the reflective protrusions in the process of being propagated through the small area $R_{2,1}$ reaches the small area $R_{2,3}$. The small area $R_{2,3}$ has reflective protrusions 6c which are a type of light extracting structure and placed at given intervals. The white beam 15e that is reflected by the reflective protrusions exits toward the liquid crystal display panel 11. The white beam 15e that has exited from the small area $R_{2,3}$ is transmitted through the small area $Q_{2,3}$ of the first light guide plate 5 at a high transmittance as described above.

Part of the white beam 15e entering the block area RB2 does not exit from the small areas $R_{2,1}$ and $R_{2,3}$ but reaches a side surface 6b, which is opposite from an incidence side surface 6a. For that reason, the opposite side surface 6b of the first light guide plate 6 is provided with a reflective film, so that the white beam 15e that has reached the opposite side surface 6b is propagated in the reverse direction. This way, part of the white beam 15e reflected by the reflective film exits from the small areas $R_{2,1}$ and $R_{2,3}$ and the utilization efficiency of the white beam 15e is accordingly enhanced. The opposite side surface 6b is desirably, for example, an arced side surface as illustrated in FIG. 2C. This prevents the white beam from spreading to other block areas and consequently lowering the utilization efficiency of the light.

In the first light guide plate 5, the areal dimension of the small areas of the block area QB1 from which the white beam 15a exits and the areal dimension of the small areas of the block area QB3 from which the white beam 15c exits are each twice larger than the areal dimension of the small area of the block area QB2 from which the white beam 15b exits. If the five white light sources $1a_1$, $1a_2$, $1b$, $1c_1$, and $1c_2$ have the same light emission efficiency in this case, inputting the same drive current to each of the white light sources makes the light amount of the white beam 15a entering the block area QB1 and the light amount of the white beam 15c entering the block area QB3 each approximately twice the light amount of the white beam 15b entering the block area QB2. Therefore, when the five white light sources $1a_1$, $1a_2$, $1b$, $1c_1$, and $1c_2$ have the same light emission efficiency, white beams exiting the five small areas $Q_{1,1}$, $Q_{1,3}$, $Q_{2,2}$, $Q_{3,1}$, and $Q_{3,3}$ of the first light guide plate 5 can have a substantially equal luminance by inputting the same drive current to each of the white light sources. Also, inputting different drive currents that satisfy a given ratio to the white light sources makes the ratio of the luminances of white beams exiting the five small areas $Q_{1,1}$, $Q_{1,3}$, $Q_{2,2}$, $Q_{3,1}$, and $Q_{3,3}$ of the first light guide plate 5 substantially equal to the drive current ratio.

In the second light guide plate 6, the areal dimension of the small areas of the block area RB2 from which the white beam 15e exits is twice larger than the areal dimension of the small area of the block area RB1 from which the white beam 15d exits and the areal dimension of the small area of the block area RB3 from which the white beam 15f exits. If the four white light sources $1d$, $1e_1$, $1e_2$, and $1f$, have the same light emission efficiency in this case, inputting the same drive current to each of the white light sources makes the light amount of the white beam 15e entering the block area RB2 approximately twice the light amount of the white beam 15d entering the block area RB1 and the light amount of the white beam 15f entering the block area RB3. Therefore, when the four white light sources $1d$, $1e_1$, $1e_2$, and $1f$ have the same light emission efficiency, white beams exiting the four small areas $R_{1,2}$, $R_{2,1}$, $R_{2,3}$, and $R_{3,2}$ of the second light guide plate 6 can have a substantially equal luminance by, for example, inputting the same drive current to each of the white light sources. Also, inputting different drive currents that satisfy a given ratio to the white light sources makes the ratio of the luminances of white beams exiting the four small areas $R_{1,2}$, $R_{2,1}$, $R_{2,3}$, and $R_{3,2}$ of the second light guide plate 6 substantially equal to the drive current ratio.

When the first light source unit group (light source units $1a$, $1b$, and $1c$) and the first lens waveguide 3 are structured as illustrated in FIG. 2A and the second light source unit group (light source units $1d$, $1e$, and $1f$) and the second lens waveguide 4 are structured as illustrated in FIG. 2C, the distance from the incidence side surface 5a of the first light guide plate 5 to the light source unit $1b$, for example, differs from the distance from the incidence side surface 6a of the second light guide plate 6 to the light source unit $1e$. Accordingly, even when the light source units $1b$ and $1e$ are thicker than the first light guide plate 5 and the second light guide plate 6, for example, the light source units $1b$ and $1e$ can be disposed without the fear of interference, which allows the gap between the first light guide plate 5 and the second light guide plate 6 to be narrow.

The white beams 15a, 15b, and 15c converted into parallel beams by the Fresnel lenses that are provided in the first lens waveguide 3 have an intensity distribution within the plane of the first light guide plate 5. The intensity distribution causes local changes in luminance of a white beam emitted from the first light guide plate 5, and the local changes may be perceived as unevenness in a displayed image. When the light extracting structures provided in the first light guide plate 5 are the reflective protrusions 5c, it is therefore desired to adjust the intensity of light that is extracted from the first light guide plate 5 by, for example, varying the height of the reflective protrusions 5c as illustrated in FIGS. 2F and 2G.

Specifically, when the first light guide plate 5 is provided with the reflective protrusions 5c, each reflective protrusion 5c has a protrusion height which is varied depending on location to reflect the intensity of a white beam at the location of the reflective protrusion 5c. The protrusion height is set short at a location where the light intensity is high and set tall at a location where the light intensity is low. A white beam entering the first light guide plate 5 is generally intense at a location close to the incidence side surface 5a, and its light amount decreases as the distance from the incidence side surface 5a grows. The liquid crystal display device of the first embodiment therefore ensures, for each small area, the surface luminance evenness of the luminances of white beams exiting the small areas $Q_{1,1}$, $Q_{1,3}$, $Q_{2,2}$, $Q_{3,1}$, and $Q_{3,3}$, respectively, by making the reflective protrusions 5c taller as the distance from the incidence side surface 5a increases as illustrated in FIGS. 2F and 2G.

It is preferable to the formation location and height of each reflective protrusion 5c so that the surface luminance evenness of the luminances of white beams exiting the small areas $Q_{1,1}$, $Q_{1,3}$, $Q_{2,2}$, $Q_{3,1}$, and $Q_{3,3}$ is ensured for each small area considering white beams that are reflected by the arced side surface 5b of the first light guide plate 5 which is opposite from the incidence side surface 5a as well.

In addition, the luminances of white beams exiting the small areas $Q_{1,1}$, $Q_{1,3}$, $Q_{2,2}$, $Q_{3,1}$, and $Q_{3,3}$ may also be made even by, for example, varying the interval between the reflective protrusions 5c, instead of giving a varying height to each reflective protrusion 5c.

Although it is not illustrated in the drawings, the same applies to a case where the second light guide plate 6 is provided with the reflective protrusions 6c. That is, the surface luminance evenness of the luminances of white beams exiting the small areas $R_{1,2}$, $R_{2,1}$, $R_{2,3}$, and $R_{3,2}$ is ensured for each small area by making the reflective protrusions 6c taller with the distance from the incidence side surface Ga.

Further, when the first light guide plate 5 and the second light guide plate 6 are provided with reflective protrusions, it is preferable to provide a reflective protrusion overlapping portion 16, where the reflective protrusions 5c of the first light guide plate 5 and the reflective protrusions 6c of the second light guide plate 6 overlap with each other. The reflective protrusions 5c and 6c in the reflective protrusion overlapping portion 16 have a height that becomes gradually shorter. This way, the luminance in the reflective protrusion overlapping portion 16 gradually decreases toward the border between two small areas, thereby preventing a rapid change in luminance at the border and providing an effect that the border is obscured.

The height of the reflective protrusions 5c and 6c in the reflective protrusion overlapping portion 16 is also set such that a given luminance is obtained when the small area of the first light guide plate 5 that constitutes part of the reflective protrusion overlapping portion 16 and the small area of the second light guide plate 6 that constitutes part of the reflective protrusion overlapping portion 16 are both lit.

Thus, by providing a reflective protrusion overlapping portion and by providing a luminance gradient based on the shape of the reflective protrusions thereof the amount of luminance change at the border between small areas (e.g., the border between the small area $D_{1,2}$ and the small area $D_{2,2}$) is reduced.

In the case where there is still an unwanted luminance change at the border between small areas or in other places despite the reflective protrusions 5c and 6c being arranged as described above, luminance evenness may be secured by, for example, adjusting the transmittance of that part of the liquid crystal display panel 11. In the case where white light strays into an adjacent small area, the light amount of the stray light should be taken into account as well in determining the transmittance of the liquid crystal display panel 11.

The reflective protrusions 5c that are provided in small areas that constitute the perimeter of the area QA, such as the small areas $Q_{1,1}$, $Q_{1,3}$, $Q_{3,1}$, and $Q_{3,3}$, may be shaped such that a protrusion end on the perimeter side of the first light guide plate 5 becomes gradually shorter toward the perimeter as illustrated in the height distribution of FIG. 2G along the lines B-B', C-C', and D-D'.

The surface luminances of white beams emitted from the small areas $Q_{1,1}$, $Q_{1,3}$, $Q_{3,1}$, and $Q_{3,3}$ decrease gradually toward the perimeter. The luminance of a planar beam entering the liquid crystal display panel 11 is therefore lower at the perimeter than at the center. However, the luminance drop at the perimeter from the luminance at the center is not so noticeable when the luminance change from the center to the perimeter is not sharp. Thus, creating a luminance gradient so that the luminance gradually decreases toward the perimeter leads to reduce power consumption.

Figure 3A:
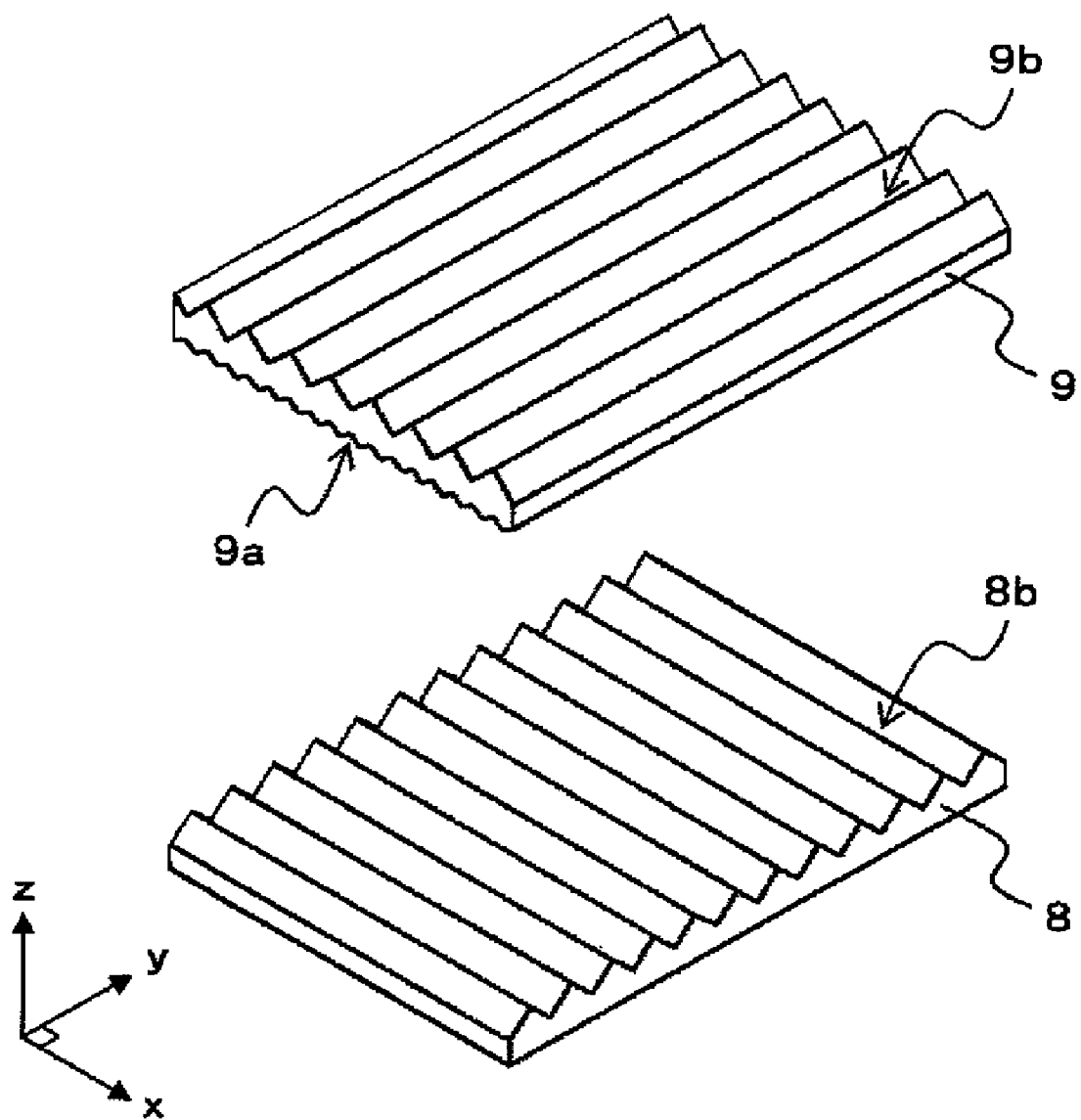
FIG. 3A is a schematic perspective view illustrating an example of schematic structures of a prism sheet and a prism sheet with light diffusing function.
Figure 3B:
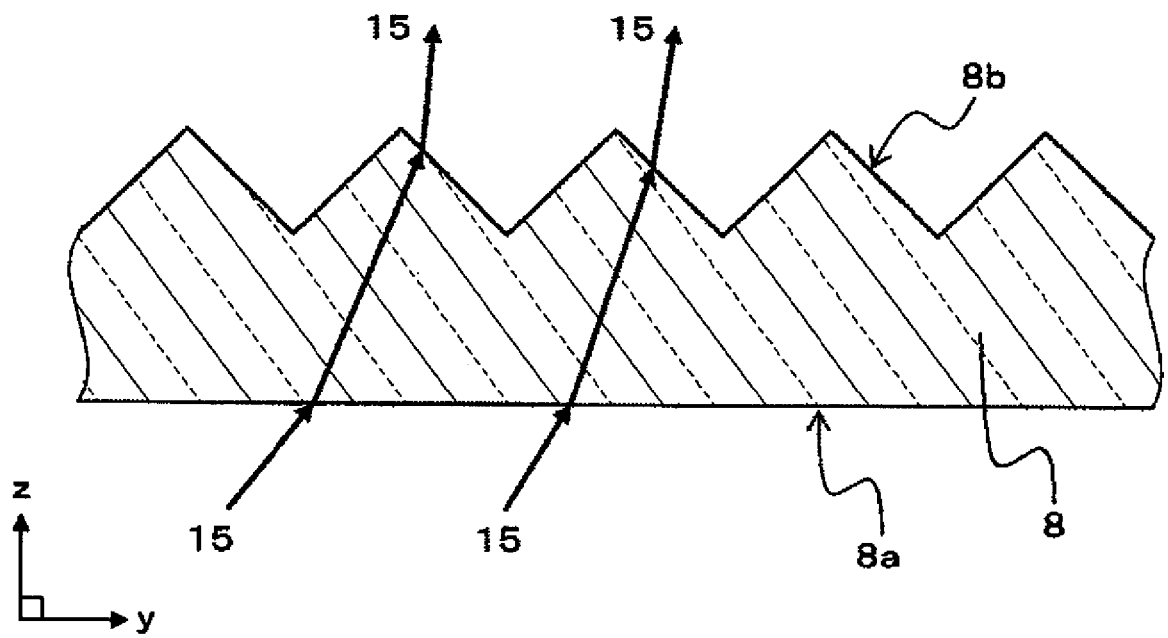
FIG. 3B is a schematic sectional view supplementing illustration of the structure of the prism sheet of FIG. 3A.
Figure 3C:
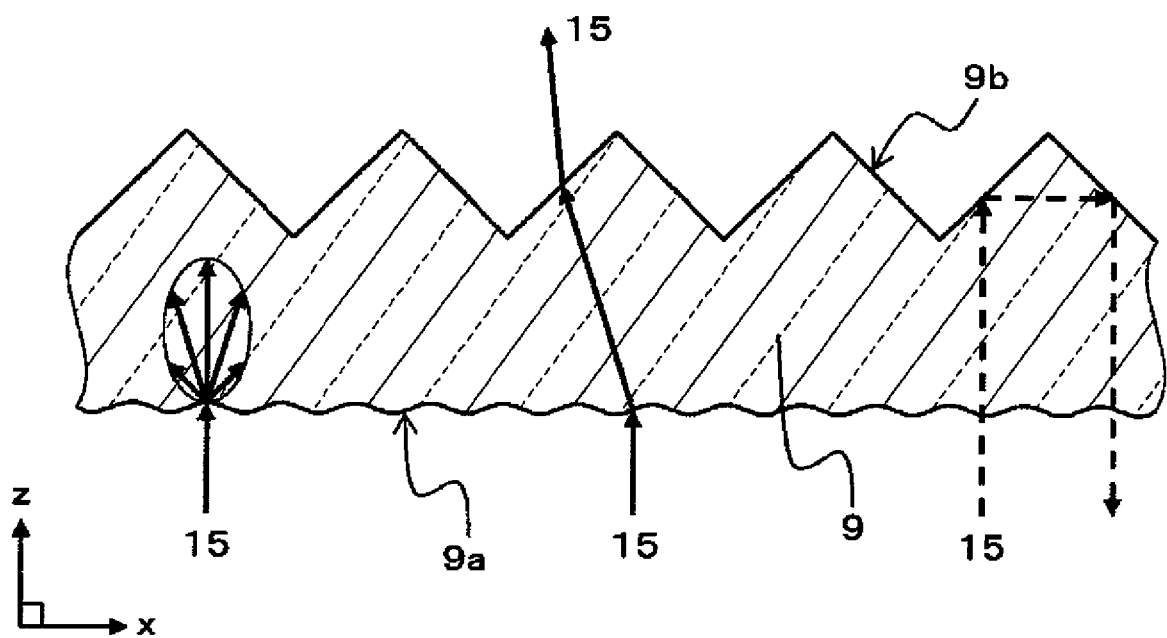
FIG. 3C is a schematic sectional view supplementing illustration of the structure of the prism sheet with light diffusing function of FIG. 3A.

FIGS. 3A to 3C are schematic diagrams illustrating an example of schematic structures of the prism sheet and the prism sheet with light diffusing function in the liquid crystal display device of the first embodiment.

FIG. 3A is a schematic perspective view illustrating an example of the schematic structures of the prism sheet and the prism sheet with light diffusing function. FIG. 3B is a schematic sectional view supplementing the illustration of the structure of the prism sheet of FIG. 3A. FIG. 3C is a schematic sectional view supplementing the illustration of the structure of the prism sheet with light diffusing function of FIG. 3A.

Note that FIG. 3B is a schematic sectional view illustrating an example of a sectional structure of the prism sheet which is taken along a yz plane. Further, FIG. 3C is a schematic sectional view illustrating an example of a sectional structure of the prism sheet with light diffusing function which is taken along an xz plane.

In the liquid crystal display device of the first embodiment, the white beams 15a, 15b, and 15c exiting the first light guide plate 5 and the white beams 15d, 15e, and 15f which have exited the second light guide plate 6 passed through the first light guide plate 5 are adjusted in surface luminance by the light diffusing sheet 7, the prism sheet 8, and the prism sheet with light diffusing function 9, and then enter the liquid crystal display panel 11.

The light diffusing sheet 7 is a light diffusing sheet used in a conventional transmissive, or transflective, liquid crystal display device. A description on the structure of the light diffusing sheet 7 is therefore omitted in the first embodiment.

The prism sheet 8 is placed so that, for example, as illustrated in FIGS. 3A and 3B, prism ridge lines run in the x direction, namely, in a direction parallel to the incidence side surface 5a of the first light guide plate 5 and the incidence side surface 6a of the second light guide plate 6. The divergence of a white beam passing through the light diffusing sheet 7 and entering the prism sheet 8 is large in the propagation direction of the white beam within the light guide plates (y direction) and small in a direction perpendicular to the propagation direction (x direction).

The liquid crystal display device of the first embodiment first reduces the divergence of the white beam in the y direction by aligning the ridge lines of the prism sheet 8 in the x direction and refracting the white beam entering the prism sheet 8 at the incidence surface and the prism surface. The surface luminance and the luminance viewing angle in the y direction are thus adjusted.

Light exiting the prism sheet 8 passes through the prism sheet with light diffusing function 9, which is placed so that, for example, as illustrated in FIGS. 3A and 3C, ridge lines are aligned in the y direction, namely, in a direction parallel to the propagation direction of a white beam within the light guide plates.

The prism sheet with light diffusing function 9 adjusts the divergence of the white beam in the x direction, to thereby adjust the surface luminance and the luminance viewing angle in the x direction.

However, a white beam exiting the first light guide plate 5 is small in divergence in the x direction and high in directivity. Therefore, if an incidence surface of the prism sheet with light diffusing function 9 is a flat surface as in the prism sheet 8, the white beam entering the prism sheet with light diffusing function 9 is, for example, reflected at the prism surface back to the light guide plate side as indicated by the broken line in FIG. 3C.

The liquid crystal display device of the first embodiment avoids this by making the incidence surface of the prism sheet with light diffusing function 9 an anisotropic diffusion surface as illustrated in FIG. 3C. The anisotropic diffusion surface diffuses the white beam entering the prism sheet with light diffusing function 9, thereby increasing the divergence in the x direction. The divergence of the white beam in the x direction is thus adjusted by the prism sheet with light diffusing function 9, and the surface luminance and luminance viewing angle in the x direction are adjusted as a result.

Further, using the prism sheet with light diffusing function 9 also increases the light amount of a white beam that passes through the prism sheet with light diffusing function 9 and exits toward the liquid crystal display panel 11.

The liquid crystal display device of the first embodiment uses the prism sheet 8 and the prism sheet with light diffusing function 9 to adjust the surface luminance and luminance viewing angle of a white beam. However, instead of the prism sheet with light diffusing function 9, an anisotropic diffusion sheet interposed between two prism sheets having flat light incidence surfaces may be used to adjust the surface luminance and luminance viewing angle of a white beam that exits the first light guide plate 5. Alternatively, the liquid crystal display device of the first embodiment may have the light diffusing sheet 7 that causes anisotropic diffusion, instead of using the prism sheet with light diffusing function 9 or the anisotropic diffusion sheet.

As has been described, the liquid crystal display device of the first embodiment can control the surface luminance of a planar beam of light for irradiating the liquid crystal display panel 11 two-dimensionally. An example of resultant effects is that the liquid crystal display device of the first embodiment can keep power consumption low.

The liquid crystal display device of the first embodiment is also capable of reducing the amount of discontinuous change in luminance at the border between two small areas (e.g., the border between the small area $D_{1,2}$ and the small area $D_{2,2}$) in the display area DA where white beams from different light source units enter.

The liquid crystal display device of the first embodiment is further capable of enhancing the utilization efficiency of a white beam emitted from each light source unit.

When the number of light guide plates is given as m and the number of areas into which each light guide plate is divided is given as n, (m×n) two-dimensionally separated small areas are obtained in total. The luminances of these small areas can be controlled substantially independently of one another by varying the light emission amount among light source units.

The light guide plates can be divided into more areas along a direction in which the light source units are aligned (x direction) by increasing the number of light source units. The practical number of small areas into which each light guide plate is divided along the propagation direction of the white beam (y direction) is dependent on the number m of light guide plates. However, because light extracting structures (e.g., reflective protrusions) provided in a light guide plate can be divided more finely within an area created by dividing the light guide plate, finer areas can be created spuriously.

In the liquid crystal display device of the first embodiment, two light guide plates, that is, the first light guide plate 5 and the second light guide plate 6, are stacked, and hence the light guide plates should be divided in the propagation direction of a white beam (y direction) into two areas practically, but divided into three areas spuriously. By thus dividing into an odd number of areas, an independent small area (small area $D_{2,2}$) is created at the center of the display area DA. This enables the liquid crystal display device of the first embodiment to avoid having the border between small areas where the luminance changes around the center of the display area DA, with the result that the luminance hardly changes at the center. Accordingly, a luminance difference between adjoining small areas (e.g., the small area $D_{1,2}$ and the small area $D_{2,2}$), if any, is indistinctive.

The first embodiment deals with a case where the first light guide plate 5 is placed between the liquid crystal display panel 11 and the second light guide plate 6. The arrangement of the first light guide plate 5 and the second light guide plate 6 is not limited thereto, and the second light guide plate 6 may be placed between the liquid crystal display panel 11 and the first light guide plate 5. However, when the second light guide plate 6 is placed between the liquid crystal display panel 11 and the first light guide plate 5, the white beam 15b which is to enter the center (small area $D_{2,2}$) of the display area DA enters the liquid crystal display panel 11 after exiting the small area $Q_{2,2}$ of the first light guide plate 5 and passing through the small area $R_{2,2}$ of the second light guide plate 6. By passing through the second light guide plate 6, the white beam 15b which is to enter the small area $D_{2,2}$ is reduced in light amount. Placing the first light guide plate 5 between the liquid crystal display panel 11 and the second light guide plate 6 is therefore desired from the view point of giving the white beam 15b entering the small area $D_{2,2}$ a high luminance.

In the first embodiment, the first light source unit group is structured as illustrated in, for example, FIG. 2A, where the light source unit 1b includes one white light source and the light source units 1a and 1c each include two white light sources. However, the structure of the first light source unit group is not limited thereto, and it is sufficient if, for example, the ratio of the number of white light sources in the light source unit 1b and the number of light sources in each of the light source units 1a and 1c is 1:2, which is the areal ratio of the areas from which the light beams are extracted. For instance, the first light source unit group may include the light source unit 1b that is constituted of two white light sources and the light source units 1a and 1c that are each constituted of four white light sources.

The same applies to the structure of the second light source unit group, and the description is not repeated.

Figure 4A:
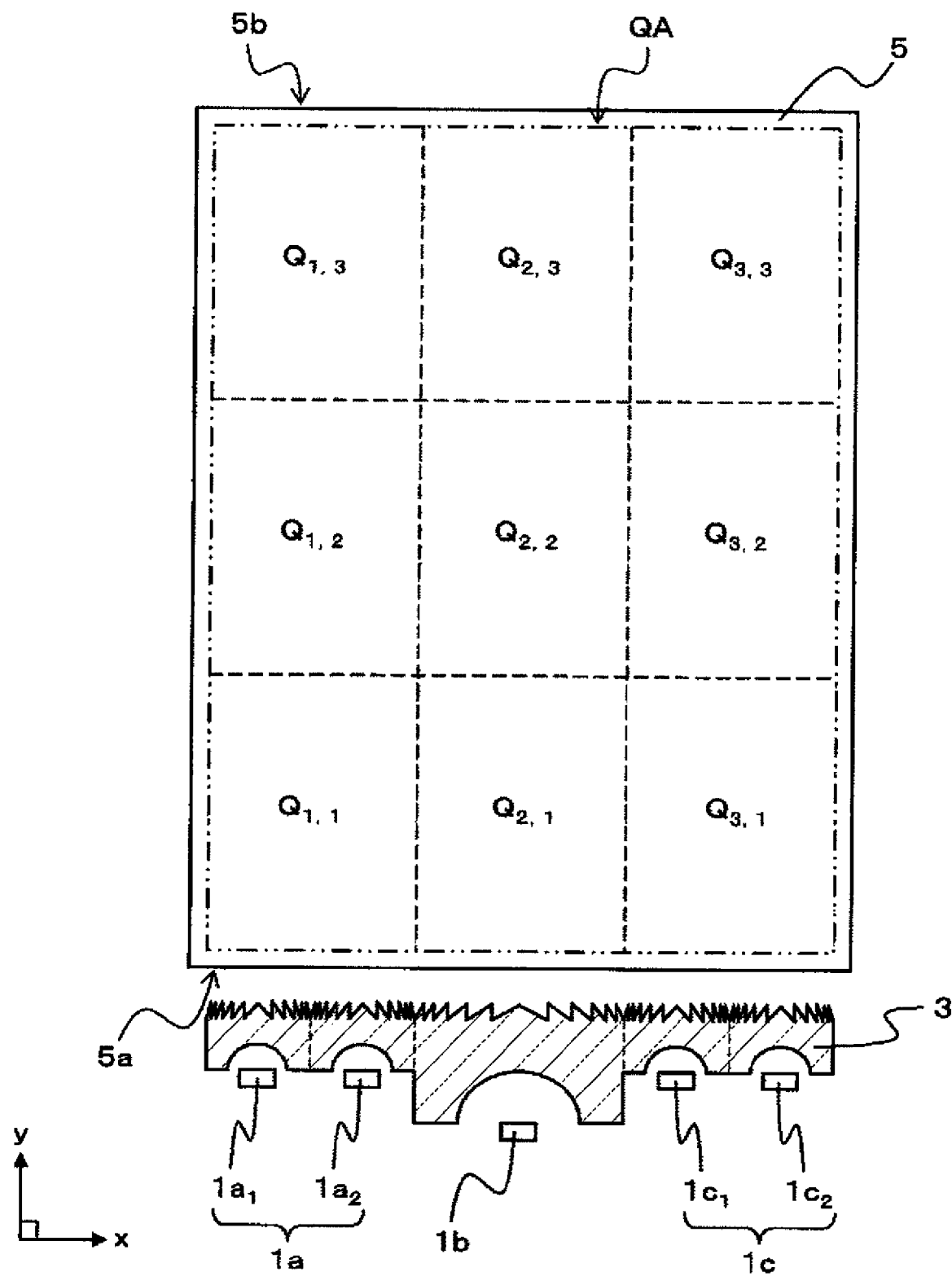
FIG. 4A is a schematic plan view illustrating a modification example of a planar structure of the first light guide plate.
Figure 4B:
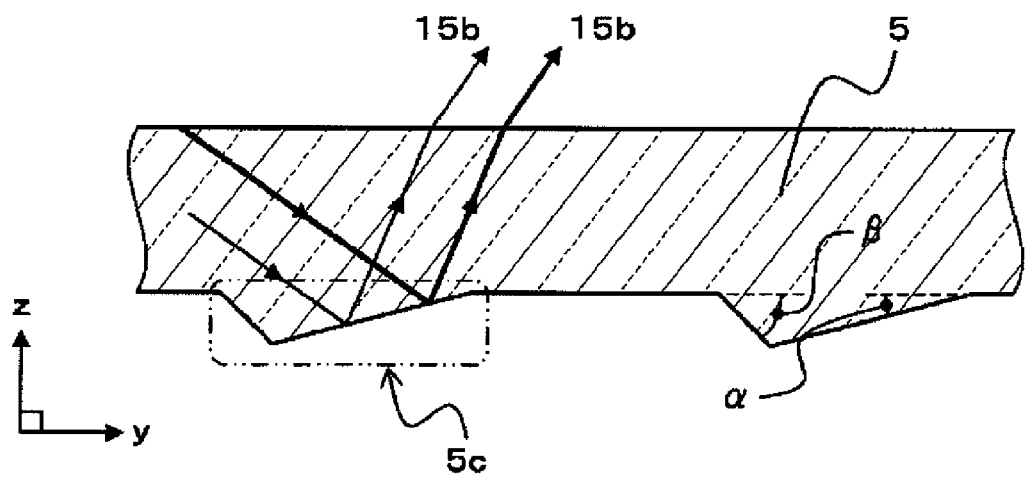
FIG. 4B is a schematic sectional view illustrating a modification example of the reflective protrusions provided in the first light guide plate.

FIGS. 4A and 4B are schematic diagrams illustrating a modification example of the light guide plates of the liquid crystal display device of the first embodiment.

FIG. 4A is a schematic plan view illustrating a modification example of a planar structure of the first light guide plate.

FIG. 4B is a schematic sectional view illustrating a modification example of the reflective protrusions provided to the first light guide plate.

In the liquid crystal display device of the first embodiment, as an example of the planar shape of the first light guide plate 5, the side surface 5b opposite from the incidence side surface 5a is an arced surface as illustrated in FIG. 2A. However, the opposite side surface 5b of the first light guide plate 5 is not limited thereto and may be a flat side surface as illustrated in FIG. 4A.

Though not illustrated in a drawing, the same applies to the second light guide plate 6 and the side surface 6b opposite from the incidence side surface 6a may be a flat surface.

The liquid crystal display device of the first embodiment has the symmetrical reflective protrusion 5c with two sloped surfaces both having a slope angle of α as illustrated in FIG. 2E as an example of a light extracting structure provided in the first light guide plate 5. However, the reflective protrusion 5c is not limited thereto, and may be, for example, an asymmetrical reflective protrusion 5c illustrated in FIG. 4B, in which a sloped surface that reflects a white beam traveling in the +y direction has an angle α and a sloped surface that reflects a white beam traveling in the −y direction has an angle β.

Though not illustrated in a drawing, the same applies to the second light guide plate 6, and the reflective protrusion provided as a light extracting structure in the second light guide plate 6 may have an asymmetrical shape as in FIG. 4B.

The light extracting structures provided in the first light guide plate 5 and the second light guide plate 6 are not limited to the reflective protrusions described above and, though not illustrated in a drawing, may be reflective grooves or may be convex curved surfaces or concave curved surfaces arranged in matrix.

Figure 5:
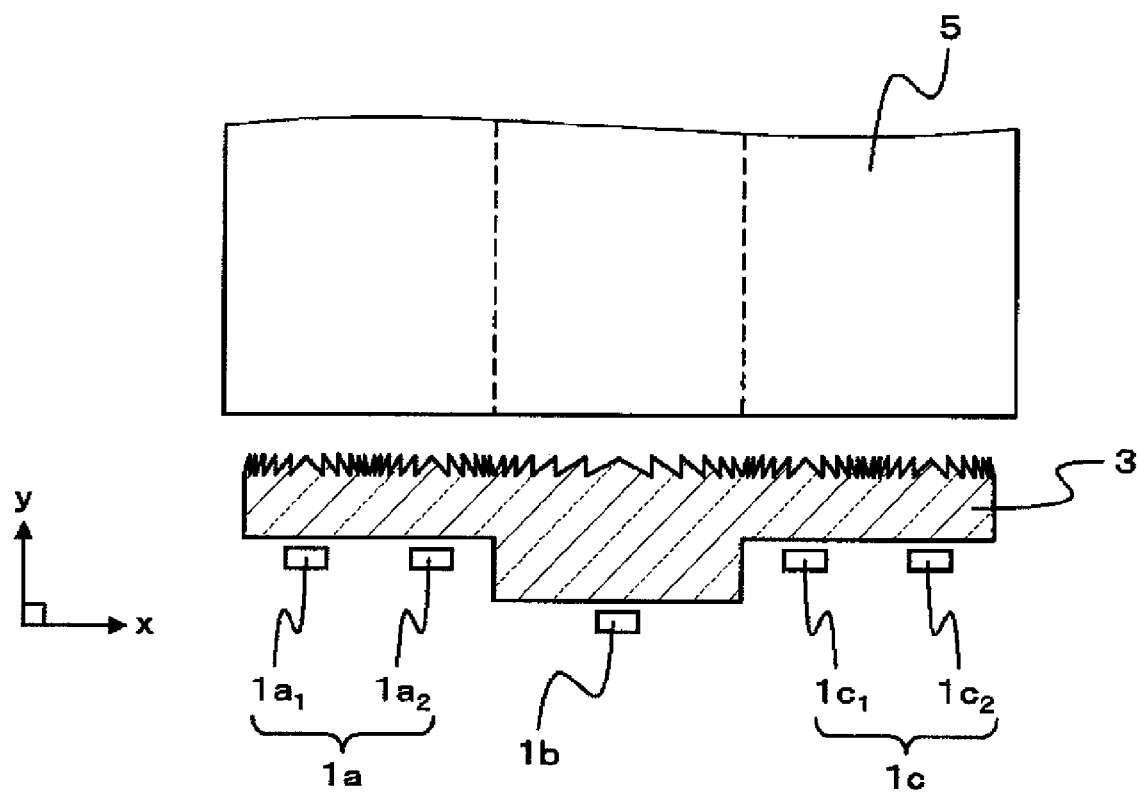
FIG. 5 is a schematic plan view illustrating a modification example of the first lens waveguide of the liquid crystal display device of the first embodiment.

FIG. 5 is a schematic plan view illustrating a modification example of the first lens waveguide of the liquid crystal display device of the first embodiment.

In the liquid crystal display device of the first embodiment, as an example of the structure of the first lens waveguide 3 the first lens waveguide 3 has a concave surface on a surface that faces the light source units 1a, 1b, and 1c (white light sources) and Fresnel lenses on its opposite surface (surface that faces the first light guide plate 5) as illustrated in FIG. 2A. The first lens waveguide 3 may instead be structured, for example, as illustrated in FIG. 5 in which the surface that faces the light source units 1a, 1b, and 1c (white light sources) is a flat surface and its opposite surface (surface that faces the first light guide plate 5) has Fresnel lenses.

Though not illustrated in a drawing, the same applies to the second lens waveguide 4 and a surface that faces the light source units 1d, 1e, and 1f (white light sources) may be a flat surface.

Figure 6:
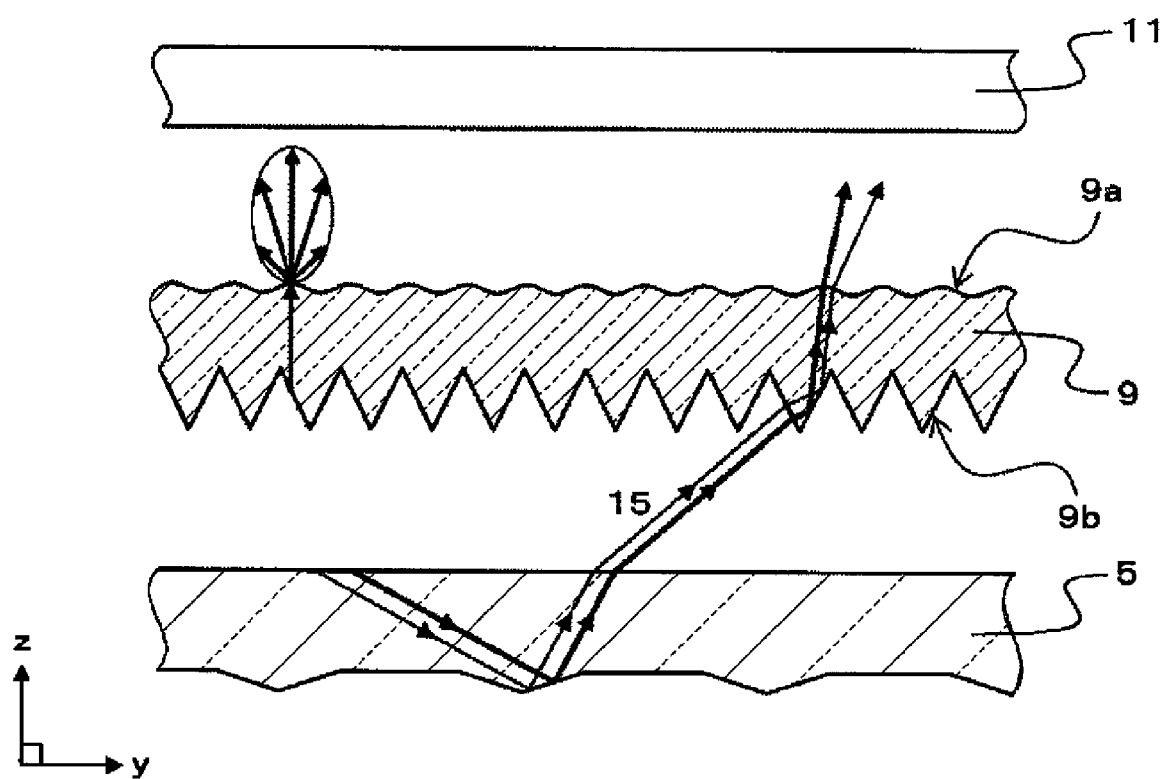
FIG. 6 is a schematic sectional view illustrating a modification example of optical sheets placed between a liquid crystal display panel and the first light guide plate in the liquid crystal display device of the first embodiment.

FIG. 6 is a schematic sectional view illustrating a modification example of the optical sheets placed between the liquid crystal display panel 11 and the first light guide plate in the liquid crystal display device of the first embodiment.

In the liquid crystal display device of the first embodiment, optical sheets of three different types, that is, the light diffusing sheet 7, the prism sheet 8, and the prism sheet with light diffusing function 9, are placed between the first light guide plate 5 and the liquid crystal display panel 11. However, the structure of the optical sheets placed between the first light guide plate 5 and the liquid crystal display panel 11 is not limited thereto. For instance, the prism sheet with light diffusing function 9 alone may be disposed such that a prism surface 9b is on the side of the first light guide plate 5 while an anisotropic diffusion surface 9a is on the side of the liquid crystal display panel 11 as illustrated in FIG. 6. In this case, a white beam exiting the first light guide plate 5 is raised by the prism surface 9b of the prism sheet with light diffusing function 9, and then diffused by the anisotropic diffusion surface 9a to have a larger divergence angle in the x direction.

Note that in the liquid crystal display device of the first embodiment, the optical sheets placed between the first light guide plate 5 and the liquid crystal display panel 11 can be changed to different types to suit individual cases. For example, a lenticular lens sheet or a microlens array may be disposed instead.

In the case where the prism sheet with light diffusing function 9 is replaced with a lenticular lens sheet in the liquid crystal display device of the first embodiment, light is desirably refracted to be directed in a front direction by for example, changing the prism shape of the prism sheet 8 so that the refraction angle of the prism is increased. The lenticular lens sheet should have a light condensing property in a direction in which the directivity is high (the x direction in the liquid crystal display device of the first embodiment). Lenses of the lenticular lens sheet may have the same cycle as, for example, the pixel pitch or sub-pixel pitch of the liquid crystal display panel 11, so that light is condensed onto open areas of the pixels of the liquid crystal display panel 11.

Second Embodiment

Figure 7A:
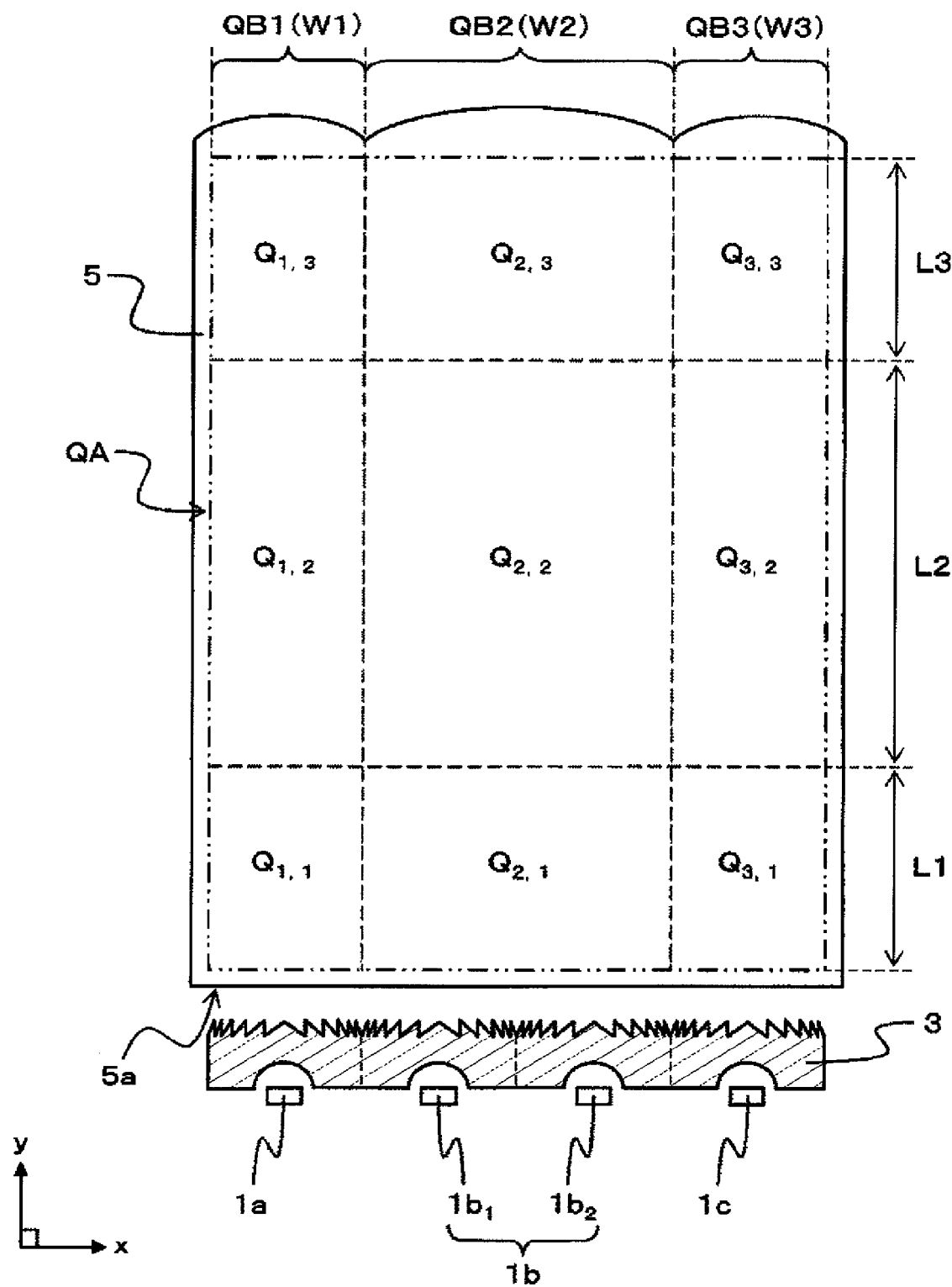
FIG. 7A is a schematic plan view illustrating an example of schematic structures of a first light source unit group, a first lens waveguide, and a first light guide plate of a liquid crystal display device according to a second embodiment of the present invention.
Figure 7B:
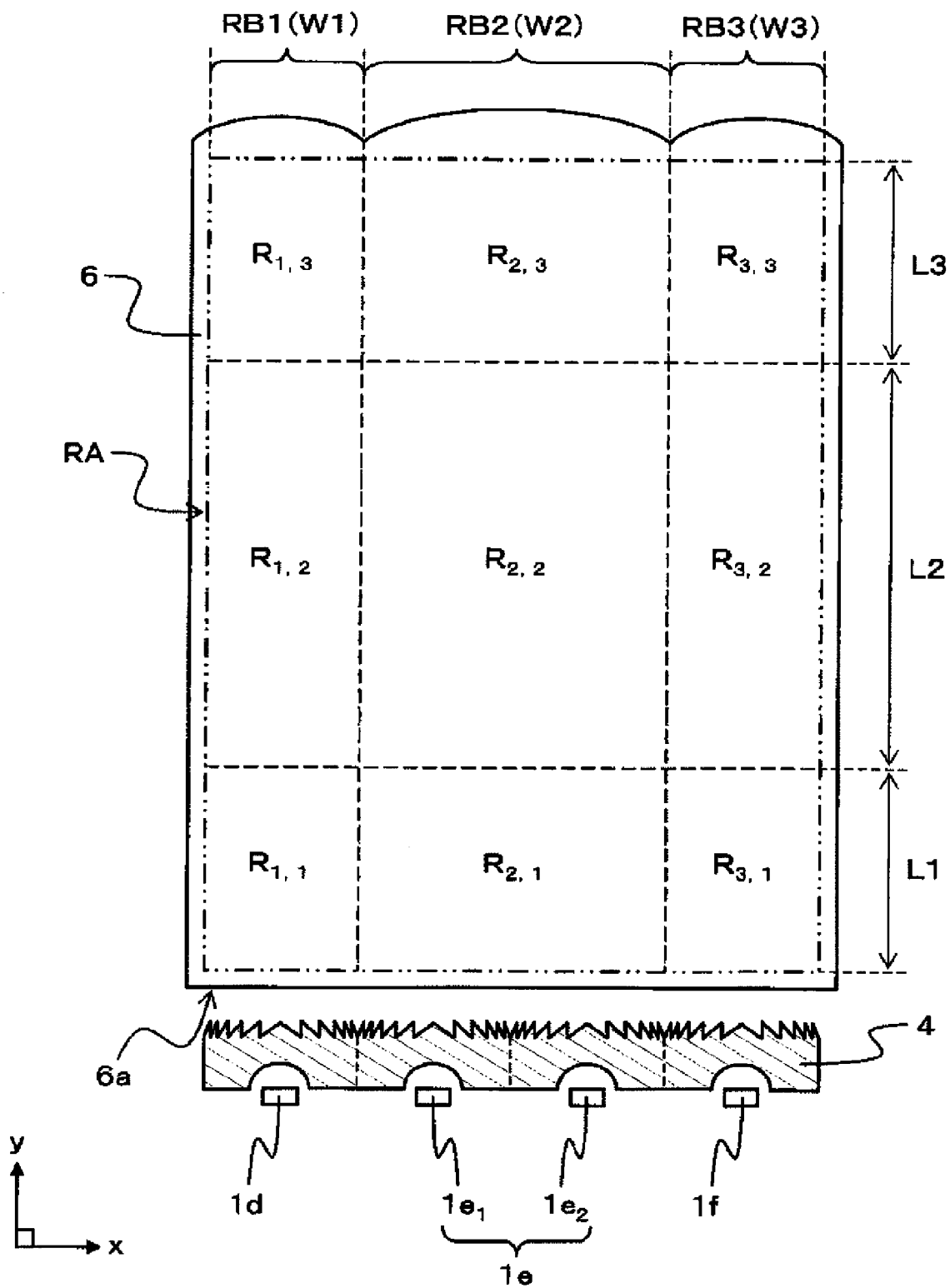
FIG. 7B is a schematic plan view illustrating an example of schematic structures of a second light source unit group, a second lens waveguide, and a second light guide plate of the liquid crystal display device of the second embodiment.

FIGS. 7A and 7B are schematic diagrams illustrating the schematic structure of a main part of a liquid crystal display device according to a second embodiment of the present invention.

FIG. 7A is a schematic plan view illustrating an example of the schematic structures of a first light source unit group, a first lens waveguide, and a first light guide plate. FIG. 7B is a schematic plan view illustrating an example of the schematic structures of a second light source unit group, a second lens waveguide, and a second light guide plate in the liquid crystal display device of the second embodiment.

The liquid crystal display device of the second embodiment is basically the same as the liquid crystal display device of the first embodiment, and structured as illustrated in FIGS. 1A and 1B. Accordingly, only differences from the first embodiment are described in the second embodiment.

First, the liquid crystal display device of the second embodiment differs from the liquid crystal display device of the first embodiment in how the small area $Q_{i,j}$ of the first light guide plate 5 and the small area $R_{i,j}$ of the second light guide plate 6 are set.

In the liquid crystal display device of the first embodiment, the area QA of the first light guide plate 5 is divided into nine small areas $Q_{i,j}$ that are equal to one another in (areal) dimension. Similarly, the area RA of the second light guide plate 6 in the liquid crystal display device of the first embodiment is divided into nine small areas $R_{i,j}$ that are equal to one another in (areal) dimension.

In the liquid crystal display device of the second embodiment, on the other hand, the area QA of the first light guide plate 5 is divided into nine small areas $Q_{i,j}$ in a manner that is, for example, illustrated in FIG. 7A, where a width W1 of the block area QB1, a width W2 of the block area QB2, and a width W3 of the block area QB3 satisfy a relation of W2=2·W1=2·W3. In addition, the three small areas $Q_{i,1}$, $Q_{i,2}$, and $Q_{i,3}$ aligned in the light propagation direction (y direction) have lengths L1, L2, and L3 in the y direction that satisfy a relation of L2=2·L1=2·L3.

The small areas $R_{i,j}$ in the area RA of the second light guide plate 6 are set to, for example, dimensions that have the same relation as dimensions of the small areas $Q_{i,j}$ of the first light guide plate 5 as illustrated in FIG. 7B.

The areal dimensions of the small area $Q_{2,2}$ at the center of the first light guide plate 5 are four times larger than the areal dimensions of the small area $Q_{1,1}$. The four small areas $Q_{1,1}$, $Q_{1,3}$, $Q_{3,1}$, and $Q_{3,3}$ which contain the corners of the area QA all have the same areal dimensions.

Accordingly, the luminances of white beams exiting from the five small areas $Q_{1,1}$, $Q_{1,3}$, $Q_{2,2}$, $Q_{3,1}$, and $Q_{3,3}$ of the first light guide plate 5, respectively, are made substantially equal to one another by, for example, structuring the light source units 1a, 1b, and 1c as illustrated in FIG. 7A. In FIG. 7A, the light source unit 1a which is associated with the block area QB1 and the light source unit 1c which is associated with the block area QB3 are each constituted of one white light source, whereas the light source unit 1b which is associated with the block area QB2 is constituted of two white light sources $1b_1$ and $1b_2$.

The first lens waveguide 3 is provided with, for example, light condensing means including a concave surface and a Fresnel lens for each white light source as illustrated in FIG. 7A. The width W2 of the block area QB2 is twice the width W1 of the block area QB1 (width W3 of the block area QB3). Accordingly, in converting a white beam that is emitted from the white light source $1b_1$ and a white beam that is emitted from the white light source $1b_2$ into parallel beams, the parallel beams of the former and the parallel beams of the latter each need to have a width equal to the width W1 of the block area QB1 (width W3 of the block area QB3). The liquid crystal display device of the second embodiment, the Fresnel lenses provided in the first lens waveguide 3 thus all have the same focal length.

Similarly, in the second light guide plate 6, the sum of areal dimensions of the small areas $R_{2,1}$ and $R_{2,3}$ of the block area RB2 from which light is extracted is twice the areal dimensions of the small area $R_{1,2}$ of the block area RB1 from which light is extracted (small area $R_{3,2}$ of the block area RB3 from which light is extracted).

Accordingly, the luminances of white beams exiting from the four small areas $R_{1,2}$, $R_{2,1}$, $R_{2,3}$, and $R_{3,2}$ of the second light guide plate 6, respectively, are made substantially equal to one another by, for example, structuring the light source units 1d, 1e, and 1f as illustrated in FIG. 7B. In FIG. 7B, the light source unit 1d which is associated with the block area RB1 and the light source unit 1f which is associated with the block area RB3 are each constituted of one white light source, whereas the light source unit 1e which is associated with the block area RB2 is constituted of two white light sources $1e_1$ and $1e_2$.

The second lens waveguide 4 is provided with, for example, light condensing means including a concave surface and a Fresnel lens for each white light source as illustrated in FIG. 7B. The width W2 of the block area RB2 is twice the width W1 of the block area RB1 (width W3 of the block area RB3). Accordingly, in converting a white beam that is emitted from the white light source $1e_1$ and a white beam that is emitted from the white light source $1e_2$ into parallel beams, the parallel beams of the former and the parallel beams of the latter each need to have a width equal to the width W1 of the block area RB1 (width W3 of the block area RB3). The liquid crystal display device of the second embodiment, the Fresnel lenses provided in the second lens waveguide 4 thus all have the same focal length.

In the liquid crystal display device of the second embodiment where the first light guide plate 5 and the second light guide plate 6 are structured as described above, the nine small areas $D_{i,j}$ in the display area DA of the liquid crystal display panel 11 have the same dimension relation as the small areas $Q_{i,j}$. Accordingly, the border between the small area $D_{2,2}$ and its adjacent small area in the liquid crystal display device of the second embodiment is located further outside than in the liquid crystal display device of the first embodiment.

In many cases, the main part of a video or image displayed on a liquid crystal display device is placed at the center of the display area to which the viewer's attention tends to be drawn. Setting the central part of the display to have larger areal dimensions therefore means a higher ratio of time periods in which a high luminance area is at the center. In this case, the luminances of small areas on the perimeter of the display area can be set lower than at the center, and hence the power consumption reduction effect brought by dividing the display area is enhanced.

Thus, in order to allocate a number of white light sources necessary to obtain a desired backlight luminance to areas created by dividing a light guide plate (block areas), the areal dimensions of the light guide plate are desirably divided such that the areal ratio of small areas that are provided with light extracting structures between one block area and another block area is the ratio of substantially whole numbers, on the account that the white light sources are counted in whole numbers. Economical placement of white light sources is accomplished by determining the number of white light sources to be allocated to a block area based on the areal ratio of small areas of the block area from which light exits in this manner.

The liquid crystal display device of the second embodiment sets 1:2 as the ratio of the areal dimensions of the small areas of the block area QB1 from which light exits (the areal dimensions of the small areas of the block area QB3 from which light exits) and the areal dimensions of the small area of the block area QB2 from which light exits. The ratio of the number of white light sources associated with the block area QB1 (QB3) and the number of white light sources associated with the block area QB2 which matches the areal ratio is accordingly set to 1:2. In other words, the first light unit group is not limited to the structure illustrated in FIG. 7A and may have, for example, the light source units 1a and 1c that are each constituted of two white light sources and the light source unit 1b that is constituted of four white light sources.

As described above, the liquid crystal display device of the second embodiment is even more effective in reducing power consumption than the liquid crystal display device of the first embodiment.

Third Embodiment

FIGS. 8A to 8D are schematic diagrams illustrating the schematic structure and operation principle of a main part of a liquid crystal display device according to a third embodiment of the present invention.

Figure 8A:
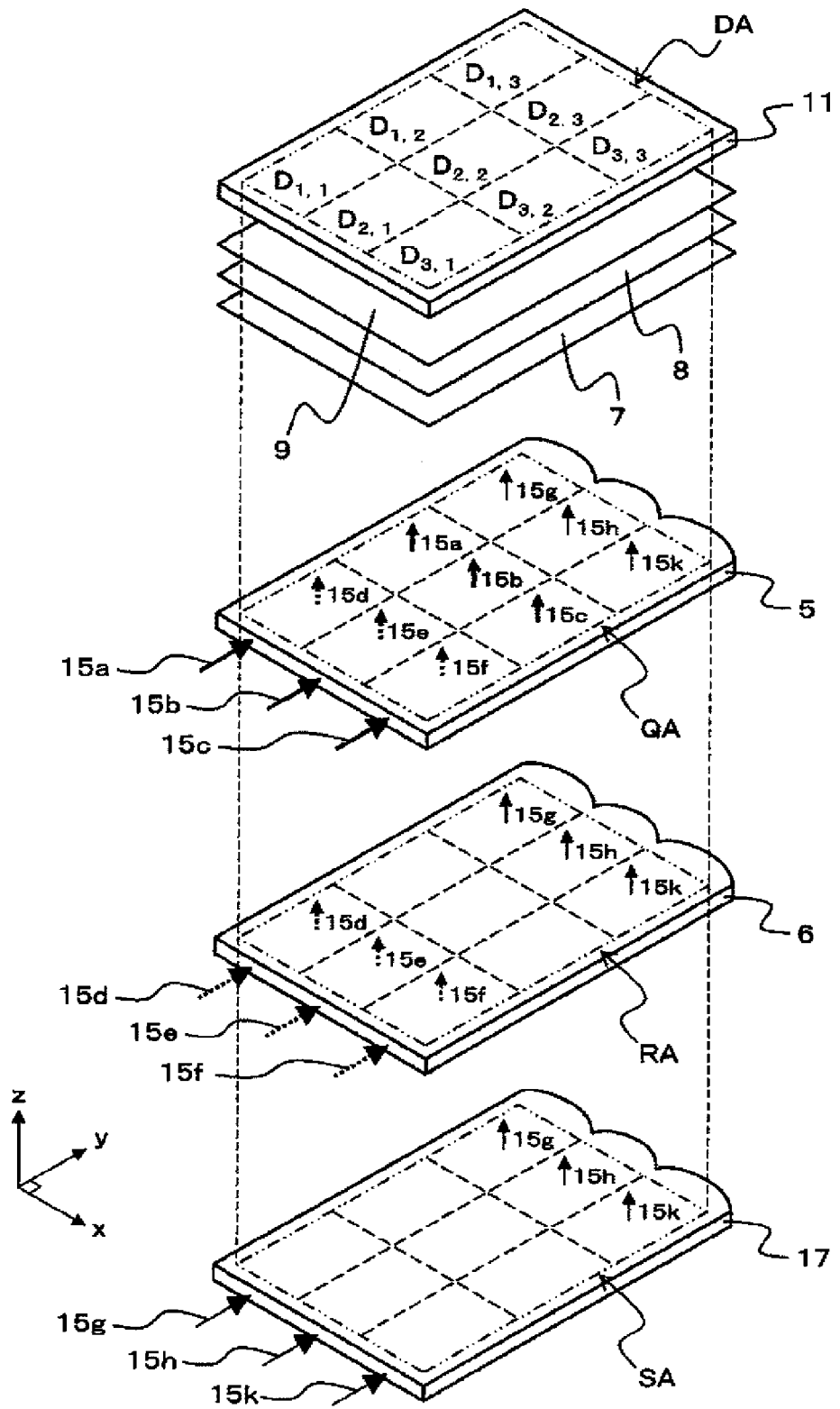
FIG. 8A is a schematic perspective view illustrating an example of a schematic structure of a main part of a liquid crystal display device according to a third embodiment of the present invention.
Figure 8B:
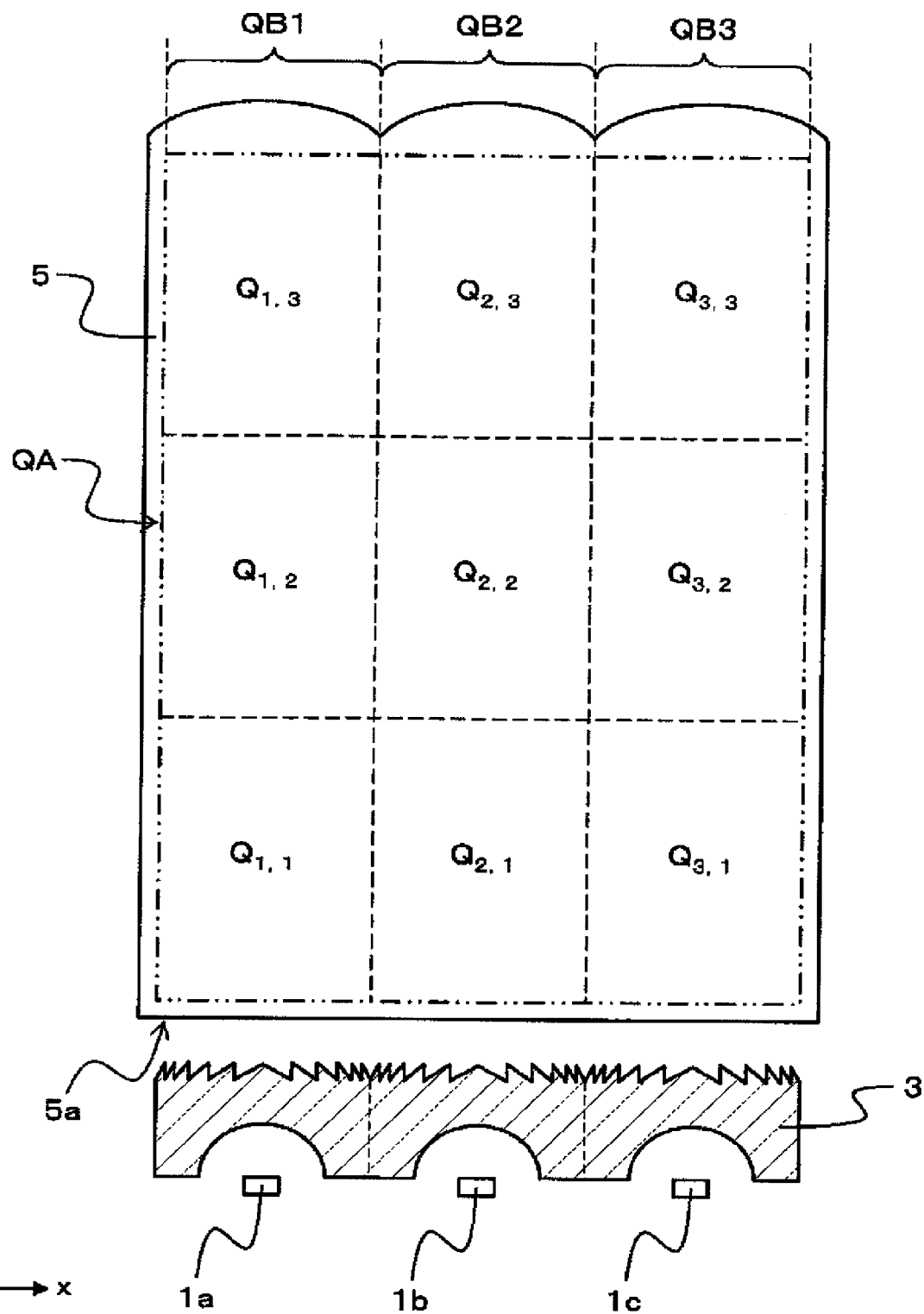
FIG. 8B is a schematic plan view illustrating an example of schematic structures of a first light guide plate, a first light source unit group, and a first lens waveguide.
Figure 8C:
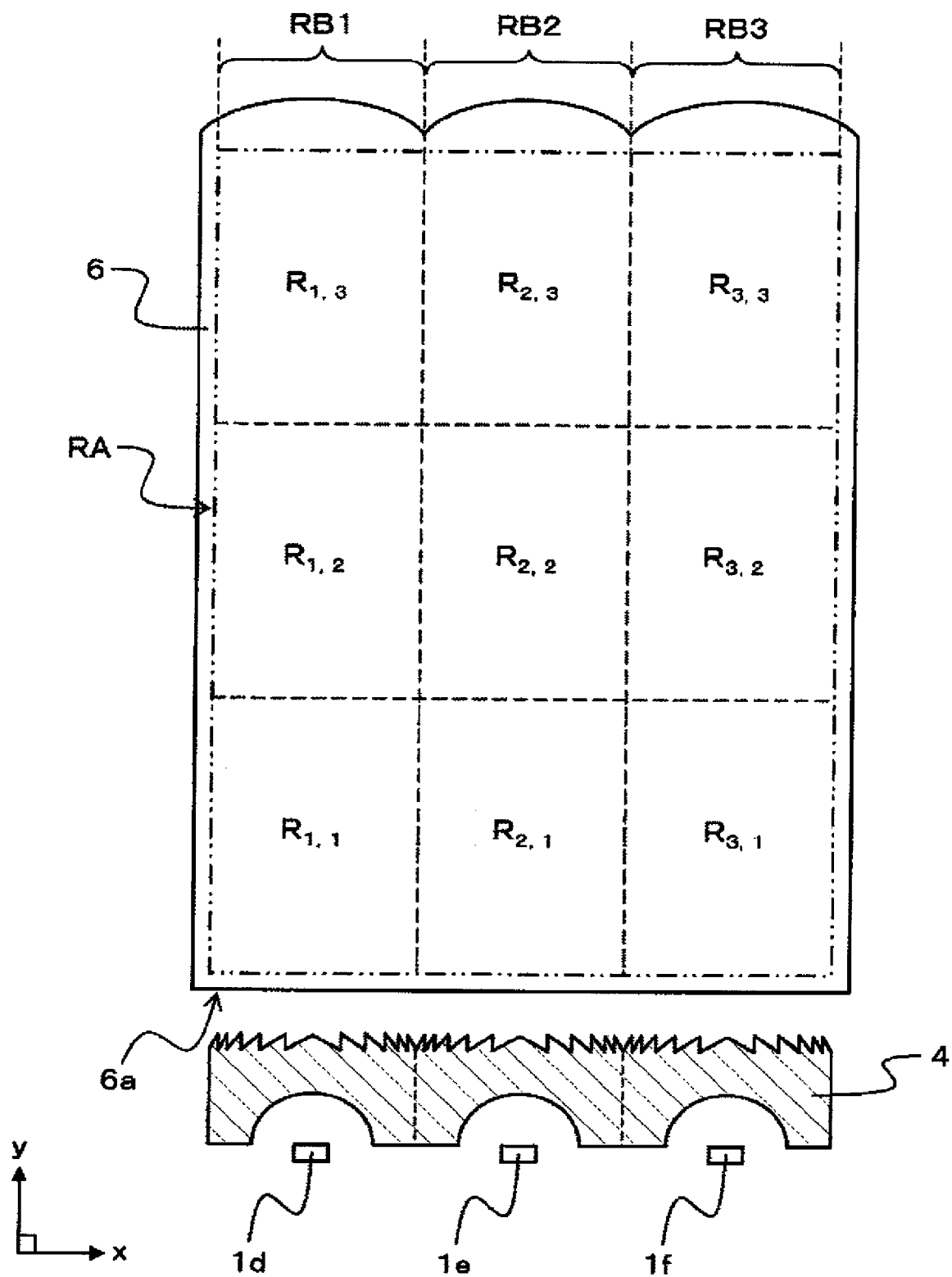
FIG. 8C is a schematic plan view illustrating an example of schematic structures of a second light guide plate, a second light source unit group, and a second lens waveguide.
Figure 8D:
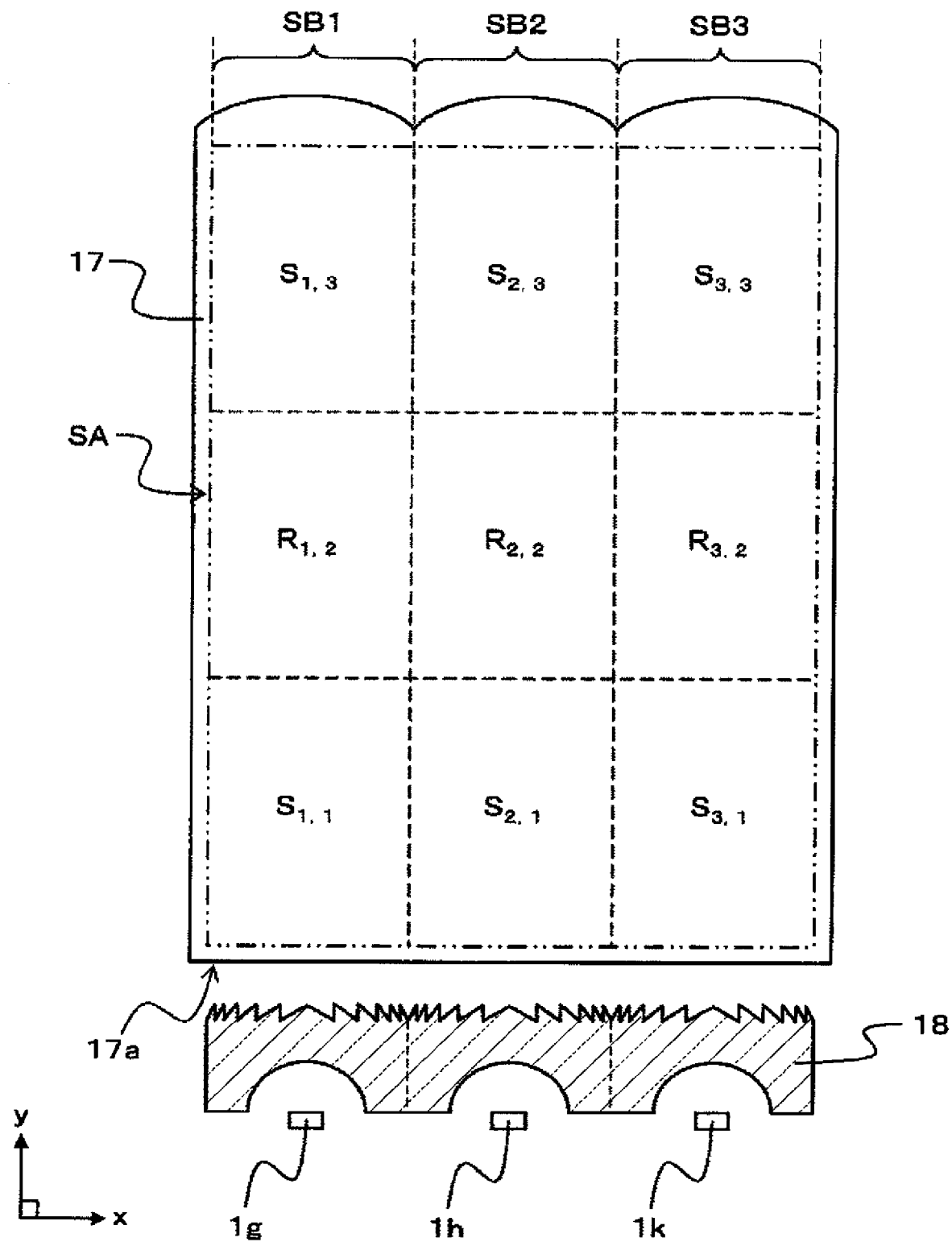
FIG. 8D is a schematic plan view illustrating an example of schematic structures of a third light guide plate, a third light source unit group, and a third lens waveguide.

FIG. 8A is a schematic perspective view illustrating an example of the schematic structure of the main part of the liquid crystal display device according to the third embodiment. FIG. 8B is a schematic plan view illustrating an example of the schematic structures of a first light guide plate, a first light source unit group, and a first lens waveguide. FIG. 8C is a schematic plan view illustrating an example of the schematic structures of a second light guide plate, a second light source unit group, and a second lens waveguide. FIG. 8D is a schematic plan view illustrating an example of the schematic structures of a third light guide plate, a third light source unit group, and a third lens waveguide.

The liquid crystal display devices of the first embodiment and the second embodiment can two-dimensionally control the surface luminance of a planar beam of light radiated from the backlight unit onto the display area DA of the liquid crystal display panel 11. In the liquid crystal display devices of the first and second embodiments, however, the display area DA is divided into nine small areas $D_{i,j}$, and the small areas $D_{1,1}$ and $D_{1,3}$ are irradiated with the white beam 15a emitted from the light source unit 1a. The liquid crystal display devices of the first and second embodiments are therefore incapable of controlling the luminance of a white beam that irradiates the small area $D_{1,1}$ and the luminance of a white beam that irradiates the small area $D_{1,3}$ independently of each other. Similarly, the liquid crystal display devices of the first and second embodiments are incapable of controlling the luminance of a white beam that irradiates the small area $D_{3,1}$ and the luminance of a white beam that irradiates the small area $D_{3,3}$ independently of each other.

The liquid crystal display device of the third embodiment, on the other hand, has three light guide plates of the first light guide plate 5, the second light guide plate 6, and a third light guide plate 17, which are stacked on one another, for example, as illustrated in FIG. 8A, and controls the luminances of white beams that are to irradiate respectively the nine small areas $D_{i,j}$ of the display area DA independently of one another.

In the first light guide plate 5, the area QA which overlaps with the display area DA is divided into nine small areas $Q_{i,j}$, for example, in the manner illustrated in FIG. 8B, and light extracting structures (e.g., reflective protrusions 5c) are provided in the middle small areas $Q_{2,j}$ of the respective block areas QB1, QB2, and QB3. A first light source unit group associated with the first light guide plate 5 is allocated three light source units of the light source unit 1a which emits the white beam 15a to be propagated through the block area QB1, the light source unit 1b which emits the white beam 15b to be propagated through the block area QB2, and the light source unit 1c which emits the white beam 15c to be propagated through the block area QB3. The light amounts of the light source units 1a to 1c can be controlled independently of one another. The first lens waveguide 3 that includes light condensing means for converting the white beam 15a emitted from the light source unit 1a into parallel beams, light condensing means for converting the white beam 15b emitted from the light source unit 1b into parallel beams, and light condensing means for converting the white beam 15c emitted from the light source unit 1c into parallel beams is placed between the first light source unit group and the first light guide plate 5. The light condensing means may each be constituted of a concave surface and a Fresnel lens as illustrated in FIG. 8B, or may be constituted of a Fresnel lens alone as illustrated in FIG. 5.

In the second light guide plate 6, the area RA which overlaps with the display area DA is divided into nine small areas $R_{i,j}$, for example, in the manner illustrated in FIG. 8C, and light extracting structures (e.g., reflective protrusions 6c) are provided in the small areas $R_{1,j}$ of the respective block areas RB1, RB2, and RB3, which are closest to the incidence side surface 6a. A second light source unit group associated with the second light guide plate 6 is allocated three light source units of the light source unit 1d which emits the white beam 15d to be propagated through the block area RB1, the light source unit 1e which emits the white beam 15e to be propagated through the block area RB2, and the light source unit 1f which emits the white beam 15f to be propagated through the block area RB3. The light amounts of the light source units 1d to 1f can be controlled independently of one another. The second lens waveguide 4 that includes light condensing means for converting the white beam 15d emitted from the light source unit 1d into parallel beams, light condensing means for converting the white beam 15e emitted from the light source unit 1e into parallel beams, and light condensing means for converting the white beam 15f emitted from the light source unit 1f into parallel beams is placed between the second light source unit group and the second light guide plate 6. The light condensing means may each be constituted of a concave surface and a Fresnel lens as illustrated in FIG. 8C, or may be constituted of a Fresnel lens alone as illustrated in FIG. 5.

In the third light guide plate 17, an area SA which overlaps with the display area DA is divided into nine small areas $S_{i,j}$, for example, in the manner illustrated in FIG. 8D, and light extracting structures (e.g., reflective protrusions) are provided in small areas $S_{1,j}$ of block areas SB1, SB2, and SB3, which are farthest from the incidence side surface 6a. A third light source unit group associated with the third light guide plate 17 is allocated three light source units of a light source unit 1g which emits a white beam 15g to be propagated through the block area SB1, a light source unit 1h which emits a white beam 15h to be propagated through the block area SB2, and a light source unit 1k which emits a white beam 15k to be propagated through the block area SB3. The light amounts of the light source units 1g, 1h, and 1k can be controlled independently of one another. A third lens waveguide 18 that includes light condensing means for converting the white beam 15g emitted from the light source unit 1g into parallel beams, light condensing means for converting the white beam 15h emitted from the light source unit 1h into parallel beams, and light condensing means for converting the white beam 15k emitted from the light source unit 1k into parallel beams is placed between the third light source unit group and the third light guide plate 17. The light condensing means may each be constituted of a concave surface and a Fresnel lens as illustrated in FIG. 8D, or may be constituted of a Fresnel lens alone as illustrated in FIG. 5.

With this configuration, the white beams 15a, 15b, and 15c emitted from the light source units 1a, 1b, and 1c respectively exit toward the liquid crystal display panel 11 from the small areas $Q_{1,2}$, $Q_{2,2}$, and $Q_{3,2}$ of the first light guide plate 5, and then enter the small areas $D_{1,2}$, $D_{2,2}$, and $D_{3,2}$ of the display area DA. Accordingly, the luminances of the white beams entering the small areas $D_{1,2}$, $D_{2,2}$, and $D_{3,2}$ of the display area DA can be controlled on a small area basis by controlling the drive current of the light source unit 1a, the drive current of the light source unit 1b, and the drive current of the light source unit 1c independently of one another.

The white beams 15d, 15e, and 15f emitted from the light source units 1d, 1e, and 1f respectively exit toward the liquid crystal display panel 11 from the small areas $R_{1,1}$, $R_{2,1}$ and $R_{3,1}$ of the second light guide plate 6, pass through the small areas $Q_{1,1}$, $Q_{2,1}$, and $Q_{3,1}$ of the first light guide plate 5, and then enter the small areas $D_{1,1}$, $D_{2,1}$, and $D_{3,1}$ of the display area DA. Accordingly, the luminances of the white beams entering the small areas $D_{1,1}$, $D_{2,1}$, and $D_{3,1}$ of the display area DA can be controlled on a small area basis by controlling the drive current of the light source unit 1d, the drive current of the light source unit 1e, and the drive current of the light source unit 1f independently of one another.

The white beams 15g, 15h, and 15k emitted from the light source units 1g, 1h, and 1k respectively exit toward the liquid crystal display panel 11 from small areas $S_{1,3}$, $S_{2,3}$, and $S_{3,3}$ of the third light guide plate 17, pass through the small areas $R_{1,3}$, $R_{2,3}$, and $R_{3,3}$ of the second light guide plate 6 and through the small areas $Q_{1,3}$, $Q_{2,3}$, and $Q_{3,3}$ of the first light guide plate 5, and then enter the small areas $D_{1,3}$, $D_{2,3}$, and $D_{3,3}$ of the display area DA. Accordingly, the luminances of the white beams entering the small areas $D_{1,3}$, $D_{2,3}$, and $D_{3,3}$ of the display area DA can be controlled on a small area basis by controlling the drive current of the light source unit 1g, the drive current of the light source unit 1h, and the drive current of the light source unit 1k independently of one another.

In short, the liquid crystal display device of the third embodiment can readily perform area-based control called local dimming or such on, for example, a planar beam of light for irradiating the liquid crystal display panel 11.

The structures of the first light source unit group, the second light source unit group, the third light source unit group, the first lens waveguide 3, the second lens waveguide 4, and the third lens waveguide 18 in the liquid crystal display device of the third embodiment can be changed to suit individual cases, as described in the first embodiment and the second embodiment.

The light extracting structures provided in the first light guide plate 5, the second light guide plate 6, and the third light guide plate 17 can be any type of light extracting structure that is provided in a conventional light guide plate, such as reflective protrusions and reflective grooves. Desirably, a light extracting structure overlapping portion (e.g., reflective protrusion overlapping portion 16) is provided at the border between small areas so that the amount of luminance change at the border between small areas is reduced, for example, in a manner described in the first embodiment.

As described above, the liquid crystal display device of the third embodiment has a higher degree of freedom in how the surface luminance of a planar beam of light for irradiating the display area DA is controlled than the liquid crystal display devices of the first and second embodiments. The liquid crystal display device of the third embodiment can therefore readily perform area-based control on a planar beam of light for irradiating the liquid crystal display panel 11.

Figure 9:
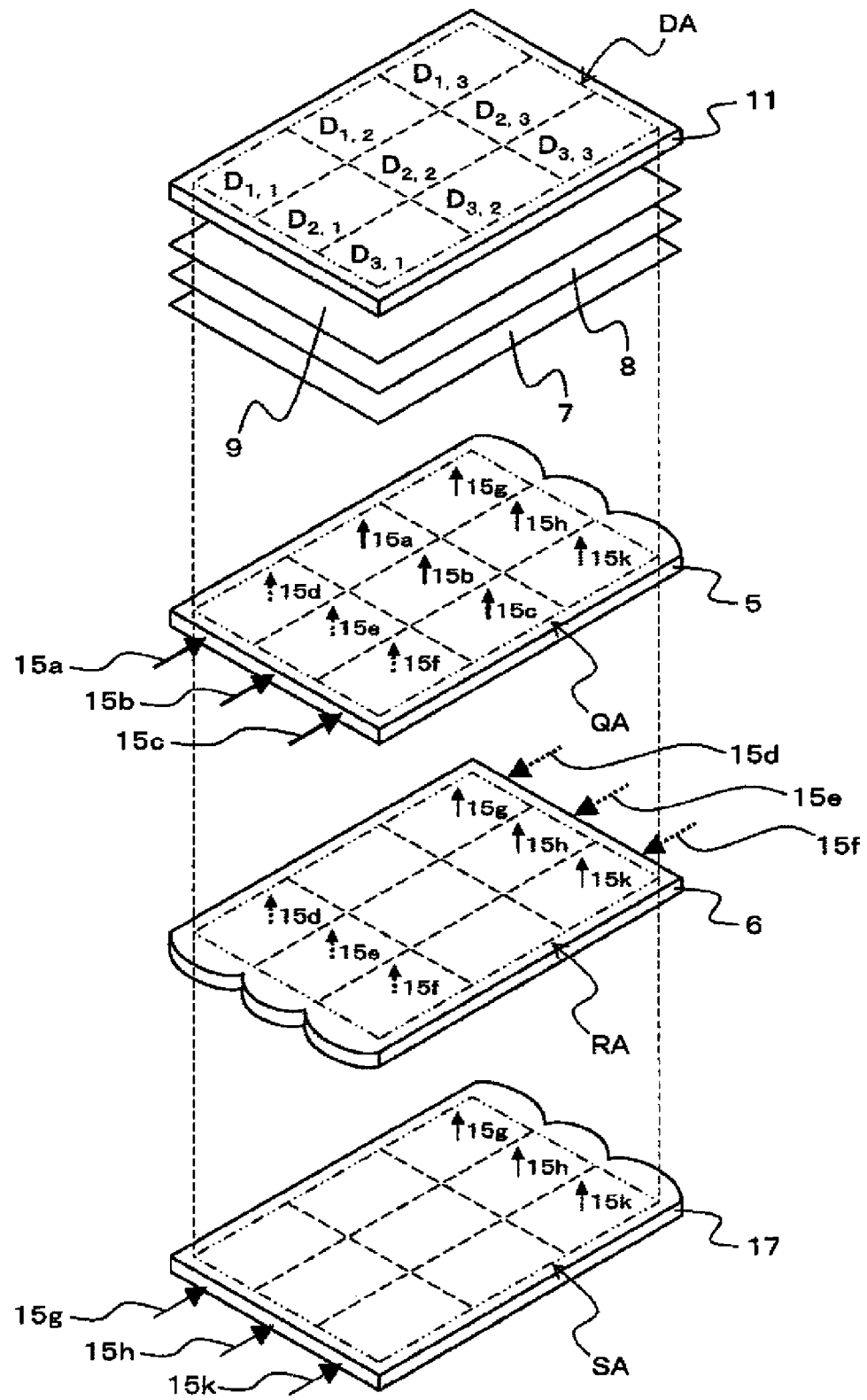
FIG. 9 is a schematic perspective view illustrating a modification example of the structure of the main part of the liquid crystal display device according to the third embodiment.

FIG. 9 is a schematic perspective view illustrating a modification example of a structure of a main part of the liquid crystal display device according to the third embodiment.

The structure illustrated in FIG. 8A as an example of the liquid crystal display device of the third embodiment has the incidence side surface of the first light guide plate 5, the incidence side surface of the second light guide plate 6, and the incidence side surface of the third light guide plate 17 in the same direction. In other words, in the structure of FIG. 8A, the first light source unit group, the second light source unit group, and the third light source unit group are stacked on top of one another. If the light source units (white light sources) each have a dimension in the stacking direction that is larger than, for example, the thickness of each light guide plate, the gap between one light guide plate and another has to be set wide in order to avoid interference between the light source unit groups, which makes the liquid crystal display device thicker that much.

Also, with the first light source unit group, the second light source unit group, and the third light source unit group stacked, the heat dissipation efficiency of the second light source unit group lowers, and the resultant lowering of light emission efficiency may cause, for example, a drop in luminance.

It is therefore desired in the liquid crystal display device of the third embodiment to switch the incidence side surface 6a and opposite side surface 6b of the second light guide plate 6 in stacking the light guide plates, for example, in a manner illustrated in FIG. 9.

This way, the lowering of heat dissipation efficiency in the second light source unit group can be reduced and a drop in luminance due to lowered light emission efficiency is prevented.

Another advantage of employing the arrangement of FIG. 9 is that the second light guide plate 6 and the third light guide plate 17 can have the same structure. This keeps the manufacturing cost from rising compared to the case where light guide plates of three different types are prepared.

Also, when the arrangement of FIG. 9 is employed, a white beam exiting the third light guide plate 17 and a white beam exiting the second light guide plate 6 both exit from the small areas farthest from the incidence side surfaces. This helps to prevent the luminance of a white beam exiting the third light guide plate 17 and the luminance of a white beam exiting the second light guide plate 6 from deviating from each other when their light source units are driven under equal conditions.

Fourth Embodiment

FIGS. 10A to 10D are schematic diagrams illustrating the schematic structure and operation principle of a main part of a liquid crystal display device according to a fourth embodiment of the present invention.

Figure 10A:
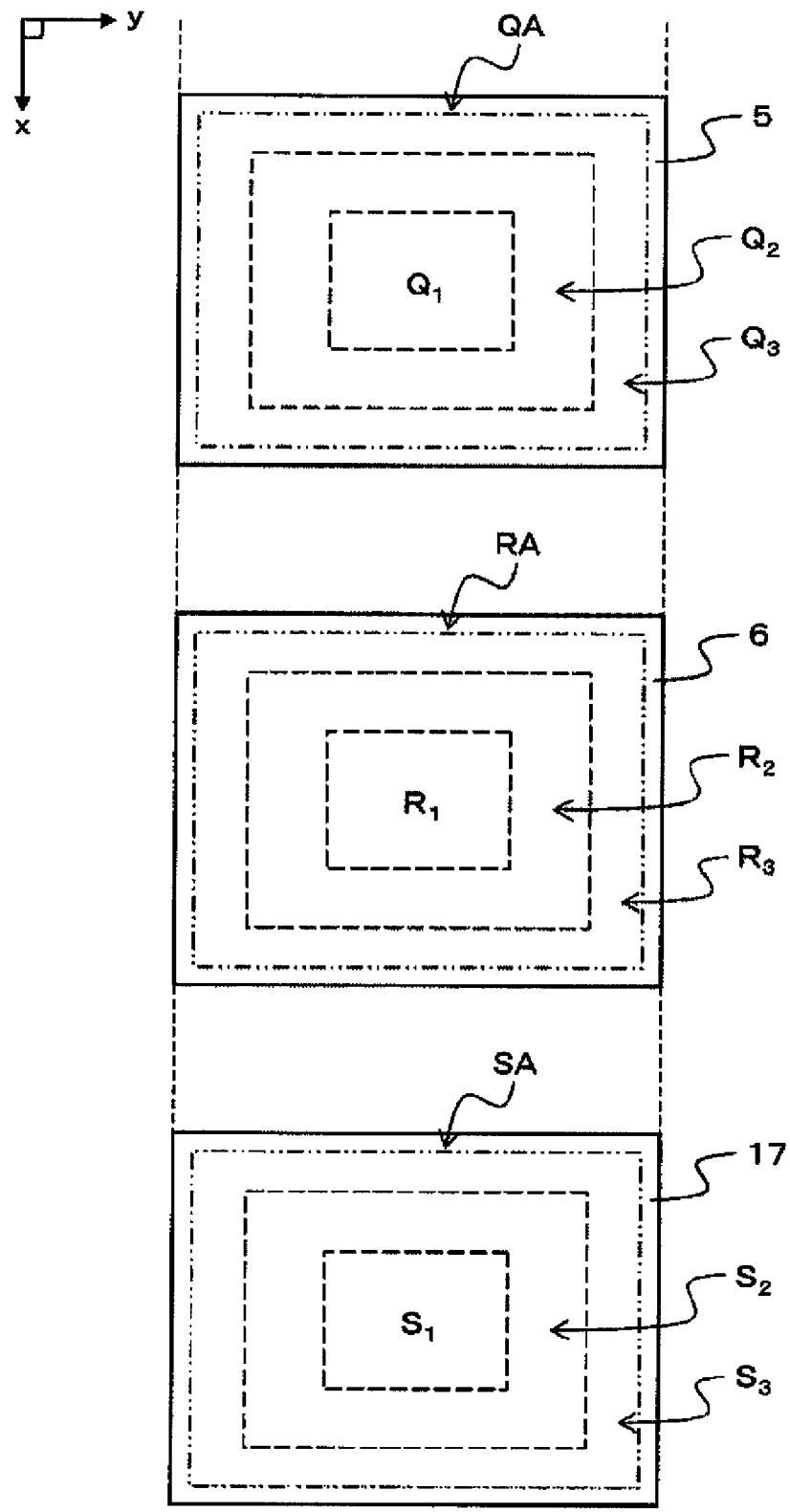
FIG. 10A is a schematic diagram illustrating an example of schematic structures of light guide plates of a liquid crystal display device according to a fourth embodiment of the present invention.
Figure 10B:
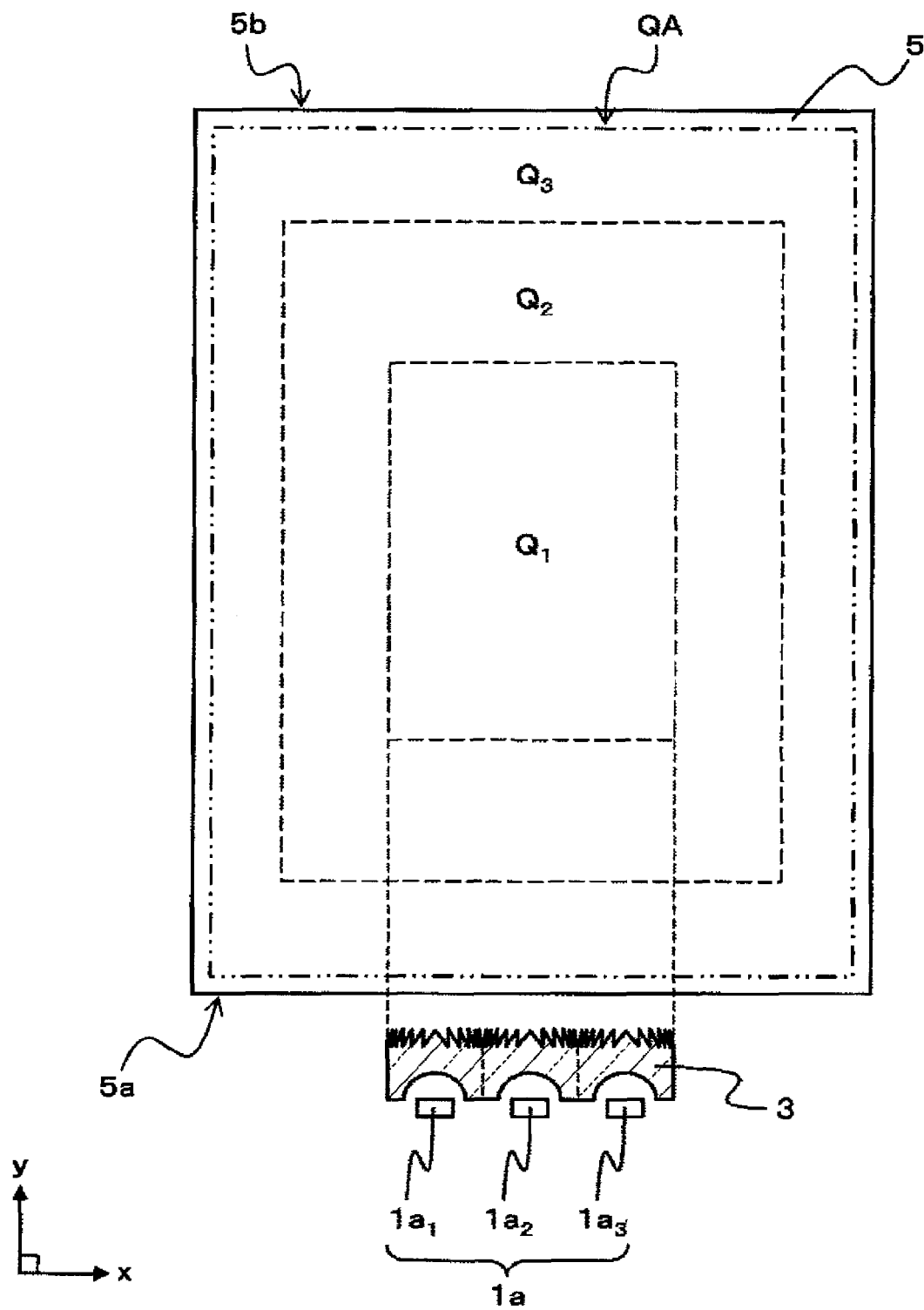
FIG. 10B is a schematic plan view illustrating an example of schematic structures of a first light guide plate, a first light source unit group, and a first lens waveguide.
Figure 10C:
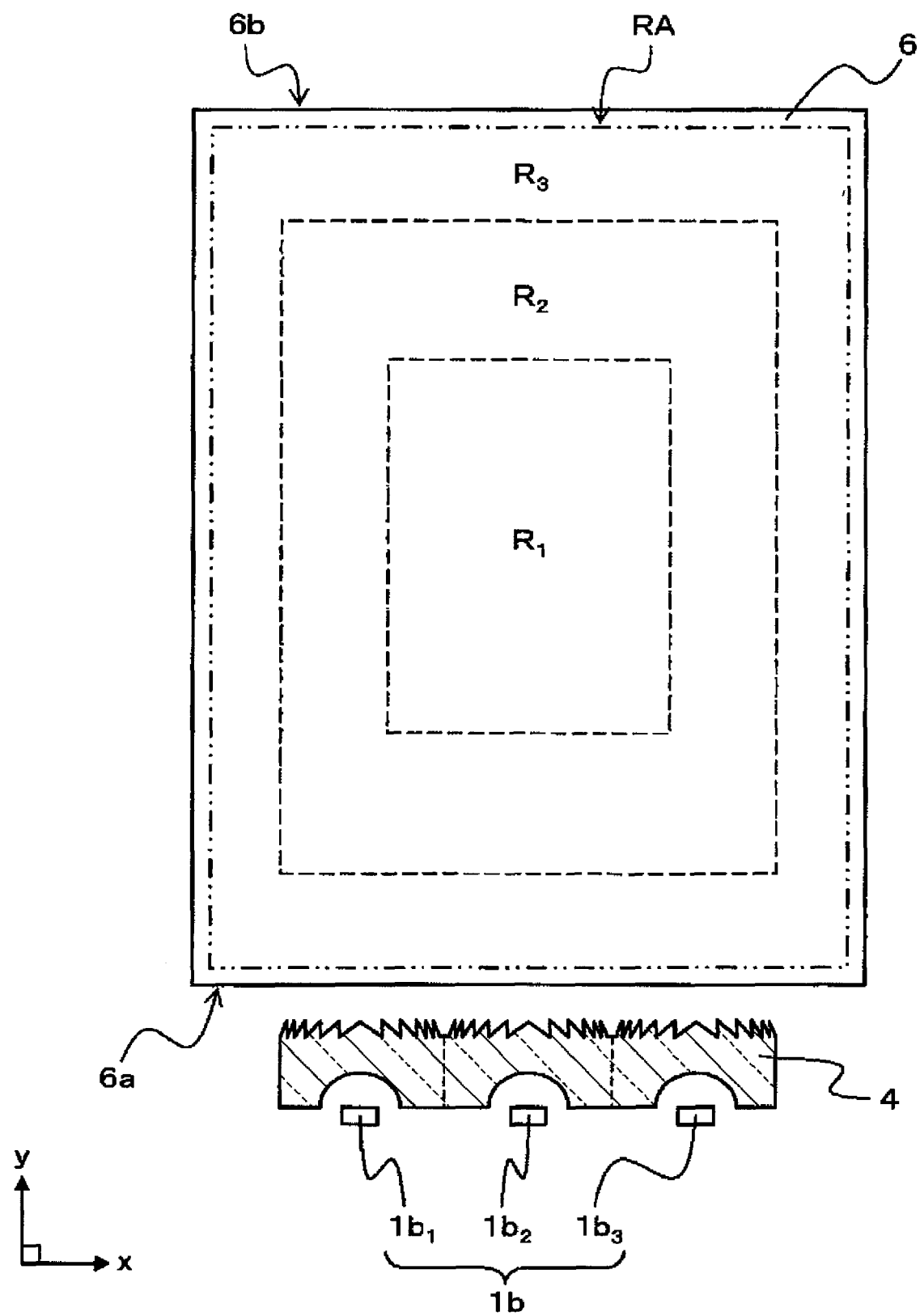
FIG. 10C is a schematic plan view illustrating an example of schematic structures of a second light guide plate, a second light source unit group, and a second lens waveguide.
Figure 10D:
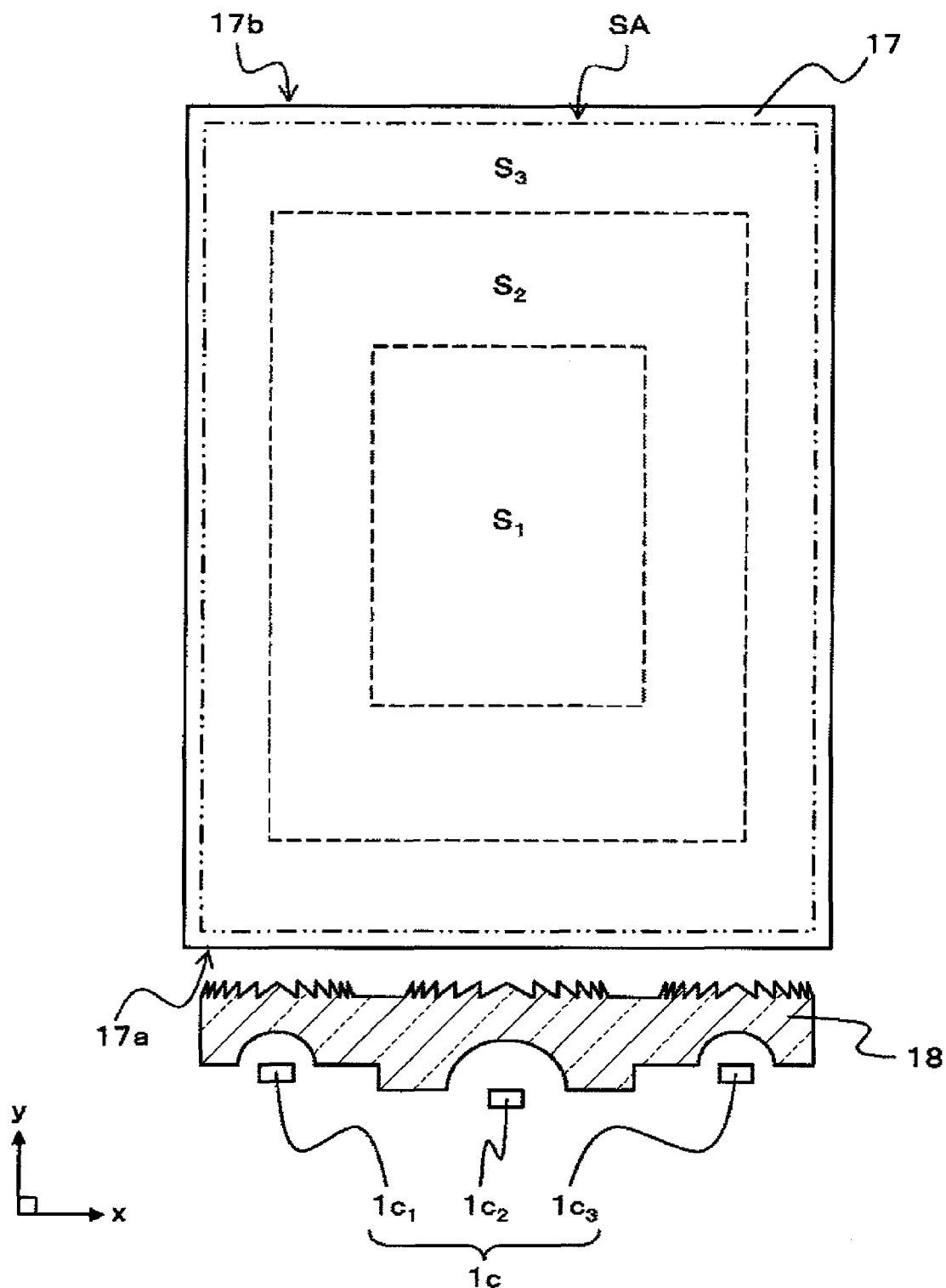
FIG. 10D is a schematic plan view illustrating an example of schematic structures of a third light guide plate, a third light source unit group, and a third lens waveguide.

FIG. 10A is a schematic diagram illustrating an example of the schematic structures of light guide plates of the liquid crystal display device according to the fourth embodiment. FIG. 10B is a schematic plan view illustrating an example of the schematic structures of a first light guide plate, a first light source unit group, and a first lens waveguide. FIG. 10C is a schematic plan view illustrating an example of the schematic structures of a second light guide plate, a second light source unit group, and a second lens waveguide. FIG. 10D is a schematic plan view illustrating an example of the schematic structures of a third light guide plate, a third light source unit group, and a third lens waveguide.

The fourth embodiment deals with, as another structural example of a liquid crystal display device with three light guide plates stacked on top of one another, a structure in which each light guide plate is divided into a rectangular area at the center, a first annular area which surrounds the rectangular area, and a second annular area which surrounds the first annular area, to thereby control the luminances of white beams for irradiating these three areas. Light extracting structures provided in the first light guide plate 5, the second light guide plate 6, and the third light guide plate 17 are respectively placed in, for example, areas that are indicated in FIGS. 10A to 10D.

In the first light guide plate 5, the area QA which overlaps with the display area DA is divided into three areas, for example, in the manner illustrated in FIGS. 10A and 10B. The three areas are a rectangular area $Q_1$ at the center, a first annular area $Q_2$ which surrounds the rectangular area $Q_1$, and a second annular area $Q_3$ which surrounds the first annular area $Q_2$. Light extracting structures (for example, reflective protrusions 5c) are provided only in the rectangular area $Q_1$ at the center.

In the second light guide plate 6, the area RA which overlaps with the display area DA is divided into three areas, for example, in the manner illustrated in FIGS. 10A and 10C. The three areas are a rectangular area $R_1$ at the center, a first annular area $R_2$ which surrounds the rectangular area $R_1$, and a second annular area $R_3$ which surrounds the first annular area $R_2$. Light extracting structures (for example, reflective protrusions 6c) are provided only in the first annular area $R_2$.

The rectangular area $R_1$, the first annular area $R_2$, and the second annular area $R_3$ in the second light guide plate 6 overlap with the rectangular area $Q_1$, the first annular area $Q_2$, and the second annular area $Q_3$ in the first light guide plate 5, respectively.

In the third light guide plate 17, the area SA which overlaps with the display area DA is divided into three areas, for example, in the manner illustrated in FIGS. 10A and 10D. The three areas are a rectangular area $S_1$ at the center, a first annular area $S_2$ which surrounds the rectangular area $S_1$, and a second annular area $S_3$ which surrounds the first annular area $S_2$. Light extracting structures (for example, reflective protrusions) are provided only in the second annular area $S_3$. The rectangular area $S_1$, the first annular area $S_2$, and the second annular area $S_3$ in the third light guide plate 17 overlap with the rectangular area $Q_1$, the first annular area $Q_2$, and the second annular area $Q_3$ in first light guide plate 5, respectively.

When each light guide plate is divided such that its rectangular area, first annular area, and second annular area have equal areal dimensions, in order to make the luminances of white beams exiting the respective light guide plates substantially equal to one another, for example, the same number of light source units (white light sources) are allocated to each light guide plate.

Therefore, when the light source unit 1a for the first light guide plate 5 has, for example, three white light sources $1a_1$, $1a_2$, and $1a_3$ connected in series or in parallel as illustrated in FIG. 10B, three white light sources $1b_1$, $1b_2$, and $1b_3$ connected in series or in parallel, for example, in the manner illustrated in FIG. 10C are used to constitute the light source unit 1b for the second light guide plate 6. A white beam emitted from the light source unit 1b exits from the first annular area $R_2$, which surrounds the rectangular area $R_1$. The interval at which the white light sources $1b_1$, $1b_2$, and $1b_3$ are arranged is accordingly set wider than the interval at which the white light sources $1a_1$, $1a_2$, and $1a_3$ are arranged for the first light guide plate 5. Also, parallel beams that are propagated through the second light guide plate 6 need to have a width substantially equal to the dimension in the x direction of the first annular area $R_2$. The focal length of Fresnel lenses that are provided in the second lens waveguide 4, which is placed between the white light sources $1b_1$, $1b_2$, and $1b_3$ and the second light guide plate 6, is therefore longer than the focal length of Fresnel lenses that are provided in the first lens waveguide 3, which is placed between the white light sources $1a_1$, $1a_2$, and $1a_3$ and the first light guide plate 5.

Three white light sources $1c_1$, $1c_2$, and $1c_3$ connected in series or in parallel, for example, in the manner illustrated in FIG. 10D are used to constitute the light source unit 1c for the third light guide plate 17. A white beam emitted from the light source unit 1c exits from the second annular area $S_3$. The interval at which the white light sources $1c_1$, $1c_2$, and $1c_3$ are arranged is accordingly set even wider than the interval at which the white light sources $1b_1$, $1b_2$, and $1b_3$ are arranged.

The area in the third light guide plate 17 from which light is extracted (second annular area $S_3$) runs along the perimeter of the display area DA. Therefore, in order to efficiently extract the white beams emitted from the white light sources $1c_1$, $1c_2$, and $1c_3$, the third lens waveguide 18 is desirably structured, for example, as illustrated in FIG. 10D so that the width of parallel beams that are converted from the white beam emitted by the white light source $1c_1$ (parallel beams that are converted from the white beam emitted by the white light source $1c_3$) is narrower than the width of parallel beams that are converted from the white beam emitted by the white light source $1c_2$. Desirably, the respective bundles of parallel beams are set to, for example, widths that make the areal dimensions of the area from which the white beam of the white light source $1c_1$ exits, the areal dimensions of the area from which the white beam of the white light source $1c_2$ exits, and the areal dimensions of the area from which the white beam of the white light source $1c_3$ exits substantially equal to one another.

When a backlight unit is structured as above, controlling through the light source control circuit 2 the drive current of the light source unit 1a, the drive current of the light source unit 1b, and the drive current of the light source unit 1c to become, for example, smaller in the order stated makes the luminance of a planar beam of light for irradiating the display area DA of the liquid crystal display panel 11 high at the center and low toward the perimeter. The liquid crystal display device of the fourth embodiment is thus capable of, for example, reducing power consumption while preventing a seeming change in luminance.

The light extracting structures provided in the first light guide plate 5, the second light guide plate 6, and the third light guide plate 17 can be any type of structure that allows a white beam traveling through the light guide plate to exit only from a specific area as described in the first embodiment. The light extracting structures provided in the light guide plates are therefore not limited to reflective protrusions, and may be reflective grooves or may be concave curved surfaces or convex curved surfaces arranged in matrix.

In the liquid crystal display device of the fourth embodiment, the area of each light guide plate that overlaps with the display area DA may be divided into the rectangular area, the first annular area, and the second annular area that have areal dimensions different from one another. In this case, the structures of light source units (for example, the number of white light sources) allocated to the respective light guide plates are changed to suit the ratio of the areal dimension of the rectangular area, the areal dimension of the first annular area, and the areal dimension of the second annular area.

Figure 11A:
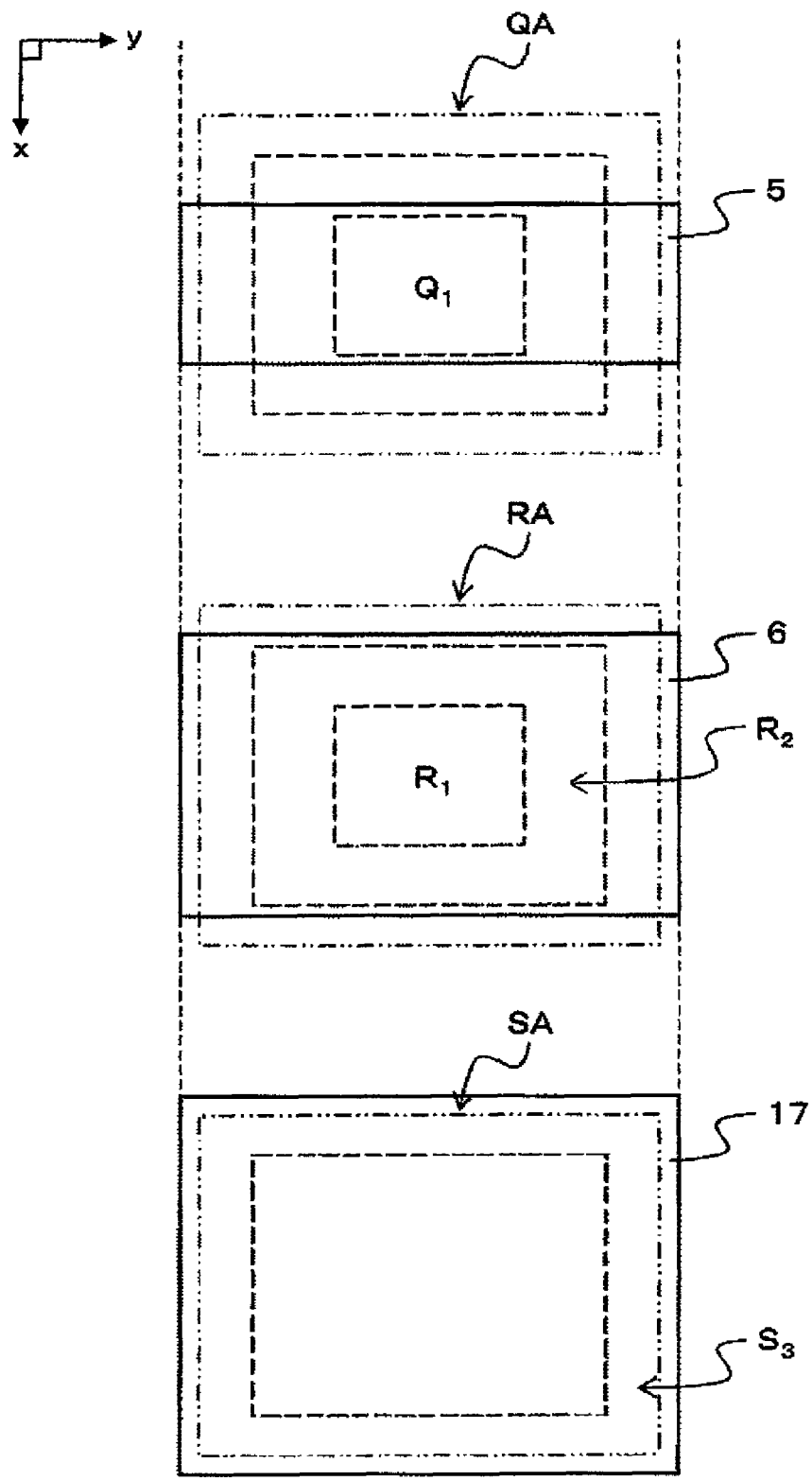
FIG. 11A is a schematic diagram illustrating a modification example of the schematic structures of the light guide plates of the liquid crystal display device of the fourth embodiment.
Figure 11B:
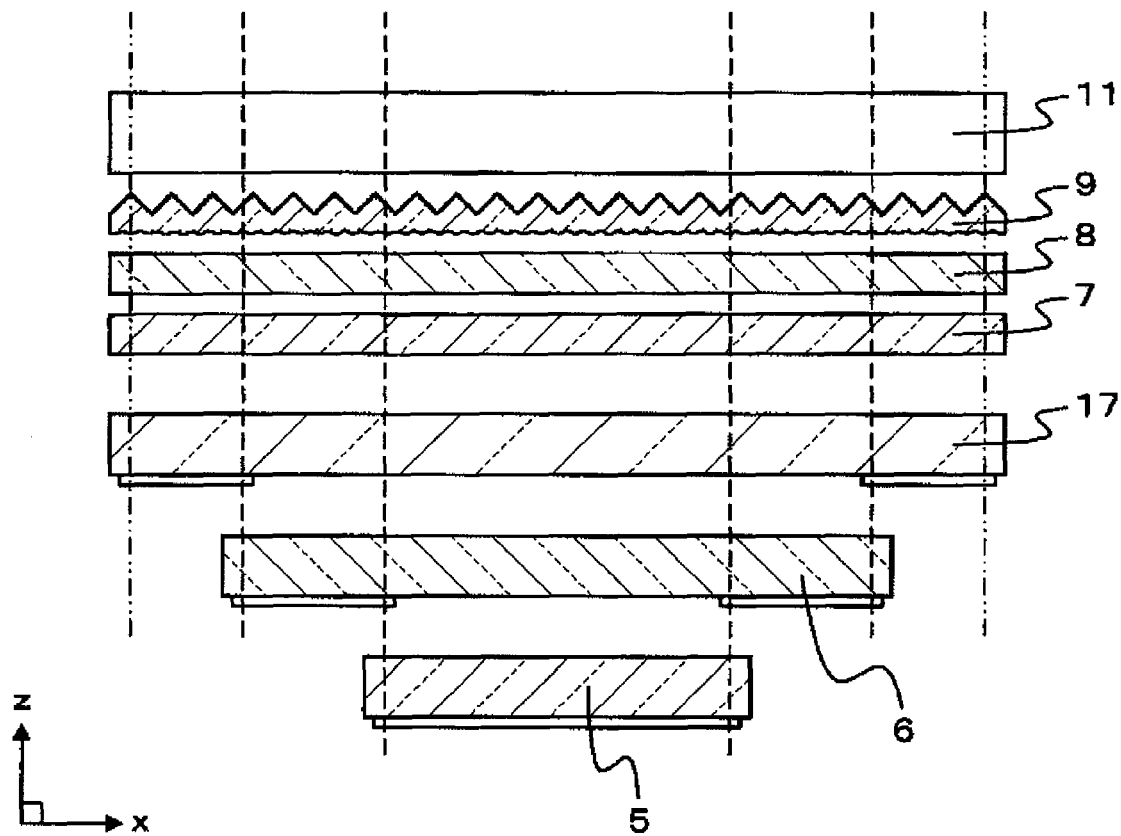
FIG. 11B is a schematic side view illustrating an example of how the light guide plates structured as illustrated in FIG. 11A are arranged.

FIGS. 11A and 11B are schematic diagrams illustrating a modification example of the structures of the respective light guide plates of the liquid crystal display device of the fourth embodiment.

FIG. 11A is a schematic diagram illustrating a modification example of the schematic structures of the respective waveguides of the liquid crystal display device of the fourth embodiment. FIG. 11B is a schematic side view illustrating an example of how the light guide plates structured as illustrated in FIG. 11A are arranged.

FIG. 11B is a schematic side view taken when the liquid crystal display device is viewed from the side of incidence side surfaces of the light guide plates.

The first light guide plate 5 used in the liquid crystal display device of the fourth embodiment has light extracting structures only in, for example, a central rectangular area $Q_1$ out of the area QA, which overlaps with the display area DA of the liquid crystal display panel 11, as illustrated in FIG. 10A. A white beam emitted from the light source unit 1a and converted into parallel beams travels only through a band-like area in the first light guide plate 5 that has a width approximately equal to the dimension in the x direction of the rectangular area $Q_1$. Accordingly, the dimension in the x direction of the first light guide plate 5 used in the liquid crystal display device of the fourth embodiment may be reduced down to, for example, a value approximately equal to the dimension in the x direction of the rectangular area $Q_1$ as illustrated in FIG. 11A.

The second light guide plate 6 used in the liquid crystal display device of the fourth embodiment has light extracting structures only in, for example, a first annular area $R_2$ out of the area RA, which overlaps with the display area DA of the liquid crystal display panel 11, as illustrated in FIG. 10A. Accordingly, similarly to the above, the dimension in the x direction of the second light guide plate 6 used in the liquid crystal display device of the fourth embodiment may be reduced down to, for example, a value approximately equal to the dimension in the x direction of the first annular area $R_2$ as illustrated in FIG. 11A.

In the case where the dimensions in the x direction of the three light guide plates are changed in this manner, it is desired to align the third light guide plate 17, the second light guide plate 6, and the first light guide plate 5 behind (below) the liquid crystal display panel 11 in the order stated, for example, as illustrated in FIG. 11E. With the light guide plates arranged so that the dimensions of the light guide plates decrease as the distance from the liquid crystal display panel 11 grows, the ends of the first light guide plate 5, for example, overlap with areas in the second light guide plate 6 located above that have light extracting structures. This makes a luminance change at the border between the rectangular area and the first annular area less visible.

Fifth Embodiment

Figure 12:
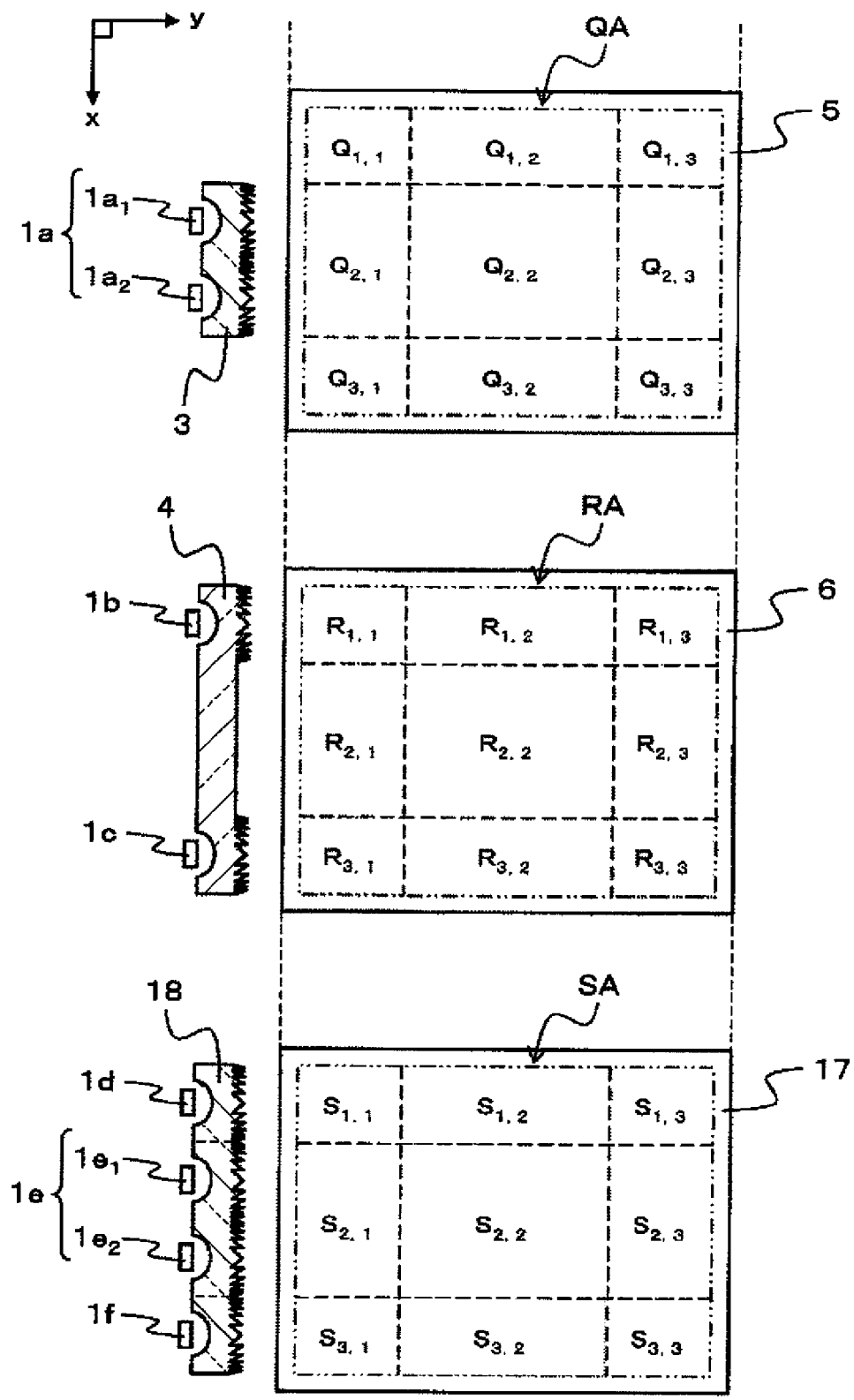
FIG. 12 is a schematic diagram illustrating an example of a schematic structure of a main part of a liquid crystal display device according to a fifth embodiment of the present invention.

FIG. 12 is a schematic diagram illustrating an example of a schematic structure of a main part of a liquid crystal display device according to a fifth embodiment of the present invention.

The liquid crystal display device of the fifth embodiment is an application example of the liquid crystal display device of the second embodiment and, for example, implements the operation of the backlight unit in the liquid crystal display device of the second embodiment with three light guide plates. The light extracting structures provided in the first light guide plate 5, the second light guide plate 6, and the third light guide plate 17 are placed in, for example, areas indicated in FIG. 12.

The first light guide plate 5 has light extracting structures (e.g., reflective protrusions 5c) only in the small area $Q_{2,2}$ out of the small areas $Q_{i,j}$ created by dividing the area QA, which overlaps with the display area DA, into nine areas. The dimensions of the small areas $Q_{i,j}$ have the relation described in the second embodiment. That is, the dimension in the x direction of the small area $Q_{2,j}$ is twice the dimension in the x direction of each of the small areas $Q_{1,j}$ and $Q_{3,j}$, and the dimension in the y direction of the small area $Q_{i,2}$ is twice the dimension in the y direction of each of the small areas $Q_{i,1}$ and $Q_{i,3}$.

The second light guide plate 6 has light extracting structures (e.g., reflective protrusions 6c) in the small areas $R_{1,1}$, $R_{1,3}$, $R_{3,1}$, and $R_{3,3}$ out of the small areas $R_{i,j}$ created by dividing the area RA, which overlaps with the display area DA, into nine areas. The small areas $R_{i,j}$ of the second light guide plate 6 respectively overlap with the small areas $Q_{i,j}$ of the first light guide plate 5.

The third light guide plate 17 has light extracting structures (e.g., reflective protrusions) in the small areas $S_{1,2}$, $S_{2,S}$, $S_{2,3}$, and $S_{3,2}$ out of the small areas $S_{i,j}$ created by dividing the area SA, which overlaps with the display area DA, into nine areas. The small areas $S_{i,j}$ of the third light guide plate 17 respectively overlap with the small areas $Q_{i,j}$ of the first light guide plate 5.

The first light guide plate 5 is allocated with, for example, the light source unit 1a and the first lens waveguide 3 as illustrated in FIG. 12, and a white beam emitted from the light source unit 1a is converted into parallel beams that travel through the block area QB2 constituted of the small areas $Q_{2,j}$.

The second light guide plate 6 is allocated with two light source units 1b and 1c, which can be controlled in light amount independently of each other, and the second lens waveguide 4. A white beam emitted from the light source unit 1b is converted into parallel beams that travel through the block area RB1 constituted of the small areas $R_{1,j}$. A white beam emitted from the light source unit is converted into parallel beams that travel through the block area RB3 constituted of the small areas $R_{3,j}$.

The third light guide plate 17 is allocated with three light source units 1d, 1e, and 1f, which can be controlled in light amount independently of one another, and the third lens waveguide 18. A white beam emitted from the light source unit 1d is converted into parallel beams that travel through the block area SB1 constituted of the small areas $S_{1,j}$. A white beam emitted from the light source unit 1e is converted into parallel beams that travel through the block area SB2 constituted of the small areas $S_{2,j}$. A white beam emitted from the light source unit 1f is converted into parallel beams that travel through the block area SB3 constituted of the small areas $S_{3,j}$.

A comparison of the areal dimensions of the small areas that have light extracting structures among the block areas reveals that the areal dimensions are smallest in the block areas RB1, RB3, SB1, and SB3. The number of white light sources of the respective light source units is accordingly determined with the light source units 1b, 1c, 1d, and 1f, which are allocated to the block areas RB1, RB3, SB1, and SB3, respectively, as the reference. The fifth embodiment deals with a case where the light source units 1b, 1c, 1d, and 1f are each constituted of one white light source as illustrated in FIG. 12, in order to simplify the description.

The small areas in the block area SB2 of the third light guide plate 17 that are provided with light extracting structures have areal dimensions twice larger than the areal dimensions of the small area in the block area SB1 that is provided with light extracting structures. The light source unit 1e allocated to the block area SB2 is therefore constituted of two white light sources $1e_1$ and $1e_2$ connected in series or in parallel as illustrated in FIG. 12.

Further, the small areas in the block area QB2 of the first light guide plate 5 that are provided with light extracting structures have areal dimensions twice larger than the areal dimensions of the small area in the block area SB1 that is provided with light extracting structures. The light source unit 1a allocated to the block area QB2 of the first light guide plate 5 is therefore constituted of two white light sources $1a_1$ and $1a_g$ connected in series or in parallel as illustrated in FIG. 12.

When the white light sources have the same light emission characteristics, applying the same magnitude of drive current to each white light source makes the light amounts (luminances) of white beams exiting the respective light guide plates from the small areas provided with light extracting structures substantially equal to one another.

Also, because the light source units 1a, 1b, 1c, 1d, 1e, and 1f can be controlled in light amount independently of one another, a planar beam of light for irradiating the display area DA can have a luminance distribution in which, for example, the luminance is high at the center and decreases toward the perimeter as described in the second embodiment.

Sixth Embodiment

FIGS. 13A to 13D are schematic diagrams illustrating the schematic structure of a main part of a liquid crystal display device according to a sixth embodiment of the present invention.

Figure 13A:
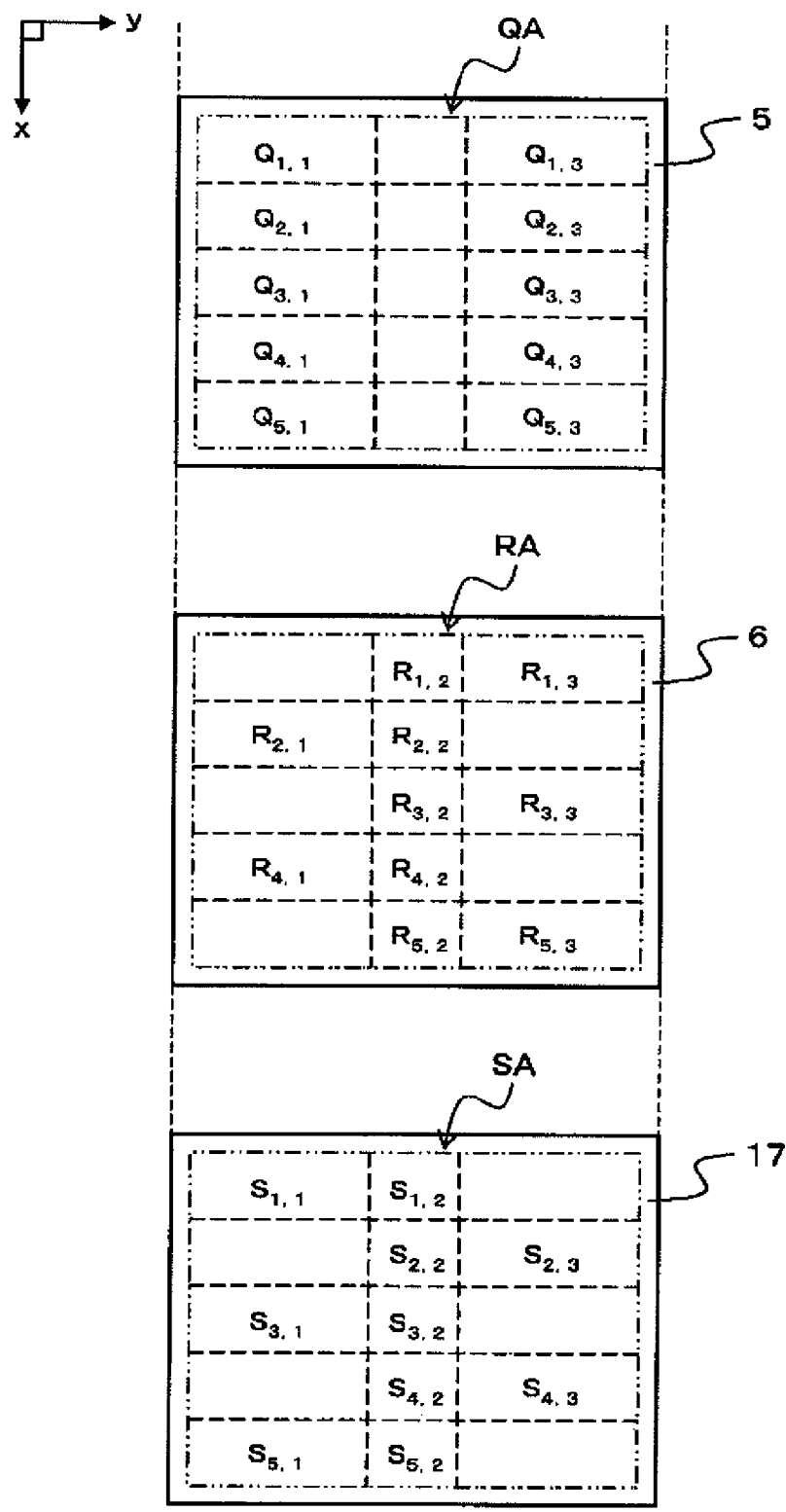
FIG. 13A is a schematic diagram illustrating an example of schematic structures of light guide plates of a liquid crystal display device according to a sixth embodiment of the present invention.
Figure 13B:
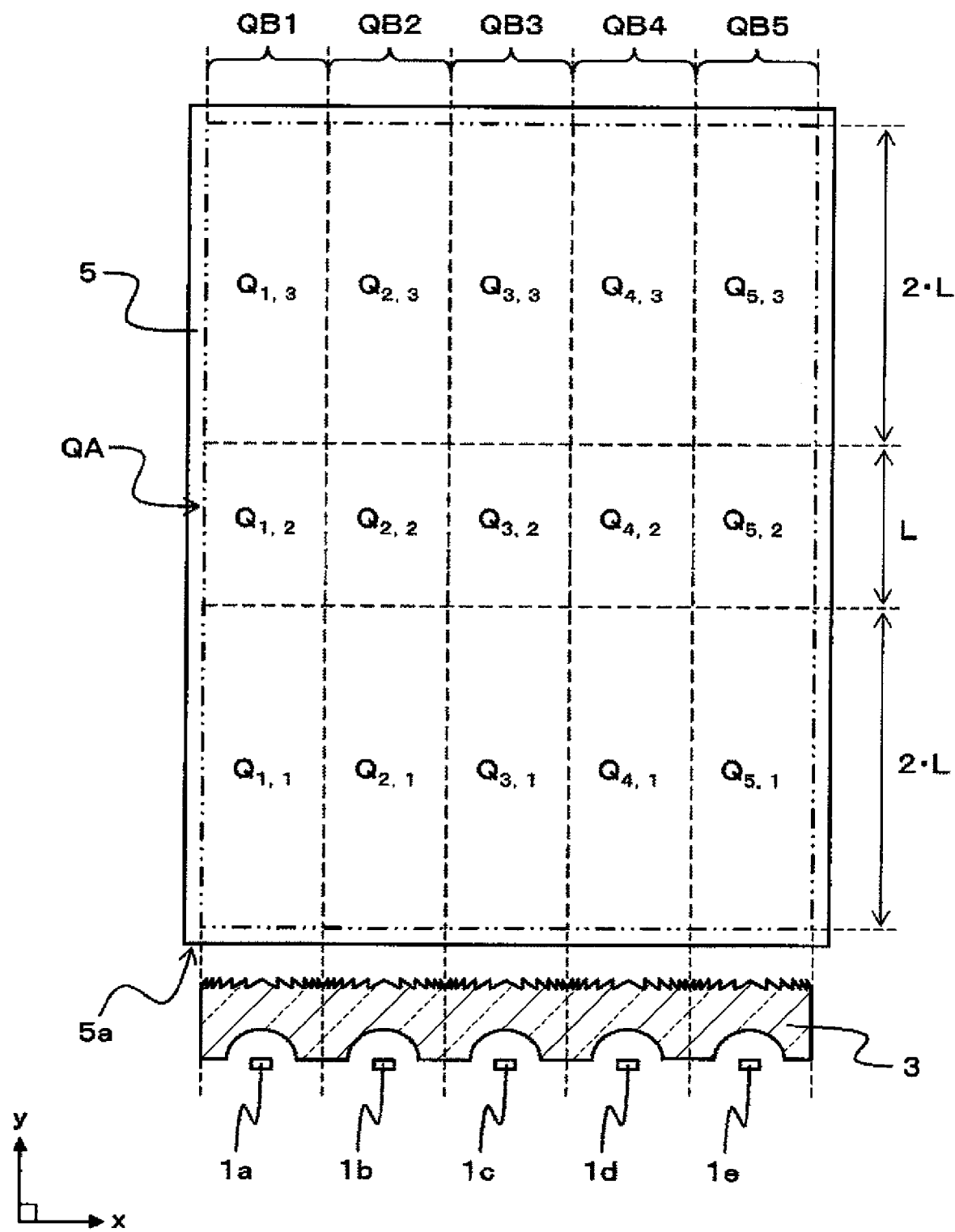
FIG. 13B is a schematic plan view illustrating an example of schematic structures of a first light guide plate, a first light source unit group, and a first lens waveguide.
Figure 13C:
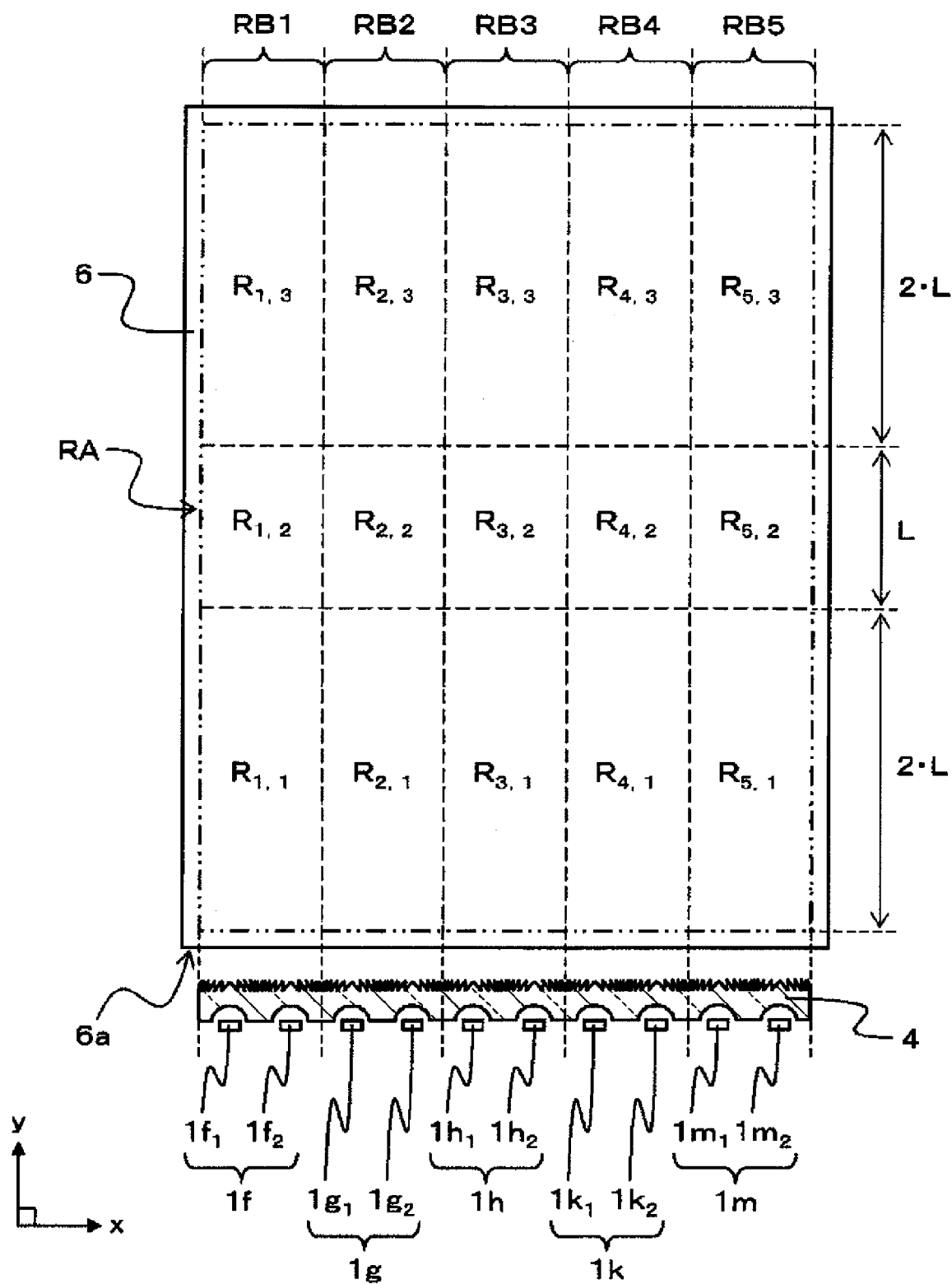
FIG. 13C is a schematic plan view illustrating an example of schematic structures of a second light guide plate, a second light source unit group, and a second lens waveguide.
Figure 13D:
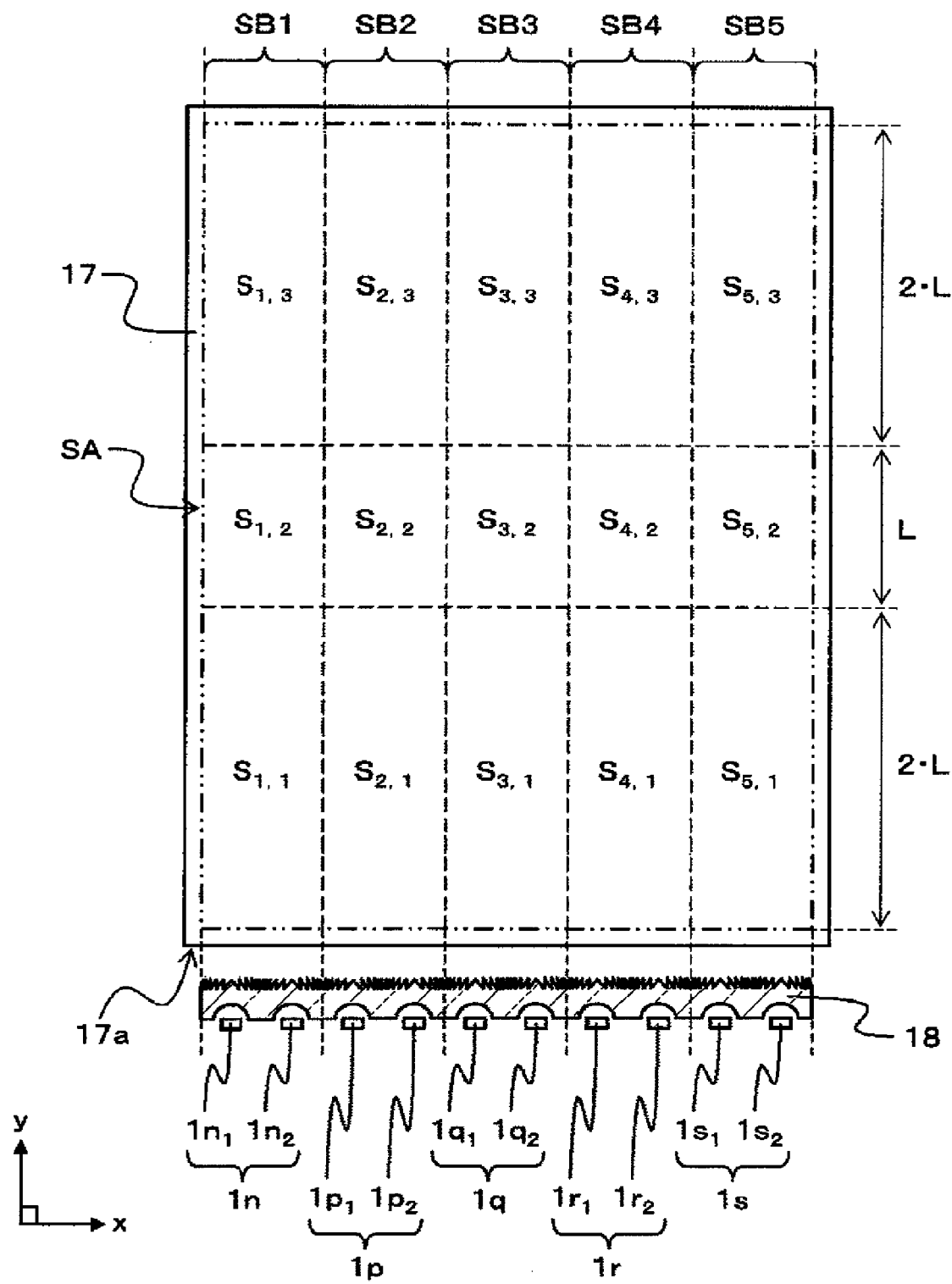
FIG. 13D is a schematic plan view illustrating an example of schematic structures of a third light guide plate, a third light source unit group, and a third lens waveguide.

FIG. 13A is a schematic view illustrating an example of the schematic structure of the light guide plates of the liquid crystal display device according to the sixth embodiment. FIG. 13B is a schematic plan view illustrating an example of the schematic structures of a first light guide plate, a first light source unit group, and a first lens waveguide. FIG. 13C is a schematic plan view illustrating an example of the schematic structures of a second light guide plate, a second light source unit group, and a second lens waveguide. FIG. 13D is a schematic plan view illustrating an example of the schematic structures of a third light guide plate, a third light source unit group, and a third lens waveguide.

The sixth embodiment deals with, as another structural example of a liquid crystal display device with three light guide plates stacked on top of one another, a structure that has more areas in which the amount of light can be controlled independently. The light extracting structures provided in the first light guide plate 5, the second light guide plate 6, and the third light guide plate 17 are placed in, for example, areas indicated in FIGS. 13A to 13D.

In the first light guide plate 5, the area QA, which overlaps with the display area DA, is divided into fifteen small areas $Q_{i,j}$ (i is any one of 1, 2, 3, 4, and 5, and j is any one of 1, 2, and 3), for example, in the manner illustrated in FIGS. 13A and 13B. Light extracting structures (e.g., the reflective protrusions 5c) are provided in five small areas $Q_{i,2}$. The area QA is divided in a manner that the dimensions in the x direction of the small areas $Q_{i,j}$ are equal to one another and that gives the small areas $Q_{i,1}$ and $Q_{i,3}$ each a dimension in the y direction that is twice larger than the dimension in the y direction of the small area $Q_{i,2}$ In the second light guide plate 6, the area RA, which overlaps with the display area DA, is divided into fifteen small areas $R_{i,j}$ (i is any one of 1, 2, 3, 4, and 5, and j is any one of 1, 2, and 3), for example, in the manner illustrated in FIGS. 13A and 13C. Light extracting structures (e.g., the reflective protrusions 6c) are provided in five small areas, $R_{1,1}$, $R_{2,3}$, $R_{3,1}$, $R_{4,3}$, and $R_{5,1}$. The small areas $R_{i,j}$ of the second light guide plate 6 respectively overlap with the small areas $Q_{i,j}$ of the first light guide plate 5.

In the third light guide plate 17, the area SA, which overlaps with the display area DA, is divided into fifteen small areas $S_{i,j}$ (i is any one of 1, 2, 3, 4, and 5, and j is any one of 1, 2, and 3), for example, in the manner illustrated in FIGS. 13A and 13D. Light extracting structures (e.g., the reflective protrusions) are provided in five small areas, $S_{1,3}$, $S_{2,1}$, $S_{3,3}$, $S_{4,1}$, and $S_{5,3}$. The small areas $S_{i,j}$ of the third light guide plate 17 respectively overlap with the small areas $Q_{i,j}$ of the first light guide plate 17.

Light source units for the first light guide plate 5 and the first lens waveguide 3 are structured, for example, as illustrated in FIG. 13B. A white beam emitted from the light source unit 1a is converted by the first lens waveguide 3 into parallel beams that travel through the small areas $Q_{1,j}$. A white beam emitted from the light source unit 1b is converted by the first lens waveguide 3 into parallel beams that travel through the small areas $Q_{2,j}$. A white beam emitted from the light source unit 1c is converted by the first lens waveguide 3 into parallel beams that travel through the small areas $Q_{3,j}$. A white beam emitted from the light source unit 1d is converted by the first lens waveguide 3 into parallel beams that travel through the small areas $Q_{4,j}$. A white beam emitted from the light source unit 1e is converted by the first lens waveguide 3 into parallel beams that travel through the small areas $Q_{5,j}$. The light source units 1a, 1b, 1c, 1d, and 1e are each constituted of one white light source, and are connected to the light source control circuit 2 so that the light source units can be controlled in light amount independently of one another.

Light source units for the second light guide plate 6 and the second lens waveguide 4 are structured, for example, as illustrated in FIG. 13C. A white beam emitted from the light source unit 1f is converted by the second lens waveguide 4 into parallel beams that travel through the small areas $R_{1,j}$. The areal dimensions of the small area $R_{1,1}$ in which the light extracting structures are provided are twice the areal dimensions of the small area $Q_{1,2}$ of the first light guide plate 5. The light source unit 1f is therefore constituted of two white light sources $1f_1$ and $1f_2$ connected in series or in parallel.

A white beam emitted from the light source unit 1g (which is constituted of two white light sources $1g_1$ and $1g_2$) is converted by the second lens waveguide 4 into parallel beams that travel through the small areas $R_{2,j}$. A white beam emitted from the light source unit 1h (which is constituted of two white light sources $1h_1$ and $1h_2$) is converted by the second lens waveguide 4 into parallel beams that travel through the small areas $R_{3,j}$. A white beam emitted from the light source unit 1k (which is constituted of two white light sources $1k_1$ and $1k_2$) is converted by the second lens waveguide 4 into parallel beams that travel through the small areas $R_{4,j}$. A white beam emitted from the light source unit 1m (which is constituted of two white light sources $1m_1$ and $1m_2$) is converted by the second lens waveguide 4 into parallel beams that travel through the small areas $R_{5,j}$. The light source units 1f, 1g, 1h, 1k, and 1m are connected to the light source control circuit 2 so that the light source units can be controlled in light amount independently of one another.

Light source units for the third light guide plate 17 and the third lens waveguide 18 are structured, for example, as illustrated in FIG. 13D. A white beam emitted from the light source unit 1n is converted by the third lens waveguide 18 into parallel beams that travel through the small areas $S_{1,j}$. The areal dimensions of the small area $S_{1,3}$ in which the light extracting structures are provided are twice the areal dimensions of the small area $Q_{1,2}$ of the first light guide plate 5. The light source unit in is therefore constituted of two white light sources $1n_1$ and $1n_2$ connected in series or in parallel.

A white beam emitted from the light source unit 1p (which is constituted of two white light sources $1p_1$ and $1p_2$) is converted by the third lens waveguide 18 into parallel beams that travel through the small areas $S_{2,j}$. A white beam emitted from the light source unit 1q (which is constituted of two white light sources $1q_1$ and $1q_2$) is converted by the third lens waveguide 18 into parallel beams that travel through the small areas $S_{3,j}$. A white beam emitted from the light source unit 1r (which is constituted of two white light sources $1r_1$ and $1r_2$) is converted by the third lens waveguide 18 into parallel beams that travel through the small areas $S_{4,j}$. A white beam emitted from the light source unit 1s (which is constituted of two white light sources $1s_1$ and $1s_2$) is converted by the third lens waveguide 18 into parallel beams that travel through the small areas $S_{5,j}$. The light source units 1n, 1p, 1q, 1r, and 1s are connected to the light source control circuit 2 so that the light source units can be controlled in light amount independently of one another.

When a backlight unit is structured as described above, the luminance of a planar beam for irradiating the liquid crystal display panel 11 can be controlled for each of fifteen small areas separately by controlling the drive currents of fifteen light source units independently of one another. The liquid crystal display device of the sixth embodiment is thus capable of controlling the luminance of a planar beam for irradiating the liquid crystal display panel 11 two-dimensionally and, for example, can give the planar beam of light a luminance distribution in which the luminance is high at the center and decreases toward the perimeter.

Figure 14:
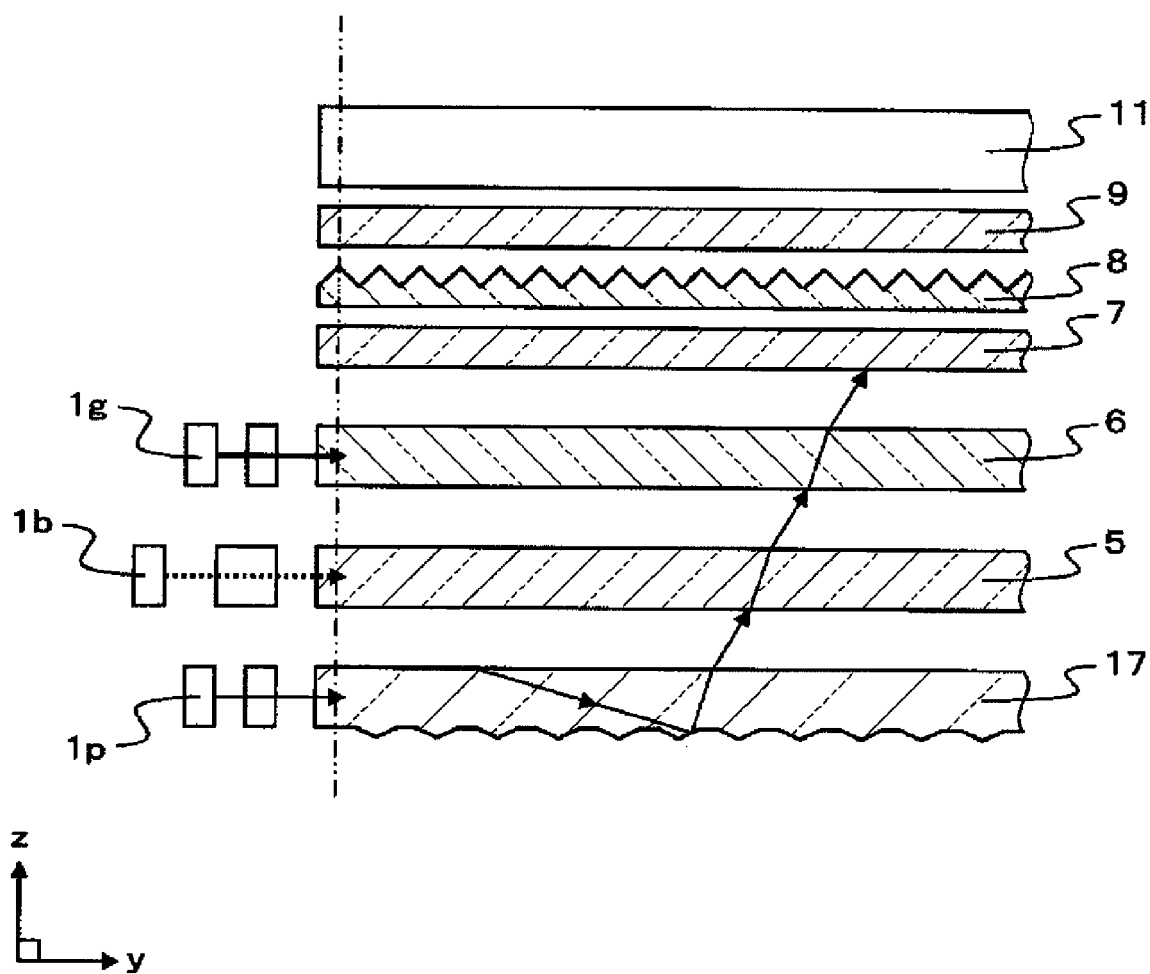
FIG. 14 is a schematic sectional view illustrating an example of how three light guide plates are stacked in the liquid crystal display device of the sixth embodiment.

FIG. 14 is a schematic sectional diagram illustrating an example of how three light guide plates are stacked in the liquid crystal display device of the sixth embodiment.

In the liquid crystal display device of the sixth embodiment, the five light source units 1a, 1b, 1c, 1d, and 1e allocated to the first light guide plate 5 are each constituted of, for example, one white light source. The five light source units 1f, 1g, 1h, 1k, and 1m allocated to the second light guide plate 6 and the five light source units 1n, 1p, 1q, 1r, and is allocated to the third light guide plate 17, on the other hand, are each constituted of, for example, two white light sources.

The focal length of Fresnel lenses that are provided in the first lens waveguide 3 is therefore twice the focal length of the Fresnel lenses that are provided in the second lens waveguide 4 and the Fresnel lenses that are provided in the third lens waveguide 18.

It is therefore desired in stacking the first light guide plate 5, the second light guide plate 6, and the third light guide plate 17 behind the liquid crystal display panel 11 to place the first light guide plate 5 between the second light guide plate 6 and the third light guide plate 17, for example, in the manner illustrated in FIG. 14. This way, when the light source units are stacked such that the incidence side surface 5a of the first light guide plate 5, the incidence side surface 6a of the second light guide plate 6, and the incidence side surface 17a of the third light guide plate 17 overlap with one another, interference between the stacked light source units can be prevented. As a result, even when the light source units each have a dimension in the z direction that is larger than, for example, the thickness of each light guide plate, the gap between one light guide plate and another is kept from increasing, and an increase in thickness of the liquid crystal display device is avoided.

Employing the arrangement of FIG. 14 also prevents the lowering of heat dissipation efficiency in the five light source units 1a, 1b, 1c, 1d, and 1e allocated to the first light guide plate 5 and, for example, reduces luminance fluctuations due to fluctuations in light emission efficiency which accompany a temperature shift.

Seventh Embodiment

FIGS. 15A to 15D are schematic diagrams illustrating the schematic structure of a main part of a liquid crystal display device according to a seventh embodiment of the present invention.

Figure 15A:
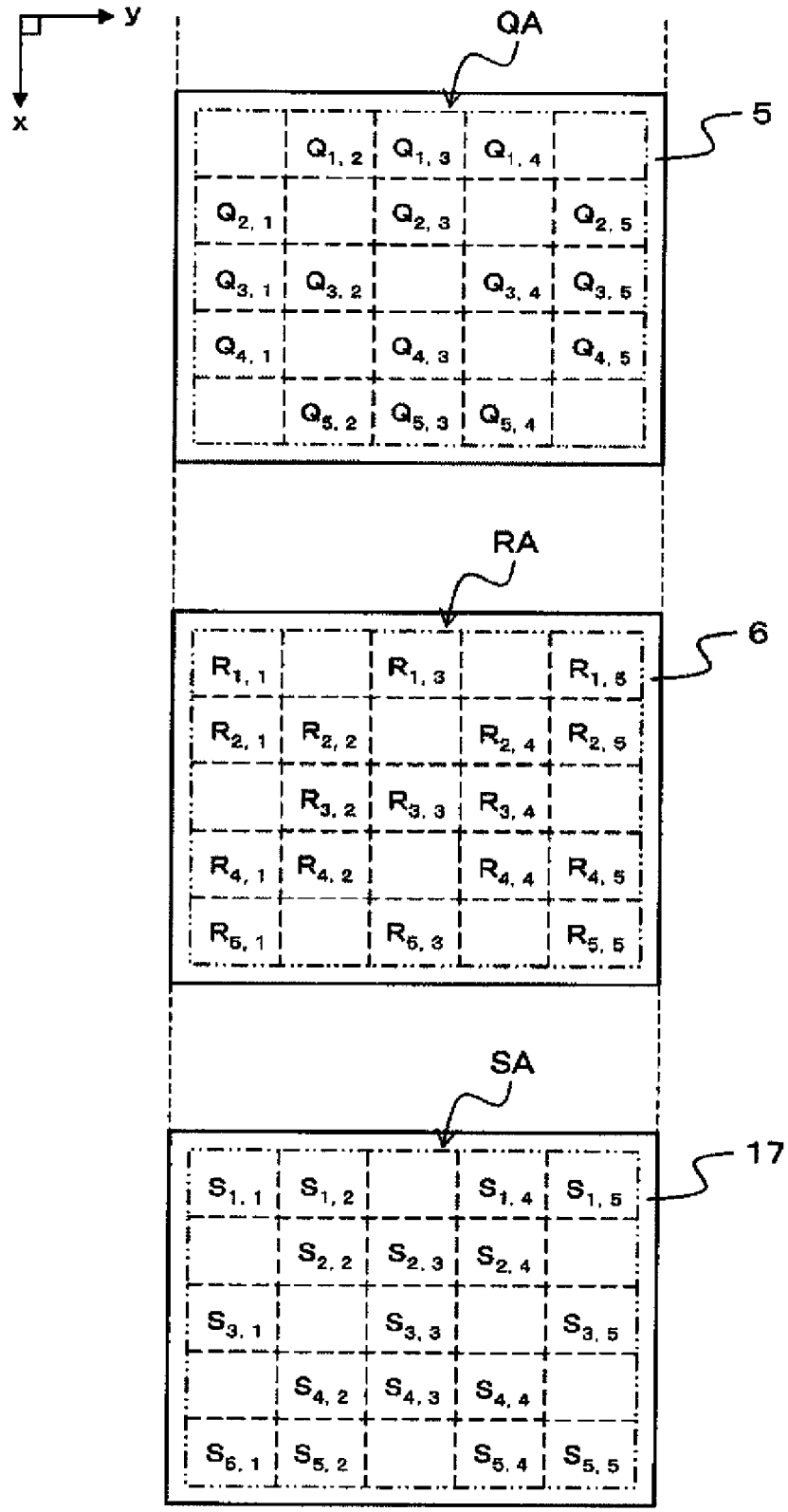
FIG. 15A is a schematic diagram illustrating an example of schematic structures of light guide plates of a liquid crystal display device according to a seventh embodiment of the present invention.
Figure 15B:
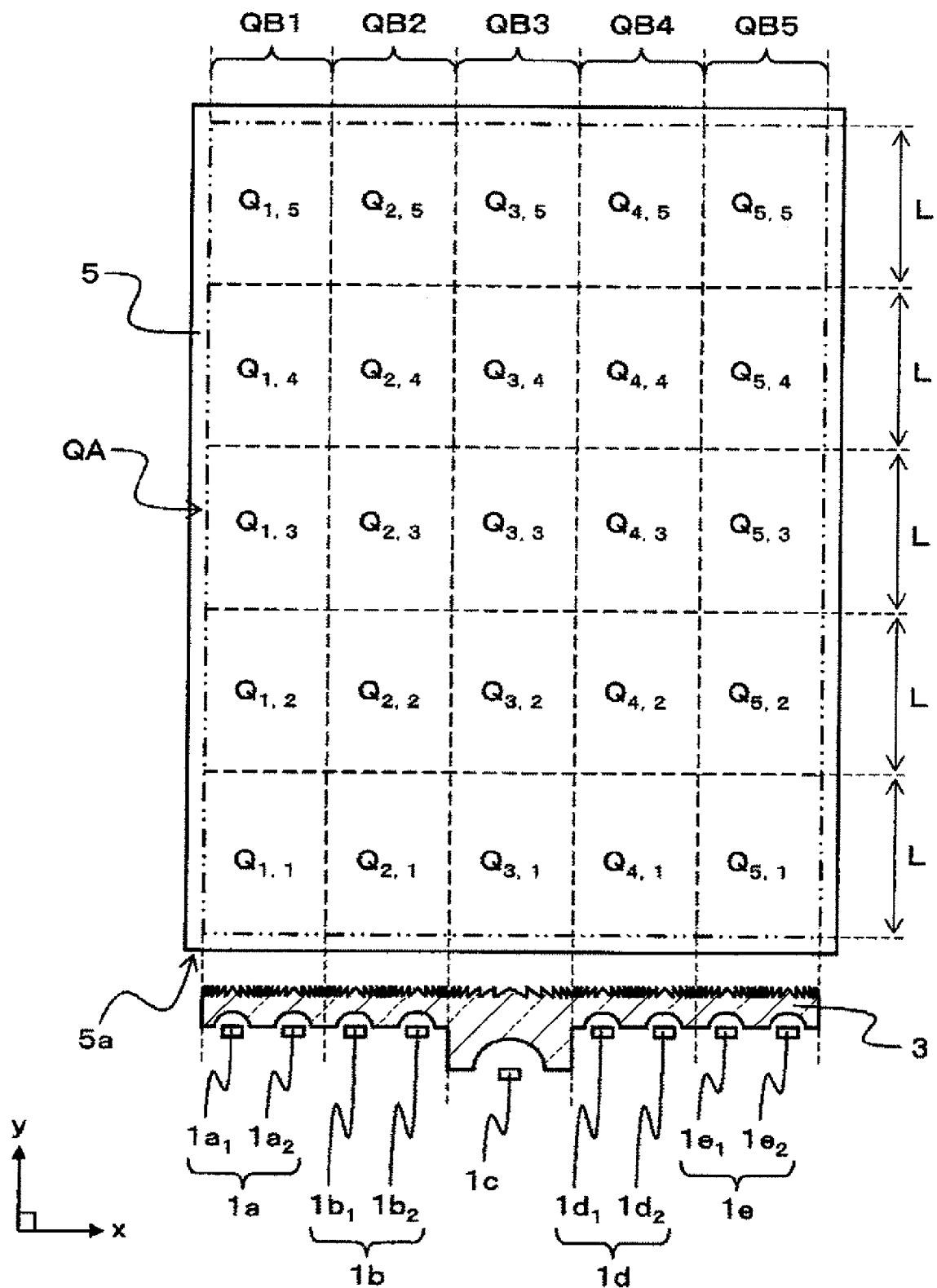
FIG. 15B is a schematic plan view illustrating an example of schematic structures of a first light guide plate, a first light source unit group, and a first lens waveguide.
Figure 15C:
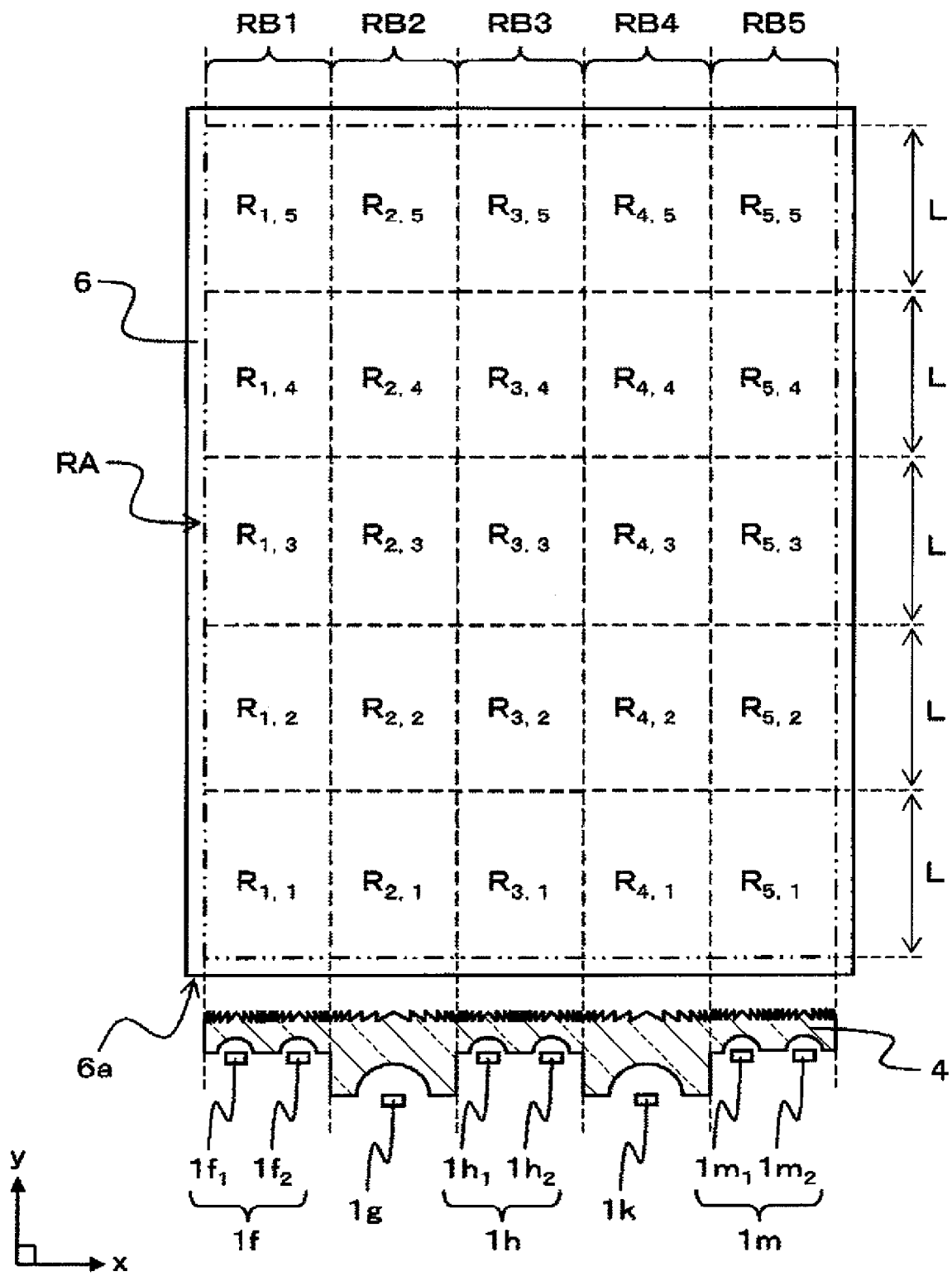
FIG. 15C is a schematic plan view illustrating an example of schematic structures of a second light guide plate, a second light source unit group, and a second lens waveguide.
Figure 15D:
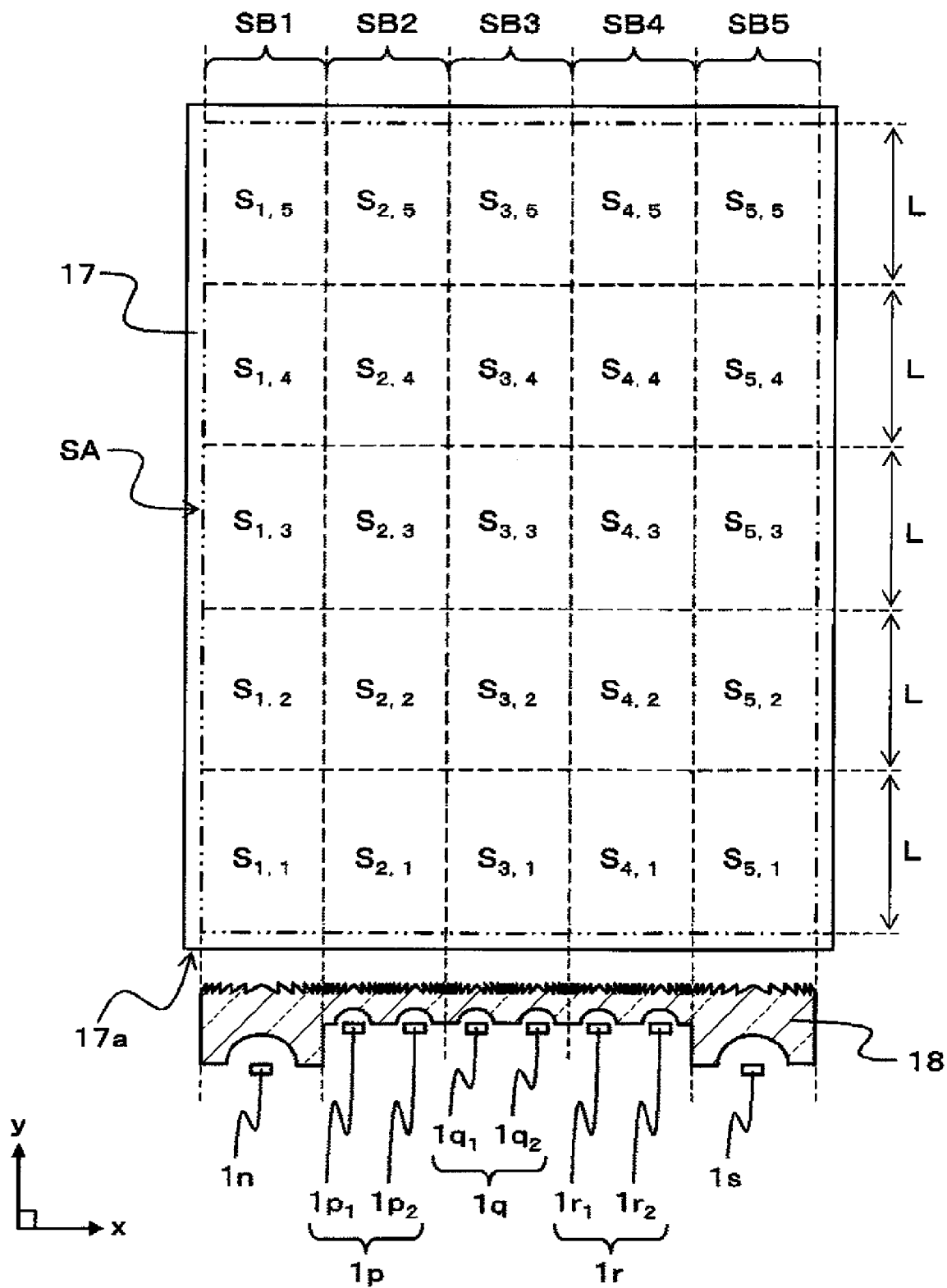
FIG. 15D is a schematic plan view illustrating an example of schematic structures of a third light guide plate, a third light source unit group, and a third lens waveguide.

FIG. 15A is a schematic view illustrating an example of the schematic structure of the light guide plates of the liquid crystal display device according to the seventh embodiment. FIG. 15B is a schematic plan view illustrating an example of the schematic structures of a first light guide plate, a first light source unit group, and a first lens waveguide. FIG. 15C is a schematic plan view illustrating an example of the schematic structures of a second light guide plate, a second light source unit group, and a second lens waveguide. FIG. 15D is a schematic plan view illustrating an example of the schematic structures of a third light guide plate, a third light source unit group, and a third lens waveguide.

The seventh embodiment deals with, as still another structural example of a liquid crystal display device with three light guide plates stacked on top of one another, a structure that has more areas in which the amount of light can be controlled independently. The light extracting structures provided in the first light guide plate 5, the second light guide plate 6, and the third light guide plate 17 are placed in, for example, areas indicated in FIGS. 15A to 15D.

In the first light guide plate 5, the area QA, which overlaps with the display area DA, is divided into twenty-five small areas $Q_{i,j}$ (i and j are any one of 1, 2, 3, 4, and 5, respectively), for example, in the manner illustrated in FIGS. 15A and 15B. Light extracting structures (e.g., the reflective protrusions 5c) are provided in nine small areas $Q_{1,1}, Q_{1,5}, Q_{2,2}, Q_{2,4}, Q_{3,3}, Q_{4,2}, Q_{4,4}, Q_{5,1}$, and $Q_{5,5}$. The area QA is divided in a manner that the dimensions of the small areas $Q_{i,j}$ are equal to one another.

In the second light guide plate 6, the area RA, which overlaps with the display area DA, is divided into twenty-five small areas $R_{i,j}$ (i and j are any one of 1, 2, 3, 4, and 5, respectively), for example, in the manner illustrated in FIGS. 15A and 15C. Light extracting structures (e.g., the reflective protrusions 6c) are provided in eight small areas, $R_{1,2}, R_{1,4}, R_{2,3} R_{3,1}, R_{3,5}, R_{4,3} R_{5,2}$, and $R_{5,4}$. The small areas $R_{i,j}$ of the second light guide plate 6 respectively overlap with the small areas $Q_{i,j}$ of the first light guide plate 5.

In the third light guide plate 17, the area SA, which overlaps with the display area DA, is divided into twenty-five small areas $S_{i,j}$ (i and j are any one of 1, 2, 3, 4, and 5, respectively), for example, in the manner illustrated in FIGS. 15A and 15D. Light extracting structures (e.g., the reflective protrusions) are provided in eight small areas, $S_{1,3}, S_{2,1}, S_{2,5}, S_{3,2}, S_{3,4}, S_{4,1}, S_{4,5}$, and $S_{5,3}$. The small areas $S_{i,j}$ of the third light guide plate 17 respectively overlap with the small areas $Q_{i,j}$ of the first light guide plate 5.

Light source units for the first light guide plate 5 and the first lens waveguide 3 are structured, for example, as illustrated in FIG. 15B. A white beam emitted from the light source unit 1a is converted by the first lens waveguide 3 into parallel beams that travel through the small areas $Q_{1,j}$. A white beam emitted from the light source unit 1b is converted by the first lens waveguide 3 into parallel beams that travel through the small areas $Q_{2,j}$. A white beam emitted from the light source unit 1c is converted by the first lens waveguide 3 into parallel beams that travel through the small areas $Q_{3,j}$. A white beam emitted from the light source unit 1d is converted by the first lens waveguide 3 into parallel beams that travel through the small areas $Q_{4,j}$. A white beam emitted from the light source unit 1e is converted by the first lens waveguide 3 into parallel beams that travel through the small areas $Q_{5,j}$.

In each of the block area QB1, which is constituted of the small areas $Q_{1,j}$, the block area QB2, which is constituted of the small areas $Q_{2,j}$, the block area QB4, which is constituted of the small areas $Q_{4,j}$, and the block area QB5, which is constituted of the small areas $Q_{5,j}$, the areal dimensions of the small areas that are provided with light extracting structures are twice the areal dimensions of the small area that is provided with light extracting structures in the block area QB3, which is constituted of the small areas $Q_{3,j}$. The liquid crystal display device of the seventh embodiment therefore uses one white light source to constitute the light source unit 1c and uses two white light sources to constitute each of the other light source units, 1a, 1b, 1d, and 1e.

Light source units for the second light guide plate 6 and the second lens waveguide 4 are structured, for example, as illustrated in FIG. 15C. A white beam emitted from the light source unit 1f is converted by the second lens waveguide 4 into parallel beams that travel through the small areas $R_{1,j}$. A white beam emitted from the light source unit 1g is converted by the second lens waveguide 4 into parallel beams that travel through the small areas $R_{2,j}$. A white beam emitted from the light source unit 1h is converted by the second lens waveguide 4 into parallel beams that travel through the small areas $R_{3,j}$. A white beam emitted from the light source unit 1k is converted by the second lens waveguide 4 into parallel beams that travel through the small areas $R_{4,j}$. A white beam emitted from the light source unit 1m is converted by the second lens waveguide 4 into parallel beams that travel through the small areas $R_{5,j}$.

In each of the block area RB1, which is constituted of the small areas $R_{1,j}$, the block area RB3, which is constituted of the small areas $R_{3,j}$, and the block area RB5, which is constituted of the small areas $R_{5,j}$, the areal dimensions of the small areas that are provided with light extracting structures are twice the areal dimensions of the small area that are provided with light extracting structures in the block area RB2, which is constituted of the small areas $R_{2,j}$ and the small area that are provided with light extracting structures in the block area RB4, which is constituted of the small areas $R_{4,j}$. The liquid crystal display device of the seventh embodiment therefore uses one white light source to constitute the light source units 1g and 1k, respectively, and uses two white light sources to constitute each of the other light source units, 1f, 1h, and 1m.

Light source units for the third light guide plate 17 and the third lens waveguide 18 are structured, for example, as illustrated in FIG. 15D. A white beam emitted from the light source unit in is converted by the third lens waveguide 18 into parallel beams that travel through the small areas $S_{1,j}$. A white beam emitted from the light source unit 1p is converted by the third lens waveguide 18 into parallel beams that travel through the small areas $S_{2,j}$. A white beam emitted from the light source unit 1q is converted by the third lens waveguide 18 into parallel beams that travel through the small areas $S_{3,j}$. A white beam emitted from the light source unit 1r is converted by the third lens waveguide 18 into parallel beams that travel through the small areas $S_{4,j}$. A white beam emitted from the light source unit is converted by the third lens waveguide 18 into parallel beams that travel through the small areas $S_{5,j}$.

In each of the block area SB2, which is constituted of the small areas $S_{2,j}$, the block area SB3, which is constituted of the small areas $S_{3,j}$, and the block area SB4, which is constituted of the small areas $S_{4,j}$, the areal dimensions of the small areas that are provided with light extracting structures are twice the areal dimensions of the small area that is provided with light extracting structures in the block area SB1, which is constituted of the small areas $S_{1,j}$ and the small area that is provided with light extracting structures in the block area SB5, which is constituted of the small areas $S_{5,j}$. The liquid crystal display device of the seventh embodiment therefore uses one white light source to constitute the light source units 1n and 1s, respectively, and uses two white light sources to constitute each of the other light source units, 1p, 1q, and 1r.

When a backlight unit is structured as described above, the luminance of a planar beam for irradiating the liquid crystal display panel 11 can be controlled for each of twenty-five small areas separately by controlling the drive currents of twenty-five light source units independently of one another. The liquid crystal display device of the seventh embodiment is thus capable of controlling the luminance of a planar beam for irradiating the liquid crystal display panel 11 two-dimensionally and, for example, can give the planar beam of light a luminance distribution in which the luminance is high at the center and decreases toward the perimeter.

A concrete description on the present invention has been given based on the above-mentioned embodiments. However, the present invention is not limited to the embodiments described above and various modifications can be made without departing from the spirit of the present invention.

For instance, while the first to seventh embodiments discuss cases where light source units are arranged along the shorter sides of a light guide plate, the present invention is not limited thereto and the shorter sides and longer sides of the light guide plate may be switched.

The structures of light guide plates, light source units, and lens waveguides given in the first to seventh embodiments are examples of a structure for two-dimensionally controlling the luminance of a planar beam that irradiates the liquid crystal display panel 11, in particular, a structure for controlling the luminance to have a distribution in which the luminance is high at the center and decreases toward the perimeter. In other words, light guide plates, light source units, and lens waveguides in a liquid crystal display device of the present invention are not limited to the structures described in the first to seventh embodiments, and can take other structures as long as a planar beam of light for irradiating the liquid crystal display panel 11 can be controlled two-dimensionally.

The structures of light guide plates, light source units, and lens waveguides given in the first to seventh embodiments are, for example, a structure for two-dimensionally controlling the luminance of a planar beam that irradiates a predetermined area of the liquid crystal display panel 11 such as the display area DA. Therefore, the structures of light guide plates, light source units, and lens waveguides of the present invention are applicable to, for example, a lighting requested to emit light whose luminance is high at the center and decreases toward the perimeter, in addition to backlights of liquid crystal display devices.

What is claimed is:

1. A liquid crystal display device comprising:
   a liquid crystal display panel;
   a plurality of groups of light source units;
   a plurality of light guide plates; and
   a light source control circuit to control light amounts of the light source units, wherein the plurality of groups of the light source units and the plurality of light guide plates forming a plurality of pairs are stacked behind the liquid crystal display panel, the plurality of light guide plates to transmit light from the plurality of groups of the light source units,
   wherein in each of the plurality of light guide plates, areas from which the transmitted light exiting toward the liquid crystal display panel differ from one another,
   wherein one of the plurality of groups of the light source units paired with one of the plurality of light guide plates includes at least two light source units that are controlled in light amount independently of each other,
   wherein a number of the areas of the one of the plurality of light guide plates paired with the one of the plurality of groups of the light source units is at least a number of the light source units thereof,
   wherein the light exiting from each of the areas is mainly emitted from one of at least two light source units,
   wherein the light source control circuit controls the at least two light source units in light amount independently of each other, and
   wherein the plurality of pairs of the plurality of groups of the light source units and the plurality of light guide plates each comprise light condensing means for reducing a divergence angle of the light emitted from the one of the plurality of groups of the light source units between the one of the plurality of groups of the light source units and the one of the plurality of light guide plates.

2. The liquid crystal display device according to claim 1, wherein in the one of the plurality of light guide plates paired with the one of the plurality of groups of the light source units that includes the at least two light source units, the areas all have the same areal dimensions.

3. The liquid crystal display device according to claim 1, wherein in the one of the plurality of light guide plates paired with the one of the plurality of groups of the light source units that includes the at least two light source units, the areas have at least two different areal dimensions.

4. The liquid crystal display device according to claim 3, wherein the at least two light source units each include one white light source or at least two white light sources, and
   wherein a number of the white light sources of each of the at least two light source units varies depending on the at least two different areal dimensions of the areas from which the light from each of the at least two light source units exits.

5. The liquid crystal display device according to claim 1, wherein the plurality of light guide plates are equal to one another in areal dimensions of the areas from which the transmitted light exits toward the liquid crystal display panel.

6. The liquid crystal display device according to claim 1, wherein the light condensing means includes a lens for converting the light emitted from the one of the plurality of groups of the light source units into parallel beams.

7. The liquid crystal display device according to claim 1, wherein the plurality of light guide plates each have one of a convex reflection pattern or a concave reflection pattern in the areas from which the light exits, and
   wherein the one of the convex reflection pattern or the concave reflection pattern changes in a shape according to a distance from a point which the light from the plurality of groups of the light source units enter.

8. The liquid crystal display device according to claim 1, wherein a perimeter of the areas of the one of the plurality of light guide plates from which the light exits overlaps with a perimeter of the areas of another one of the plurality of light guide plates from which the light exits over a predetermined width.

* * * * *